United States Patent
Tsai et al.

(10) Patent No.: US 12,185,404 B2
(45) Date of Patent: Dec. 31, 2024

(54) BEAM FAILURE DETECTION AND RECOVERY WITH MULTI-TRP AND MULTI-PANEL TRANSMISSION

(71) Applicant: InterDigital Patent Holdings, Inc., Wilmington, DE (US)

(72) Inventors: Allan Y. Tsai, Boonton, NJ (US); Patrick Svedman, Stockholm (SE); Qing Li, Princeton Junction, NJ (US); Guodong Zhang, Woodbury, NY (US); Lakshmi R. Iyer, King of Prussia, PA (US); Yifan Li, Conshohocken, PA (US); Mohamed Awadin, Plymouth Meeting, PA (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 404 days.

(21) Appl. No.: 17/635,438

(22) PCT Filed: Aug. 14, 2020

(86) PCT No.: PCT/US2020/046383
§ 371 (c)(1),
(2) Date: Feb. 15, 2022

(87) PCT Pub. No.: WO2021/034672
PCT Pub. Date: Feb. 25, 2021

(65) Prior Publication Data
US 2022/0295589 A1    Sep. 15, 2022

Related U.S. Application Data

(60) Provisional application No. 62/887,917, filed on Aug. 16, 2019.

(51) Int. Cl.
*H04W 76/19* (2018.01)
*H04L 5/00* (2006.01)
*H04W 24/08* (2009.01)

(52) U.S. Cl.
CPC ........... *H04W 76/19* (2018.02); *H04L 5/0048* (2013.01); *H04W 24/08* (2013.01)

(58) Field of Classification Search
None
See application file for complete search history.

(56) References Cited

U.S. PATENT DOCUMENTS

| | | | |
|---|---|---|---|
| 11,737,081 B2 * | 8/2023 | Moon | H04L 1/0038 |
| | | | 370/329 |
| 2019/0082363 A1 * | 3/2019 | Park | H04W 36/0079 |

(Continued)

FOREIGN PATENT DOCUMENTS

| | | | | |
|---|---|---|---|---|
| EP | 3793239 A1 * | 3/2021 | ........... | H04B 17/309 |
| WO | 2019153708 A1 | 8/2019 | | |
| WO | 2019220649 A1 | 11/2019 | | |

OTHER PUBLICATIONS

AT&T, "On beam recovery for partial and full control channel failure", 3GPP TSG RAN WG1 Meeting NR#3, R1-1716169, Sep. 18-21, 2017, 7 pages.

(Continued)

*Primary Examiner* — Kenny S Lin
(74) *Attorney, Agent, or Firm* — Flaster Greenberg P.C.

(57) ABSTRACT

Methods, systems, and devices may support BFD with multi-TRP transmission or support BFR with multi-TRP transmission, among other things. For BFD with multi-TRP transmission, there may be the explicit configuration or implicit configuration. With regard to BFR with multi-TRP transmission there may: BFR using contention-free PRACH, (Continued)

BFR using PUCCH, BFR using contention-free 2-step RACH, or BFR using PUSCH.

18 Claims, 33 Drawing Sheets

(56) References Cited

U.S. PATENT DOCUMENTS

| | | | |
|---|---|---|---|
| 2019/0190582 A1 | 6/2019 | Guo et al. | |
| 2020/0314724 A1* | 10/2020 | Kyung | H04W 76/19 |
| 2021/0028849 A1* | 1/2021 | Chin | H04B 7/06964 |
| 2021/0044342 A1* | 2/2021 | He | H04B 7/0695 |
| 2021/0050901 A1* | 2/2021 | Chin | H04W 72/56 |
| 2021/0219366 A1* | 7/2021 | Matsumura | H04L 5/0048 |
| 2021/0409091 A1* | 12/2021 | Svedman | H04W 76/19 |
| 2022/0109547 A1* | 4/2022 | Svedman | H04B 7/0695 |
| 2022/0158715 A1* | 5/2022 | Bishwarup | H04W 76/19 |
| 2023/0156845 A1* | 5/2023 | Khoshnevisan | H04L 5/0053 370/216 |
| 2023/0276519 A1* | 8/2023 | Gao | H04B 7/0695 370/252 |

OTHER PUBLICATIONS

Spreadtrum Communications, "Discussion on multi-beam operation", 3GPP TSG RAN WG1 Meeting #95, R1-1813067, Nov. 12-16, 2018, 5 pages.

* cited by examiner

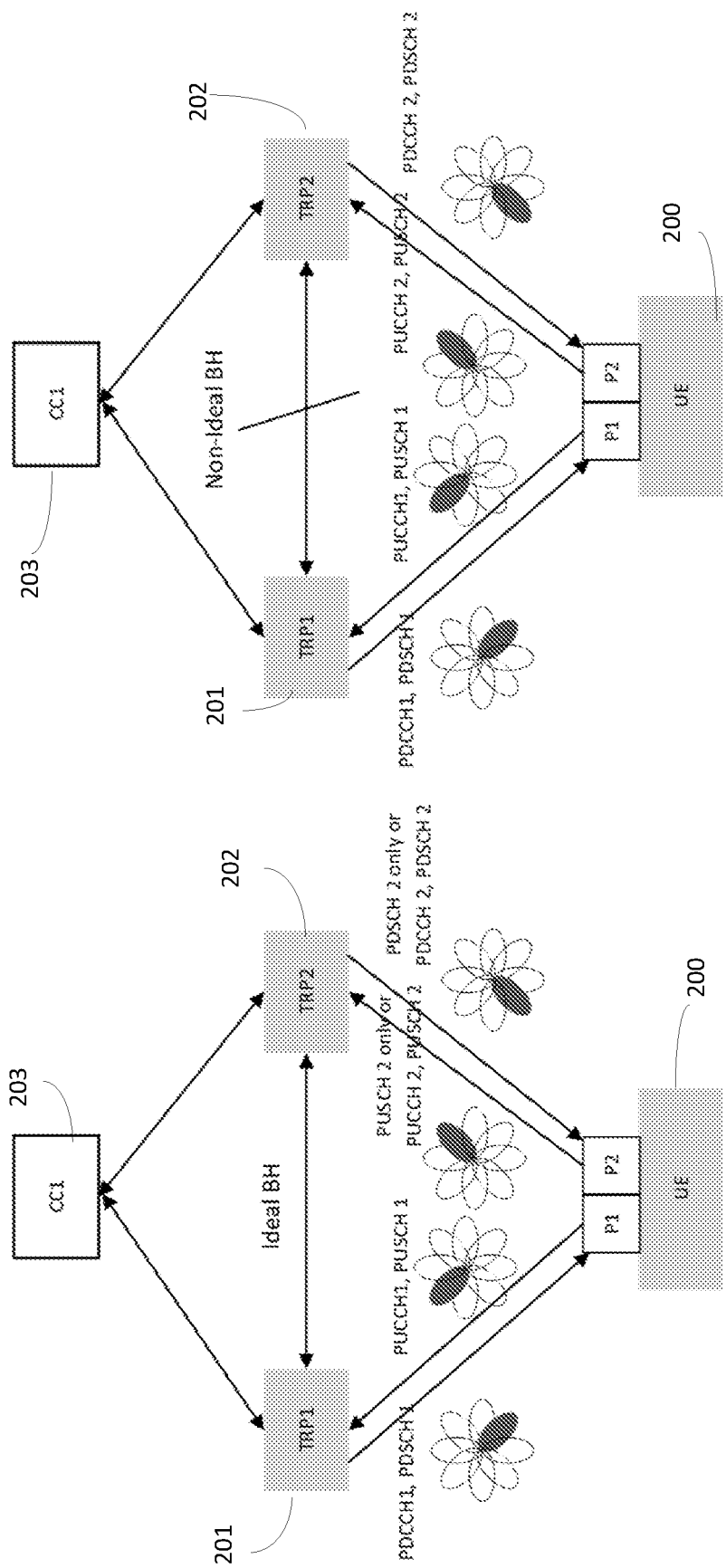

FIG. 20

| $c_0$ | $c_8$ | $c_{16}$ | $c_{24}$ |
|---|---|---|---|
| $c_1$ | $c_9$ | $c_{17}$ | $c_{25}$ |
| $c_2$ | $c_{10}$ | $c_{18}$ | $c_{26}$ |
| $c_3$ | $c_{11}$ | $c_{19}$ | $c_{27}$ |
| $c_4$ | $c_{12}$ | $c_{20}$ | $c_{28}$ |
| $c_5$ | $c_{13}$ | $c_{21}$ | $c_{29}$ |
| $c_6$ | $c_{14}$ | $c_{22}$ | $c_{30}$ |
| $c_7$ | $c_{15}$ | $c_{23}$ | $c_{31}$ |

Candidate RS ID or R bits / R / AC

...

Candidate RS ID or R bits / R / AC

FIG. 23

| $C_0$ | $C_8$ | $C_{16}$ | $C_{24}$ | Candidate RS ID or R bits | ... | Candidate RS ID or R bits |
|---|---|---|---|---|---|---|
| $C_1$ | $C_9$ | $C_{17}$ | $C_{25}$ | | | |
| $C_2$ | $C_{10}$ | $C_{18}$ | $C_{26}$ | | | |
| $C_3$ | $C_{11}$ | $C_{19}$ | $C_{27}$ | | | |
| $C_4$ | $C_{12}$ | $C_{20}$ | $C_{28}$ | | | |
| $C_5$ | $C_{13}$ | $C_{21}$ | $C_{29}$ | L or R | | L or R |
| $C_6$ | $C_{14}$ | $C_{22}$ | $C_{30}$ | | | |
| $C_7$ | $C_{15}$ | $C_{23}$ | $C_{31}$ | AC | | AC |

FIG. 25

BEAM FAILURE DETECTION AND RECOVERY WITH MULTI-TRP AND MULTI-PANEL TRANSMISSION

CROSS-REFERENCE TO RELATED APPLICATIONS

This application is the National Stage Application of International Patent Application No. PCT/US2020/046383, filed Aug. 14, 2020 which claims the benefit of priority of U.S. Provisional Application No. 62/887,917, filed 16 Aug. 2019, entitled "Beam Failure Detection And Recovery With Multi-Trp And Multi-Panel Transmission", the contents of which is hereby incorporated in its entirety by reference herein.

BACKGROUND

Massive multiple input multiple output (MIMO) systems are expected to boost the data throughput and reliability in future 5G systems. Multiple transmission and reception points (multi-TRPs) may be significant in 5G in order to improve reliability, coverage, and capacity performance through flexible deployment scenarios. For example, to be able to support the exponential growth in mobile data traffic in 5G and to enhance the coverage, the wireless devices are expected to access networks composed of multi-TRPs (e.g., macro-cells, small cells, pico-cells, femto-cells, remote radio heads, relay nodes, etc.).

SUMMARY

Beam failure detection (BFD) and beam failure recovery (BFR) may be based on per cell but not based on per TRP/panel. BFR may be for SpCell or BFR may be for SCell. In a multi-TRP (per) cell case, no matter for PCell or Scell, the radio link to one TRP may fail, while the link to another TRP may still function. It may be preferable to support the BFD and BFR based on each one of the multiple links with multi-TRP, in the scenario with ideal or non-ideal backhaul.

Disclosed herein are methods, systems, and devices that support BFD with multi-TRP transmission or support BFR with multi-TRP transmission, among other things. For BFD with multi-TRP transmission, there may be multiple options, such as: 1) explicit configuration options for beam failure resource sets and candidate beam reference signal (RS) list sets or 2) implicit configuration options if a UE is not provided with explicit beam failure resource sets and candidate beam RS list sets. With regard to BFR with multi-TRP transmission there may be multiple options, such as: 1) BFR use contention-free PRACH, 2) BFR use PUCCH, 3) BFR use contention-free 2-step RACH, or 4) BFR use PUSCH.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not constrained to limitations that solve any or all disadvantages noted in any part of this disclosure.

BRIEF DESCRIPTION OF THE DRAWINGS

A more detailed understanding may be had from the following description, given by way of example in conjunction with the accompanying drawings wherein:

FIG. 6A illustrates an exemplary CC supports two TRP transmission (a) Ideal backhaul;
FIG. 6B illustrates an exemplary CC supports two TRP transmission (b) Non-ideal backhaul and UE with two panels;
FIG. 20 illustrates an exemplary Two-step contention-free RACH for SCell DL only BFR;
FIG. 23 illustrates BFR MAC CE with four octets bitmap (legacy);
FIG. 25 illustrates BFR MAC CE with four octets bitmap with an L field.

DETAILED DESCRIPTION

Multi-TRP and multi-panel transmissions—It is recognized that increased diversity and robustness may be achieved by both ideal and non-ideal backhaul networks using multi-TRP and multi-panel transmissions. A goal may be to make each TRP-UE link relatively independent at least from the PHY perspective. For example, a UE multiplexes A/N of PDSCH(s) from TRP1 on one PUCCH transmission, A/N are divided per TRP.

Note that ideal backhaul such as point-to-point connection using optical fiber may allow very high throughput and very low latency between TRPs and the core network. An ideal backhaul may be defined as latency less than 2.5 microseconds and a throughput of 10 Gbps. Non-ideal backhaul such as xDSL, microwave, and relay networks may have significant delay latency in the network.

Figure 1:
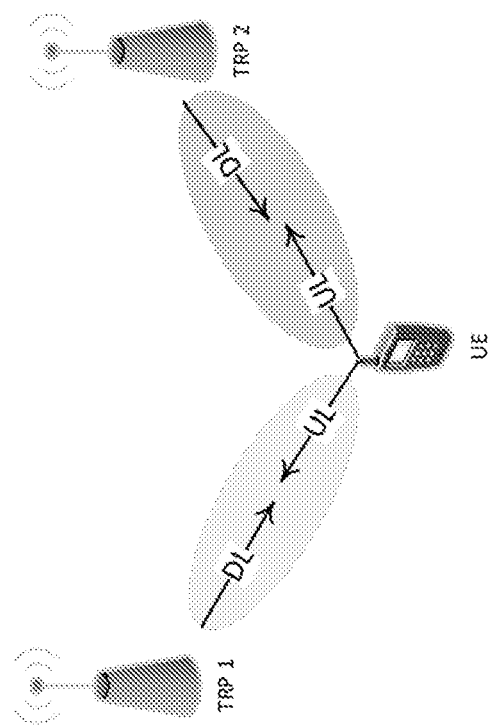
FIG. 1 illustrates an exemplary Multi-TRP transmission.

In a multi-TRP network, the UE may communicate with multiple TRPs as shown in FIG. 1. Typically, the TRPs are accessed by the UE on different beams. For non-ideal backhaul networks, non-coherent joint transmission from multi-TRPs may improve performance especially at the edge of coverage areas of TRPs. Joint transmission by multiple TRPs may improve both the PDSCH performance as well as the PDCCH performance.

Multi-panel deployments may be supported in the TRPs for multi-beam transmission and reception. As disclosed herein, the term "TRP" may also refer to network-side panels. Multi-panel deployments may also be supported in the UE. In addition, the term "panel" may refer to a panel (e.g., antenna array) of the UE.

Figure 2:
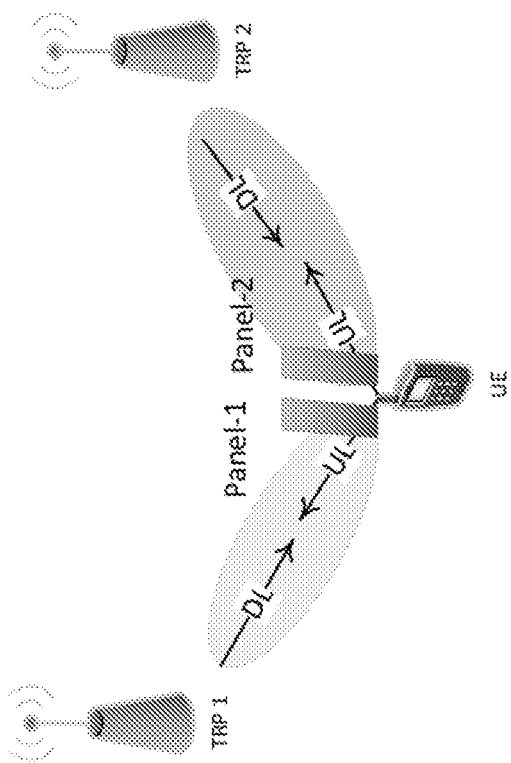
FIG. 2 illustrates an exemplary multi-panel transmission.

Multi-panel transmissions wherein, a UE may transmit from multiple panels is known to provide increased spectral efficiency—the transmissions from the panels may be coherent or non-coherent. The concept of multi-panel transmission is shown in FIG. 2. Each UE panel may be assumed to have a different orientation, and therefore the best beam or TRP for reception may be different for each UE panel. The UE may determine the best TRP or beam for a given panel based on measurements and may feed back the information to the network; accordingly, the network may determine which beams or TRP(s) must be used for PUCCH/PUSCH reception. Each panel-TRP link may be considered as an independent link and therefore inter-panel calibration is not required at the UE.

Multi-TRP PDSCH transmission—Conventionally, multiple codeword transmission over multiple layers on the same time-frequency resources may be supported in the DL and the UL. The codewords (CWs) may be transmitted from independent beams from different TRPs. So, the DMRS port(s) for each CW or layer may have different QCL assumptions. However, in non-ideal backhaul networks, where latency is a concern, it may be desired to operate the TRPs as independently as possible with less reliable on joint transmission.

Accordingly, a goal for wireless communications is to enable downlink and uplink signaling enhancements for multi-TRP and multi-panel transmissions.

Figure 3:
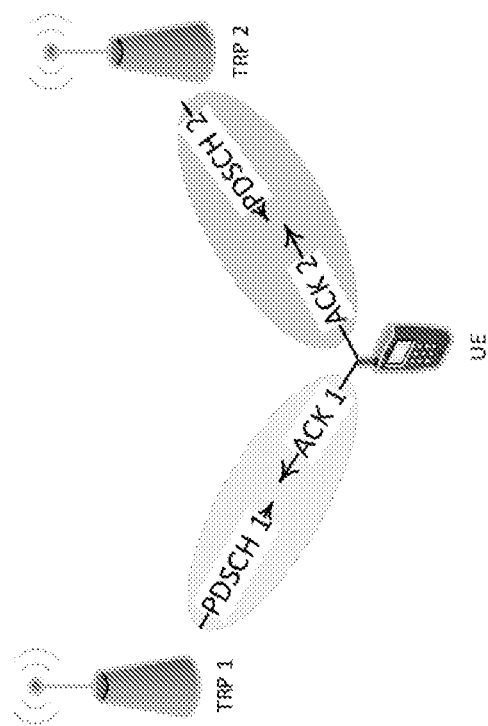
FIG. 3 illustrates an exemplary UE with multi-TRP and multi-panel transmissions.

A procedure to support multi-TRP PDSCH transmission is being considered along with an individual HARQ ACK codebook per TRP so that the UE may acknowledge the PDSCH from different TRPs separately. An example is shown in FIG. 3 where the UE receives PDSCH1 from TRP1 and PDSCH2 from TRP2 and in response, sends Ack1 (for PDSCH1) to TRP1 and Ack2 (for PDSCH2) to TRP2. Note that PDSCH1 and PDSCH2 may correspond to the same or different HARQ processes. An identifier may be used to associate a received PDSCH to the transmitted TRP so that the UE may send the corresponding Ack to the intended TRP.

Figures 4A, 4B:
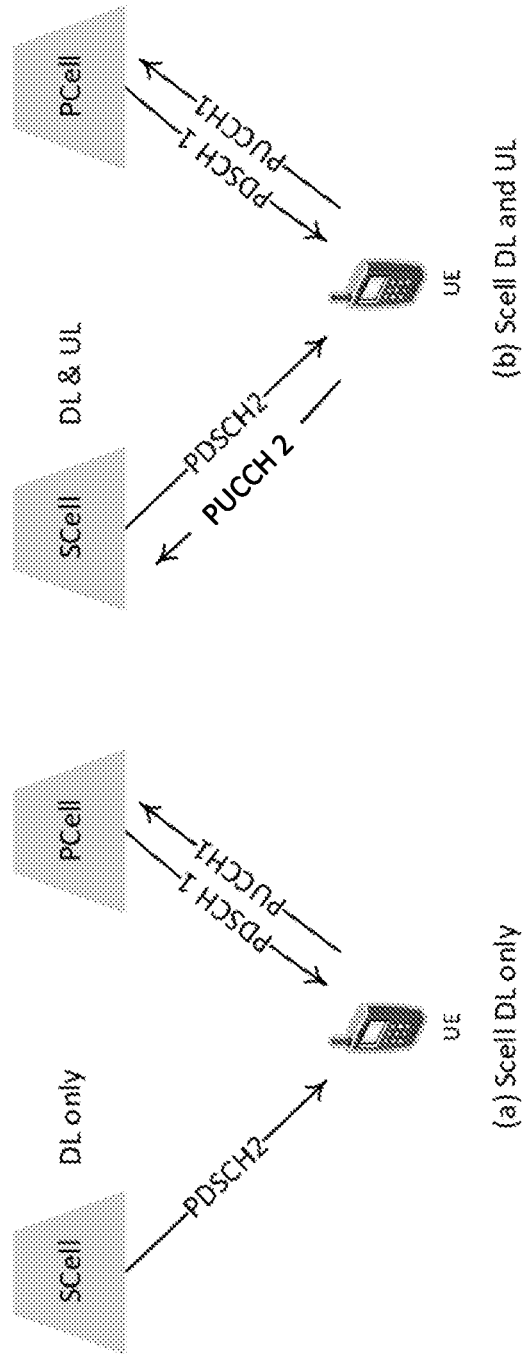
FIG. 4A illustrates an exemplary SCell configured with (a) DL only.
FIG. 4B illustrates an exemplary SCell configured with (b) DL and UL transmission.
Figure 5:
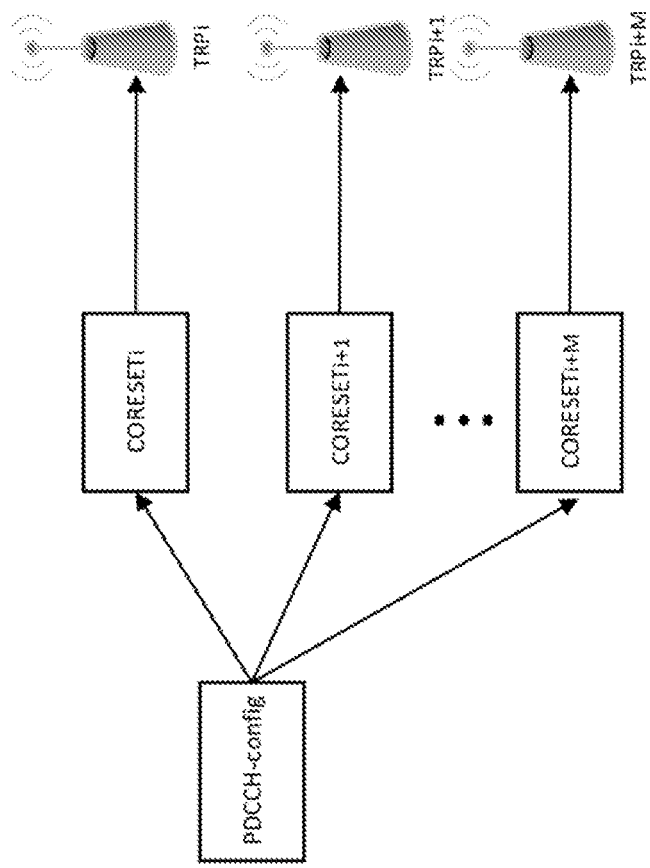
FIG. 5 illustrates an exemplary A TRP may be associated with a CORESET ID.

SCell configuration in NR—A SCell may be configured with downlink (DL) transmission only. In this case, UL may be transmitted only at primary Cell (PCell) for UE. Another scenario is that the Serving Cell (SCell) may have both uplink (UL) and DL for transmission. In FIG. 4A, it illustrates the case when a SCell is configured with DL transmission only, and (b) it illustrates the case when a SCell is configured with both DL and UL transmission. In FIG. 4A, the UE transmits PUCCH/PSCCH via PCell. In FIG. 4B, a UE may transmit PUCCH/PSCCH or other physical channels, such as PRACH, at both SCell and PCell.

Beam Failure Request in Rel-15-In Rel-15, when a beam failure is detected and candidate beam is defined, the UE transmit PRACH of the best identified candidate beam according to RACH configurations provided by the RRC message PRACH-ResourceDedicatedBFR. In Rel-15, BFR may be done via contention-free random access (CFRA) procedure.

In Rel-15, The RRC BeamFailureRecoveryConfig IE in BWP-UplinkDedicated field may be used to configure the UE with RACH resources and candidate beams for beam failure recovery in case of beam failure detection. A UE may be provided a CORESET through a link to a search space set provided by recoverySearchSpaceId in RRC IE BeamFailureRecoveryConfig filed for monitoring PDCCH in the CORESET. RecoverySearchSpaceId may indicate the search space to use for BFR random access response.

Radio link monitoring in Rel-15—A UE may be configured for each DL BWP of a Special Cell (SpCell), e.g., primary cell (PCell) or primary secondary (PSCell) with a set of resource indexes, through a corresponding set of RadioLinkMonitoringRS, for radio link monitoring by failureDetectionResources. The UE is provided a CSI-RS resource configuration index, by csi-RS-Index, or a SS/PBCH block index, by ssb-Index. The UE may be configured with up to $N_{LR\_RLM}$ RadioLinkMonitoringRS for link recovery procedures, and for radio link monitoring. From the $N_{LR\_RLM}$ RadioLinkMonitoringRS, up to $N_{RLM}$ RadioLinkMonitoringRS may be used for radio link monitoring depending on a maximum number $L_{max}$ of candidate SS/PBCH blocks per half frame, and up to two RadioLinkMonitoringRS may be used for link recovery procedures.

If the UE is not provided RadioLinkMonitoringRS and the UE is provided for PDCCH receptions TCI states that include one or more of a CSI-RS:

the UE uses for radio link monitoring the RS provided for the active TCI state for PDCCH reception if the active TCI state for PDCCH reception includes only one RS if the active TCI state for PDCCH reception includes two RS, the UE expects that one RS has QCL-TypeD [TS 38.214] and the UE uses the RS with QCL-TypeD for radio link monitoring; the UE does not expect both RS to have QCL-TypeD the UE is not required to use for radio link monitoring an aperiodic or semi-persistent RS For $L_{max}=4$, the UE selects the $N_{RLM}$ RS provided for active TCI states for PDCCH receptions in CORESETs associated with the search space sets in an order from the shortest monitoring periodicity. If more than one CORESETs are associated with search space sets having same monitoring periodicity, the UE determines the order of the CORESET from the highest CORESET index.

CORESET association with TRP—If multi-TRP transmission, one or more CORESET(s) in a PDCCH-config corresponds to one TRP. Hence, a CORESET identification (ID) may be tied to a TRP, and a PDSCH grants via a CORESET is linked to that TRP. And A/N for that PDSCH is transmitted to that TRP. Thus per-TRP PUCCH transmissions will be supported. The association between CORESET ID and TRP ID in PDCCH-config is as depicted in.

For NR-PDCCH transmission supporting robustness against beam pair link blocking, UE may be configured to monitor NR-PDCCH on M beam pair links simultaneously from multi-TRP, where M 1 and the maximum value of M may depend on UE capability. UE may be configured to monitor NR-PDCCH on different beam pair link(s) (BPL) in same or different NR-PDCCH slot which is dependent on $n<=N_f$ frequency-domain multiplexing (FDM) TCI states within the or $n<=N_t$ time-domain multiplexing (TDM) TCI states within the single slot.

As an example, UE may identify reception on CORESET$_1$ with B$_1$ from TRP$_1$ and reception on CORESET$_2$ with B$_2$ from TRP$_2$. Another example, UE may identify CORESET$_1$ and CORESET$_2$ from TRP$_1$. The maximum number of TRP M$_k$ per component carrier (CC) k for a UE may be pre-defined in the standards or configured by higher layer signaling, such as RRC.

A TRP may determine a Tx beam for the downlink transmission based on UE measurement on TRP's one or more Rx beams from CSI-RS or SSB.

Parameters related to UE Rx beam setting for monitoring NR-PDCCH on multiple beam pair links from multi-TRP are configured by higher layer signaling or MAC CE or considered in the search space design. At least, NR supports indication of spatial QCL assumption between an DL RS antenna port(s), and DL RS antenna port(s) for demodulation of DL control channel. Candidate signaling methods for beam indication for a NR-PDCCH (e.g. configuration method to monitor NR-PDCCH) are MAC CE signaling, RRC signaling, DCI signaling, specification-transparent or implicit method, and combination of these signaling methods.

For reception of unicast DL data channel from multi-TRP, NR supports indication of spatial QCL assumption between DL RS antenna port(s) and DM-RS antenna port(s) of DL data channel. Information indicating the RS antenna port(s) is indicated via DCI (downlink grants). The information indicates the RS antenna port(s) which is QCL-ed with DM-RS antenna port(s). Different set of DM-RS antenna port(s) for the DL data channel may be indicated as QCL with different set of RS antenna port(s).

Beam Failure Detection with Multi-TRP Transmission

BFD with multi-TRP transmission at a CC or multi-CCs—A UE may receive data from multi-TRP at a CC or multi-CCs. In FIG. 6A and FIG. 6B, network (e.g., gNB) may setup multiple (e.g. two) data links where UE 200 may receive data simultaneously from TRP$_1$ 201 and TRP$_2$ 202 from a specific CC (PCell or SCell). However, it is dependent on the ideal or non-ideal backhaul among TRP (e.g. TRP$_1$ 201 or TRP$_2$ 202), the network may provide multiple PDSCH through a single DCI or multiple DCI as shown in FIG. 6A, or multiple PDSCH through multiple DCI as shown in FIG. 6B, respectively.

Figures 7A, 7B:
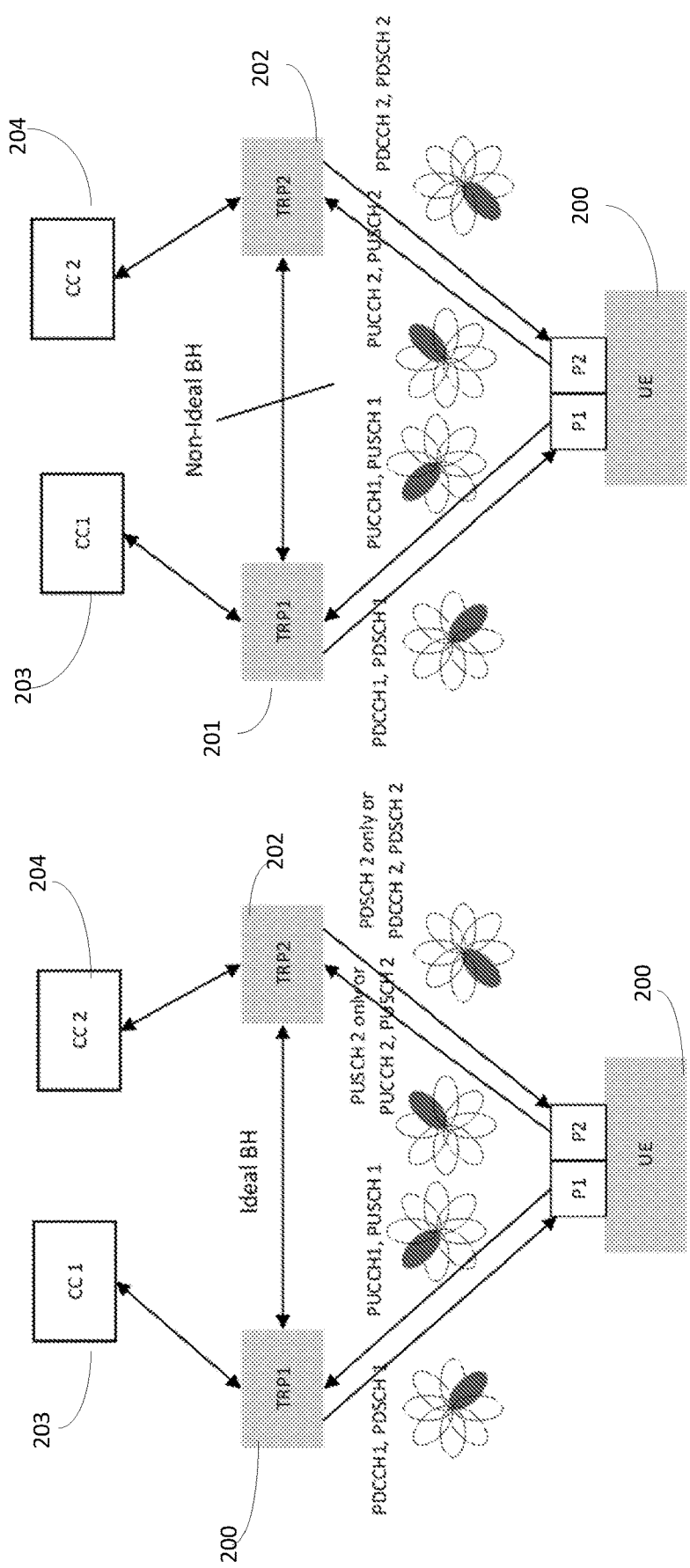
FIG. 7A illustrates an exemplary Two CCs supports two TRP transmission (a) Ideal backhaul.
FIG. 7B illustrates an exemplary Two CCs supports two TRP transmission (b) Non-ideal backhaul and UE with two panels.

In FIG. 7A and FIG. 7B, the network may setup multiple (e.g. two) data links where UE 200 may receive data simultaneously from TRP$_1$ 201 and TRP$_2$ 202 from different CCs (PCell and SCell). CC1 may be a PCell and CC2 may be an SCell or vice versa.

In NR, there are two configuration options that UE 200 can be configured for beam failure detection (BFD). In the first option, it is based on the explicit configuration method which when the higher layers (e.g. RRC) provides the reference signal (RS, e.g. CSI-RS) resources for UE 200 to perform BFD. In a second option, it is based an implicit configuration method, i.e. there is no explicit RS resources being provided for UE 200 to perform BFD. Therefore, the implicit method can be referred as the UE determines RS for BFD based on the the TCI states for respective control resource sets that the UE uses for monitoring PDCCH for a particular radion link i for a CC k. Implicit and explicit methods have been defined in NR. This is prior but it is extended herein to multi-links case, cell aggregation case, and the like.

Explicit configuration e.g., higher layer (RRC) configures the reference signal resources (e.g. CSI-RS) for beam failure detection—In a CC or multiple CCs with ideal and non-ideal backhaul cases (e.g., as shown in FIG. 6 and FIG. 7), the following explicit configuration method for BFD operation can be applied.

UE 200 may be explicitly configured with one or multiple failureDetectionResources sets $\bar{q}_{0,i,k}$ i=1 ... M$_k$, M$_k$ 1 in a (active) BWP and candidateBeamRSList $\bar{q}_{1,i,k}$ i=1 ... M$_k$ for radio link quality measurements to support beam failure detection (BFD) with multiple TRPs transmission on a component carrier (CC) k, k=1, ... , N$_{max}$, respectively, where M$_k$ denotes the maximum number of links (from different TRP or a same TRP) may be simultaneously supported at a component carrier (CC) k and where N$_{max}$ denotes the maximum number supported CCs. A radio link quality measurement to support BFD may be a hypothetical block error rate (BLER). Each link may be associated at least with a CORESET. If a UE is not configured more than N$_{max}$ CC and the maximum number of radio links may be constrained by $\Sigma_{k=1}^{N_{max}}$ M$_k$. Each set of $\bar{q}_{0,i,k}$ and $\bar{q}_{1,i,k}$, i=1 ... M$_k$, at a CC k may be independently associated with multiple sets of periodic CSI-RS resource configuration indexes or SS/PBCH blocks indexes (herein referred to as SSB indexes). UE 200 may expect the set $\bar{q}_{0,i,k}$ to include up to Q (e.g. two) RS indexes. UE 200 may expect single port RS in each set $\bar{q}_{0,i,k}$ for all i=1 ... M$_k$. The physical layer in UE 200 may assess the radio link quality according to the set $\bar{q}_{0,i,k}$ of resource configurations against the threshold $Q_{out,LR,i,k}$ (the default value of rlmInSyncOutOfSyncThreshold) for M$_k$ links. For each set $\bar{q}_{0,i,k}$, i=1 ... M$_k$, UE 200 assesses the radio link quality according to the periodic CSI-RS resource configurations or SS/PBCH blocks that are quasi co-located, with the DM-RS of PDCCH receptions monitored by UE 200.

If UE's higher layers does not provide afailureDetectionResource set $\bar{q}_{0,i,k}$ and M$_k$≥1 (e.g., with multiple links) for multi-TRP transmission at a CC k, then UE may assume other failureDetectionResource set $\bar{q}_{0,i,k}$ ∀i=1, ... $M_k$ using implicit configuration at the CC k by default. Therefore, for other link i, UE 200 can assume using the implicit configuration for BFD for link i. Unless if there is an indication from higher layer to indicate that UE 200 may assume using a failureDetectionResource set $\bar{q}_{0,i,k}$ (if configured for link i) applied for all links j≠i, j∈1 ... $M_k$ at the CC k. Similarly, if higher layer does not provide a candidateBeamRSList set $\bar{q}_{1,i,k}$ but $M_k$≥1 for multi-TRP transmission at CC k, then UE 200 may assume other candidateBeamRSList set $\bar{q}_{1,i,k}$, ∀i=1. $M_k$ using the implicit configuration at the CC k by default. Unless if there is an indication from higher layer to indicate that UE 200 may assume using afailureDetectionResource set $\bar{q}_{1,i,k}$ (if configured for link i) applied for all links j≠i, j∈1 ... $M_k$ at the CC k. Therefore, as disclosed herein the higher layer can replicate the explicit configuration for one link to other links, thus it can reduce the explicit configuration efforts.

If higher layers only provides afailureDetectionResource set $\bar{q}_{0,i,k}$ at PCell but not at SCell(s) while secondary cell group (SCG) is configured then UE 200 may assume using the failureDetectionResource set $\bar{q}_{0,i,k=1}$ at PCell to apply for some or all SCell if there is a higher layer's indication to indicate UE may apply same failureDetectionResource set from PCell to all SCell, otherwise, UE may assume SCell using implicit configuration by default. Similarly, if higher layers only provides a candidateBeamRSList set $\bar{q}_{1,i,k=1}$ at PCell but not at SCell(s) while secondary cell group (SCG) is configured then UE 200 may assume using the candidateBeamRSList set $\bar{q}_{1,i,k=1}$ at PCell to apply for all SCell if there is a higher layer's indication to indicate UE may apply same failureDetectionResource set from PCell to all SCell. Therefore, as disclosed herein the higher layer can replicate the explicit configuration for one CC to other CCs, thus it can reduce the explicit configuration efforts.

Figure 8:
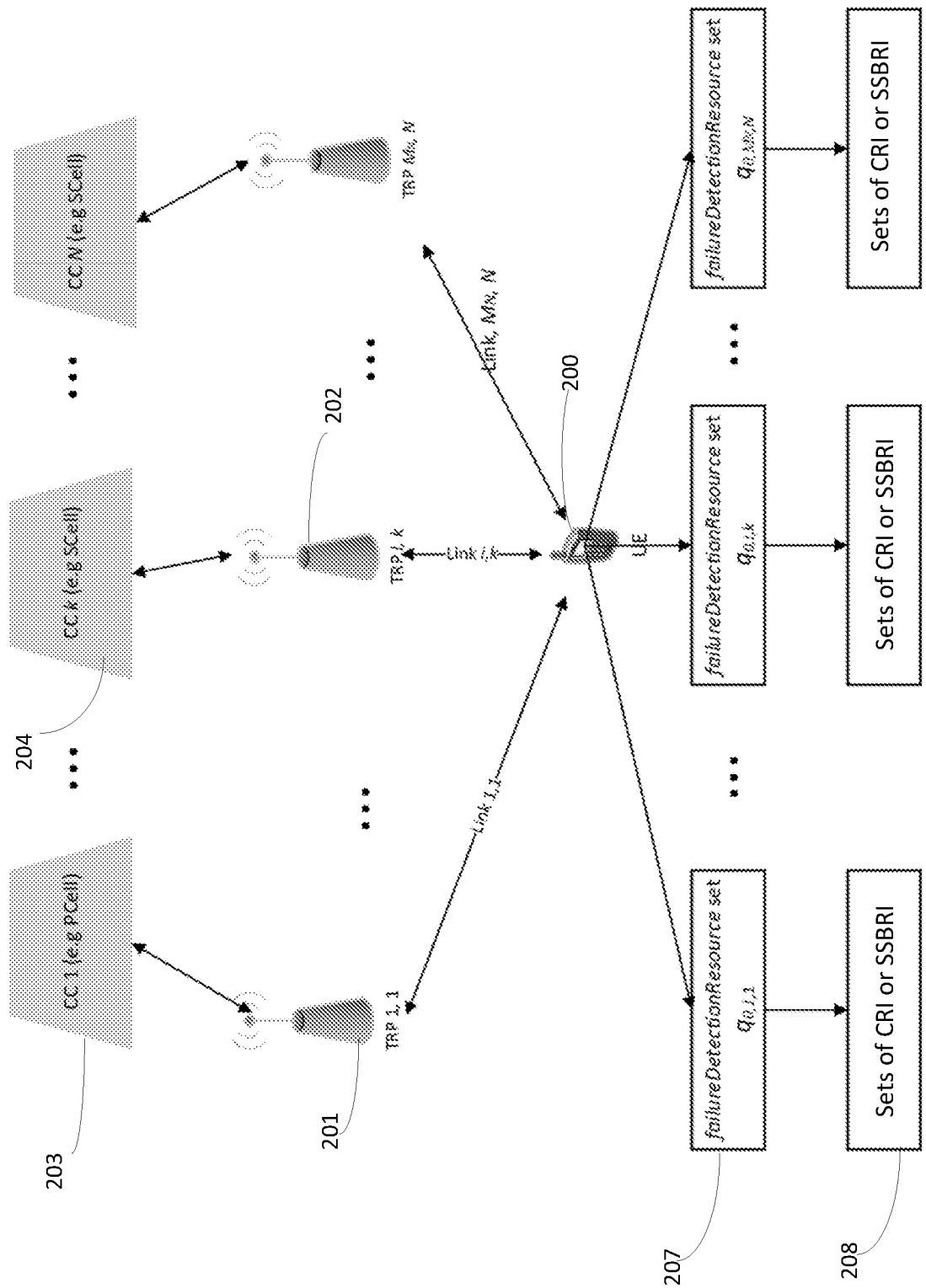
FIG. 8 illustrates an exemplary failureDetectionResource set mapping relationship between CC and radio link/multi-TRP.

In FIG. 8, an example of reference signal (RS) configuration for BFD is shown for failureDetectionResource set $\bar{q}_{0,i,k}$ i=1 ... $M_k$, k=1 ... N mapping relationship between CC and radio link (from different TRP). In FIG. 8, there may be an assumption that N is the total number of CC, and $M_k$ is number of radio links for CC k, k=1 ... N. Therefore, number of radio links may be equal to $\Sigma_{k=1}^{N} M_k$ for UE 200. Each radio link may be associated with a TRP and a TRP may be associated with a CORESET ID. Hence, TRP ID can be transparent to UE 200. Each failureDetectionResource set $\bar{q}_{0,i,k}$ (e.g., failureDetectionResource set 206) for link i at CC k may be independently provided by higher layers and each $\bar{q}_{0,i,k}$ may be associated with periodic CSI-RS resource configuration indexes (CRI) or SSB resource indexes (SSBRI) (e.g., sets 208).

In some cases, N is the number of serving cells or CCs in a band.

In some cases, N is the number of serving cells or CC configured in a serving cell or CC (referred herein as serving cell/CC) list, e.g., a list of serving cells which can be simultaneous updated for TCI relation (e.g. activation or deactivation of one or more TCI states).

In some cases, a radio link is applicable in multiple serving cells/CCs, e.g. serving cells/CCs in a band or in a list. A configured $\bar{q}_{0,i,k}$ may be applicable to another serving cell/CC m, e.g. if the serving cell/CC m is in the same band or in the same list as serving cell/CC k.

Different links (e.g. corresponding to different TRPs or sets of TRPs) may be associated with different CORESET pools. These CORESET pools may be distinguished by different CORESET pool indices, e.g. using the RRC parameter coresetPoolIndex-r16.

In some cases, the number of sets offailureDetectionResources on a BWP on serving cell/CC k, $M_k$, may be equal to the number of different CORESET pools in the BWP, e.g. the number of different values of CORESETPoolIndex in ControlResourceSet included in higher layer parameter PDCCH-Config. This may be useful for example in the multi-TRP scenario with non-ideal backhaul. A resource set k may be associated with a CORESET pool index, e.g. k=0 is associated with CORESET pool index 0 and k=1 is associated with CORESET pool index 1.

In some cases, the number of sets offailureDetectionResources on a BWP on cell/CC k, $M_k$, may be greater than the number of different CORESET pools in the BWP, e.g. $M_k$=2 even though there is a single CORESET pool on the BWP.

Multiple sets ($M_k$>1) may be configured for a BWP by configuring multiple lists, each list comprising one or more RS for BFD (e.g. failureDetectionResources). For example, if only a single list, e.g. the legacy list failureDetectionResourcesToAddModList, is configured in the active DL BWP of CC k, then $M_k$=1. If also a second list, e.g. failureDetectionResourcesToAddModList2, is configured, then $M_k$=2, etc.

Multiple sets ($M_k$>1) may be configured for a BWP by configuring a set index i=1 ... $M_k$ for one or more RS for BFD (e.g. failureDetectionResources or RadioLinkMonitoringRS) such that at least one RS is configured with i=$M_k$. In some cases, for each i≤$M_k$, at least one RS for BFD is configured with set index i. In some cases, an explicit set index value may be optionally configured for an RS for BFD (e.g. RadioLinkllonitoringRS). In other cases for which $M_k$≤2, an RS for BFD may be configured with an optional field that indicates that the RS belongs to the second set. If the optional field is absent, the RS belongs to the first set.

In some cases, $M_k$ may be explicitly configured for a BWP, e.g. in RadioLinkMonitoringConfig.

If the number of explicitly configured sets of RS, e.g. by using multiple lists or by configuring set indices per RS for BFD, is less than the configured $M_k$, then UE 200 may use both explicitly configured BFD RS and implicitly configured BFD RS. The implicitly configured BFD RS may be determined from a TCI states of a subset of the CORESETs on the BWP, for example the CORESETs corresponding to a subset of the CORESET pool indices.

In one example, a first set of BFD RS is explicitly configured, but $M_k$=2. A second set of BFD RS is implicitly determined to include RS indexes with same values as the RS indexes in the RS sets indicated by TCI-State for a set of CORESETs that UE 200 uses for monitoring PDCCH and, if there are two RS indexes in a TCI state, the set includes RS indexes with QCL-TypeD configuration for the corresponding TCI states. The set of CORESETs may correspond to a CORESET pool index, e.g. index 0 or index 1, which may be configurable.

Implicit configuration for beam failure detection—If UE 200 is not provided any failureDetectionResources, (e.g., implicit configuration for BFD) at a CC k then UE 200 may determine the failureDetectionResources set $\bar{q}_{0,i,k}$, i=1 ... $M_k$ at a CC k to include periodic CSI-RS resource configuration indexes with same values as the RS indexes in the RS sets indicated by TCI-state for respective CORESETs that UE 200 uses for monitoring PDCCH. In this case, each set for $\bar{q}_{0,i,k}$ (index i) at a CC k may be associated with a CORESET identification (controlResourceSetId ID e.g. j) via TCI-state to indicate corresponding CSI-RS or SSB when UE is not provided any failureDetectionResources from higher layers. The mapping rule for $\bar{q}_{0,i,k}$ to a CORE- SET ID j may be dependent on different deployment scenarios which will be discussed later.

In some cases, a set of BFD RS $\bar{q}_{0,i,k}$ (index i) at a CC k is associated with CORESET pool index, e.g. coresetPoolIndex-r16, for example if UE 200 is configured by higher layer parameter PDCCH-Config that includes two different values of coresetPoolIndex-r16 in ControlResourceSet. For example, UE 200 determines the set $\bar{q}_{0,0,k}$ (index i=0) to include periodic CSI-RS resource configuration indexes with same values as the RS indexes in the RS sets configured or indicated (e.g. by RRC or MAC CE) by TCI-State for respective CORESETs with coresetPoolIndex-r16 equal to p0 (p0 may be 0 or 1) that UE 200 uses for monitoring PDCCH and, if there are two RS indexes in a TCI state, the set $\bar{q}_{0,0,k}$ includes RS indexes with QCL-TypeD configuration for the corresponding TCI states. And UE 200 determines the set $\bar{q}_{0,1,k}$ (index i=1) to include periodic CSI-RS resource configuration indexes with same values as the RS indexes in the RS sets configured or indicated (e.g. by RRC or MAC CE) by TCI-State for respective CORESETs with coresetPoolIndex-r16 equal to p1 (p1 (≠p0) may be 1 or 0) that UE 200 uses for monitoring PDCCH and, if there are two RS indexes in a TCI state, the set $\bar{q}_{0,1,k}$ includes RS indexes with QCL-TypeD configuration for the corresponding TCI states. See FIG. 9.

Figure 9:
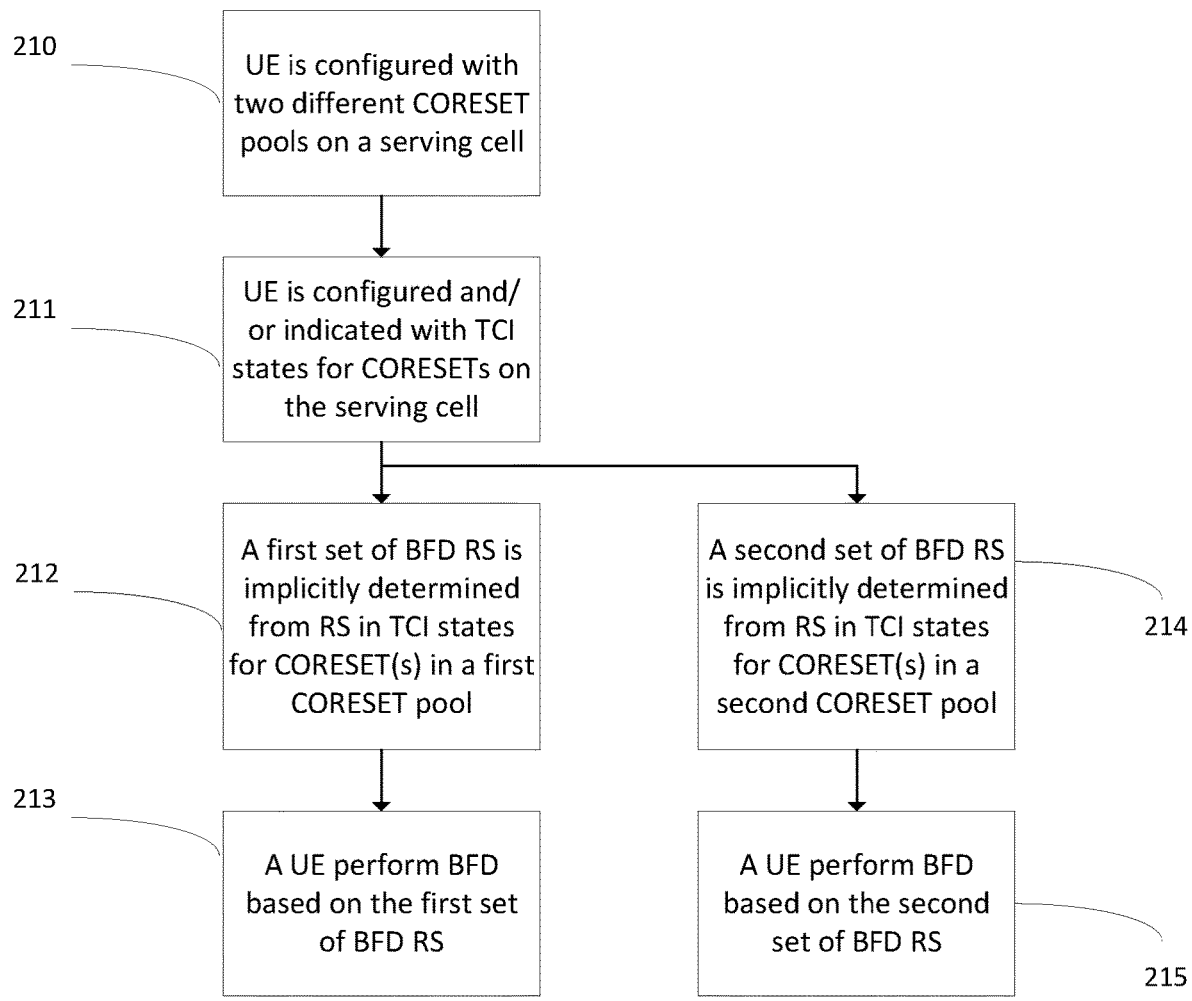
FIG. 9 illustrates an exemplary method flow for implicit beam failure detection.

FIG. 9 illustrates an exemplary method flow. As shown in FIG. 9, at step 210, UE 200 may be configured with multiple different CORESET pools (e.g., 2) on a serving cell. At step 211, UE 200 may be configured or indicated with TCI states for CORESETS on the serving cell. At step 212, a first set of BFD RS may be implicitly determined from RS in TCI states for CORESET(s) in a first CORESET pool. At step 213, UE 200 may perform BFD based on the first set of BFD RS. At step 214, a second set of BFD RS may be implicitly determined from RS in TCI states for CORESET(s) in a second CORESET pool. At step 215, UE 200 may perform BFD based on the second set of BFD RS.

For multi-TRP transmission with Ideal backhaul at a CC or multi-CC(s) as shown in FIG. 6A and FIG. 7A, respectively, a single DCI or multiple DCI may be used to schedule multiple PDSCH reception. In this case, if UE 200 is not provided any (beam) failure detection resources to monitor CSI-RS or SSB from higher layers, then UE 200 should use the RS sets indicated by TCI-state for respective (single) CORESET that UE 200 uses for monitoring PDCCH.

Single DCI scheduling of multi-TRP PDSCH may for example be applicable:
When UE 200 is configured by higher layer parameter RepSchemeEnabler set to one of 'FDMSchemeA', 'FDMSchemeB', 'TDMSchemeA', if UE 200 is indicated with two TCI states in a codepoint of the DCI field 'Transmission Configuration Indication' and DM-RS port(s) within one CDM group in the DCI field "Antenna Port(s)", or,
When UE 200 is configured by the higher layer parameter PDSCH-config that indicates at least one entry in pdsch-TimeDomainAllocationList including RepNumR16 in PDSCH-TimeDomainResourceAllocation.

Multiple DCI scheduling of multi-TRP PDSCH may for example be applicable if UE 200 is configured by higher layer parameter PDCCH-Config that includes two different values of CORESETPoolIndex in ControlResourceSet.

The following are options for BFD operation when single DCI is used to schedule multiple links for a CC shown in FIG. 6A or multiple CC(s) shown in FIG. 7A are expressed as follows in Table 1:

TABLE 1

1> If UE 200 is not provided any failureDetectionResources sets from higher layers and
  2> single PDCCH/DCI is used to schedule for multiple links from multi-TRP transmission, then UE 200 may determine the set $\bar{q}_{0,i,k}$ i = 1 ... $M_k$, k = 1 ... N to include periodic CSI-RS resource configuration indexes with same values as the RS indexes in the RS sets indicated by multiple $Q_{tci}$ TCI-states ($Q_{tci}$ ≥ 2) for respective CORESET (e.g. ID j) at PCell that UE 200 uses for monitoring PDCCH and each TCI-state may be used for each link for PDCCH reception.
  2> multiple PDCCH/DCI is used to schedule for multiple links from multi-TRP transmission, then UE 200 may determine the set $\bar{q}_{0,i,k}$ i = 1 ... $M_k$, k = 1 ... N to include periodic CSI-RS. RS resource configuration indexes with same values as the RS indexes in the RS sets indicated by first TCI-states for respective CORESETs (e.g. ID $j_1$ to $j_{M_k}$ for all CC k) that UE 200 uses for monitoring PDCCH for each link and each first TCI-state configured for CORESET may be used for each link for PDCCH reception.

For example for single PDCCH/DCI case, assuming $Q_{tci}$=2, UE may use the first TCI state configured for the CORESET for the reception of the DCI 1 (link 1) since only one DMRS port is supported for PDCCH. Therefore, the second TCI state configured for the CORESET may be used for the $2^{nd}$ PDCCH (link 2) reception. Note the $2^{nd}$ link PDSCH may not be the same CC ID with the single DCI CC ID. Therefore, if UE 200 is not provided any failureDetectionResources sets from higher layers, single DCI is used to schedule PDSCH(s) for multiple links from multi-TRP transmission, and at least one CORESET that UE 200 uses for monitoring PDCCH in serving cell/CC k is associated with multiple TCI states, then UE 200 can determine the set $\bar{q}_{0,0,k}$ (index i=0) to include periodic CSI-RS resource configuration indexes with same values as the RS indexes in the RS sets indicated by a first TCI state for a CORESET with multiple TCI states that UE 200 uses for monitoring PDCCH. UE 200 can determine the set $\bar{q}_{0,1,k}$ (index i=1) to include periodic CSI-RS resource configuration indexes with same values as the RS indexes in the RS sets indicated by a second TCI state for a CORESET with multiple TCI states that UE 200 uses for monitoring PDCCH. In the case that some CORESET(s) have a single TCI state and some CORESETs have multiple TCI states, a periodic CSI-RS resource configuration index with the same value as an RS index in an RS set indicated by a TCI state for a CORESET with a single TCI state is for example included in $\bar{q}_{0,0,k}$. In some cases, it's included in $\bar{q}_{0,0,k}$ or $\bar{q}_{0,1,k}$ depending on if the CORESET is otherwise associated with the first (i=0) or second (i=1) link, e.g. by a CORESET pool index.

Another example for multiple PDCCH/DCI case, two DCIs transmits for link 1 and 2, the corresponding CORESET ID denotes as $j_1$ and $j_2$, respectively. For example, without losing the generality, it may be assumed M=2 TRPs, link 1 from TRP1 and link 2 from TRP2 are used for transmission. Therefore, the first TCI state configured for CORESET $j_1$ as failureDetectionResources set for link 1 and the first TCI state configured for CORESET $j_2$ as failureDetectionResources set for link 2. Therefore, when UE 200 is not provided any failureDetectionResources sets from higher layers and multiple DCI is used to schedule PDSCH(s) for multiple links from multi-TRP transmission in serving cell/CC k, then UE 200 can determine the set $\bar{q}_{0,0,k}$ (index i=0) to include periodic CSI-RS resource configuration indexes with same values as the RS indexes in the RS sets indicated by TCI-State for respective CORESETs of a first set of CORESET(s) that UE 200 uses for monitoring PDCCH and, if there are two RS indexes in a TCI state, the set $\bar{q}_{0,0,k}$ includes RS indexes with QCL-TypeD configuration for the corresponding TCI states. The first set of CORESET(s) may be the CORESET(s) in the active DL BWP on serving cell/CC k with the same CORESET pool index, e.g. CORESETPoolIndex 0. Similarly, UE 200 can determine the set $\bar{q}_{0,1,k}$ (index i=1) to include periodic CSI-RS resource configuration indexes with same values as the RS indexes in the RS sets indicated by TCI-State for respective CORESET(s) of a second set of CORESET(s) that UE 200 uses for monitoring PDCCH and, if there are two RS indexes in a TCI state, the set $\bar{q}_{0,1,k}$ includes RS indexes with QCL-TypeD configuration for the corresponding TCI states. The second set of CORESET(s) may be the CORESET(s) in the active DL BWP on serving cell/CC k with the same CORESET pool index, but different from index associated with the first set of CORESET(s), e.g. CORESETPoolIndex 1.

For multi-TRP transmission with non-Ideal backhaul at a CC or multi-CC(s) as shown in FIG. 6B and FIG. 7B, respectively, multiple PDCCHs/DCIs or separated PDCCHs/DCIs may be supported to schedule multiple PDSCHs reception. In this case, UE 200 may be provided multi/separated PDCCH(s) with multi-links, therefore, UE 200 may be independent map the DCI in the CORESET to each link without ambiguity.

In this case, BFD operation with implicit configuration may use the same disclosed approach as multi-TRP transmission with Ideal backhaul at a CC or multi-CC(s). Furthermore, it should be clarified which TCI state configured for the CORESET is the default QCL assumption of the PDSCH.

BFD with multi-TRP transmission under non-DRX or DRX mode—In non-DRX mode operation, the physical layer in UE 200 may provide an indication to higher layers when the radio link quality for corresponding resource configurations for each set $\bar{q}_{0,i,k}$ i=1 . . . $M_k$, k=1 . . . N that UE 200 uses to assess the radio link quality is worse than the threshold $Q_{out,LR,i,k}$ i=1 . . . $M_k$, k=1 . . . N. The physical layer may inform the higher layers when the radio link quality is worse than the threshold $Q_{out,LR,i,k}$ with a periodicity determined by the maximum between the shortest periodicity among the periodic CSI-RS configurations or SS/PBCH blocks in the sets $\bar{q}_{0,i,k}$ i=1 . . . $M_k$, k=1 . . . N that UE 200 uses to assess the radio link quality and 2 msec.

In DRX mode operation, the physical layer may provide an indication to higher layers when the radio link quality is worse than the threshold $Q_{out,LR,i,k}$ i=1 . . . $M_k$, k=1 . . . N (e.g., for all link) with a periodicity determined as UE 200 determines the BFD periodicity as the maximum between the shortest periodicity for radio link monitoring resources, e.g., the periodic CSI-RS configurations or SS/PBCH blocks in the sets $\bar{q}_{0,i,k}$ for all links and the DRX period.

Upon request from higher layers, UE 200 may provide to higher layers the periodic CSI-RS configuration indexes or SS/PBCH block indexes from the sets $\bar{q}_{0,i,k}$ i=1 . . . $M_k$ k=1 . . . N (e.g., for all link) and the corresponding L1-RSRP measurements that are larger than or equal to the $Q_{in,LR,i,k}$ (the default value of rlmInSyncOutOfSyncThreshold) threshold.

In some cases, in non-DRX mode operation, the physical layer in UE 200 may provide an indication for link i and serving cell/CC k to higher layers when the radio link quality for corresponding resource configurations for a set $\bar{q}_{0,i,k}$ that UE 200 uses to assess the radio link quality is worse than the threshold $Q_{out,LR,i,k}$. In some cases, the physical layer informs the higher layers when the radio link quality is worse than the threshold $Q_{out,LR,i,k}$ with a periodicity determined by the maximum between the shortest periodicity among the periodic CSI-RS configurations or SS/PBCH blocks in the set $\bar{q}_{0,i,k}$ that UE 200 uses to assess the radio link quality (of link i on serving cell/CC k) and 2 msec. In some cases, the physical layer informs the higher layers when the radio link quality is worse than the threshold $Q_{out,LR,i,k}$ with a periodicity determined by the maximum between the shortest periodicity among the periodic CSI-RS configurations or SS/PBCH blocks in the union of the sets $\bar{q}_{0,i,k}$ i=1 . . . $M_k$ that UE 200 uses to assess the radio link quality (on serving cell/CC k) and 2 msec.

UE 200 may be provided, for each link i for each BWP of a serving cell/CC k, a set $\bar{q}_{1,j,k}$ (i=1 . . . $M_k$) of periodic CSI-RS resource configuration indexes or SS/PBCH block indexes by candidateBeamRSList or candidateBeamResourceList for radio link quality measurements on the BWP of the serving cell. Radio link quality for candidate beam measurement or new beam identification may be based on RSRP.

Upon request from higher layers, UE 200 may provide to higher layers for link i and serving cell/CC k the periodic CSI-RS configuration indexes or SS/PBCH block indexes from the set $\bar{q}_{1,i,k}$ and the corresponding L1-RSRP measurements that are larger than or equal to the $Q_{in,LR,i,k}$ (the default value of rlmInSyncOutOfSyncThreshold) threshold.

In various cases, $Q_{out,LR,i,k}=Q_{out,LR,k}$ for all i, or $Q_{in,LR,i,k}=Q_{in,LR,k}$ for all i. In various cases $Q_{out,LR,i,k}=Q_{out,LR}$ for all i and k, or $Q_{in,LR,i,k}=Q_{in,LR}$ for all i and k.

An exemplary UE physical layer procedure with two links or TRPs for simplicity on a serving cell k is as follows. Also see FIG. 10 as shown below. It is readily generalized to more than two links/TRPs: Firstly, for a BWP, UE 200 is configured with two sets of RS for BFD: $\bar{q}_{0,0,k}$ and $\bar{q}_{0,1,k}$. The RS in $\bar{q}_{0,0,k}$ may be transmitted from a first TRP. The RS in $\bar{q}_{0,1,k}$ may be transmitted from a second TRP. Secondly, for the BWP, UE 200 is configured with two sets of RS for new beam identification (candidate beams): $\bar{q}_{1,0,k}$ and $\bar{q}_{1,1,k}$. The RS in $\bar{q}_{1,0,k}$ may be transmitted from a first TRP. The RS in $\bar{q}_{1,1,k}$ may be transmitted from a second TRP. Thirdly, when the BWP is active, UE 200 performs BFD based on $\bar{q}_{0,0,k}$ or $\bar{q}_{0,1,k}$. When the radio link quality for all RS in $\bar{q}_{0,0,k}$ are below a threshold, the physical layer informs the higher layers about this (that the radio link quality for all RS in the set are below a threshold) with a certain periodicity. When the radio link quality for all RS in $\bar{q}_{0,1,k}$ are below a threshold, the physical layer informs the higher layers about this with a certain periodicity. Note that the indications to higher layers may be separate for link 0 and link 1. Therefore, the physical layer may at the same time inform higher layers that the radio link quality for all RS in $q_{0,0,k}$ are below a threshold, but not inform higher layers that the radio link quality for all RS in $\bar{q}_{0,1,k}$ are below a threshold, e.g. since the radio link quality of one or more RS in $\bar{q}_{0,1,k}$ is equal to or above the threshold. Fourthly, upon request from higher layers, UE 200 performs new beam identification based on one or both of $\bar{q}_{1,0,k}$ and $\bar{q}_{1,1,k}$.

Figure 10:
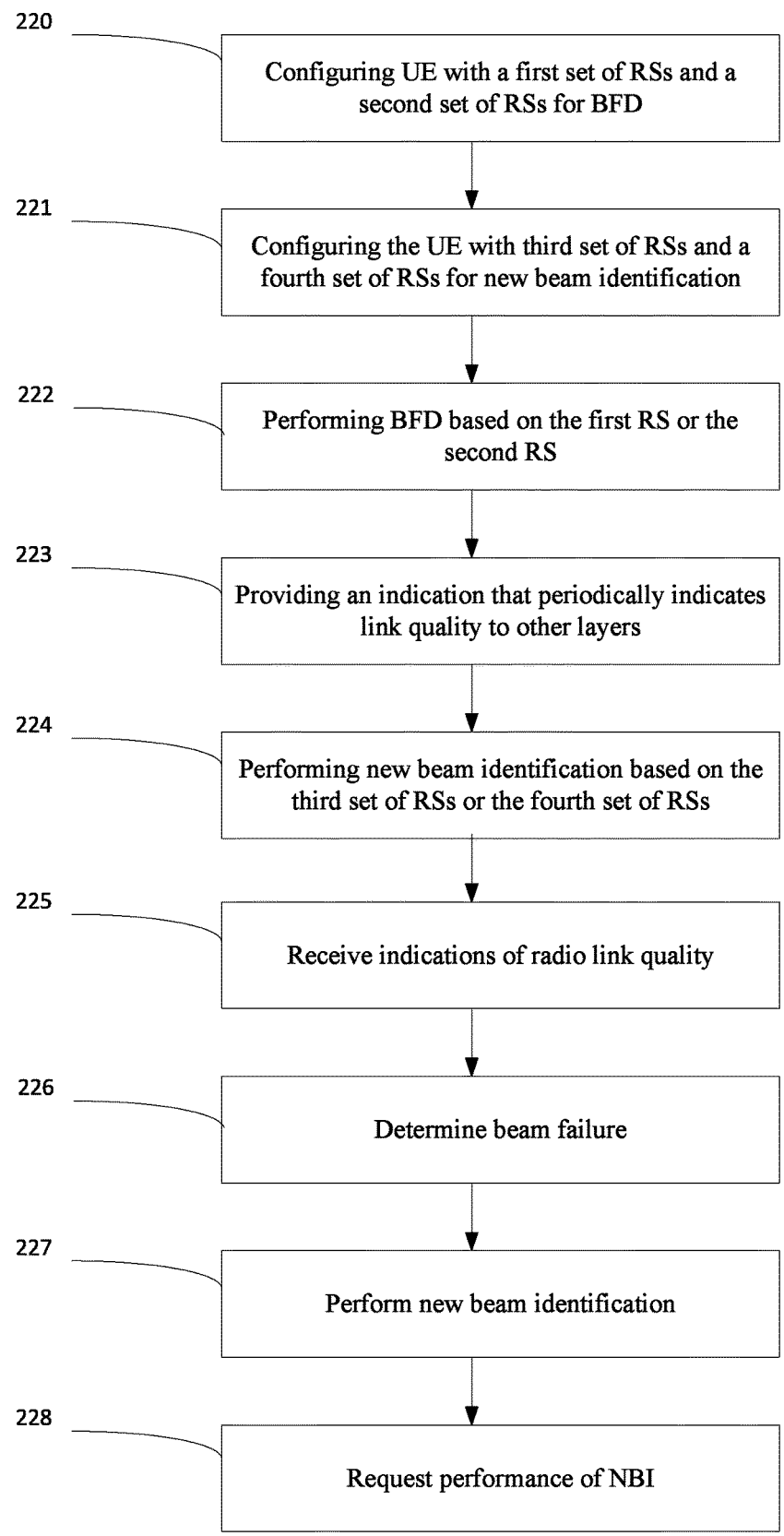
FIG. 10 illustrates an exemplary explicit configuration method for BFD operation.

Keeping the aforemention in mind, FIG. 10 provides an exemplary UE physical layer procedure flow. At step 220, for a BWP, configuring UE 200 with a first set of RSs and a second set of RSs for BFD. A first RS of the first set of RSs is transmitted from a first TRP 201. A second RS of the second set of RSs is transmitted from a second TRP 202. At step 221, for the BWP, configuring the UE 200 with third set of RSs and a fourth set of RSs for new beam identification (e.g., candidate beams). A third RS of the third set of RSs is transmitted from the first TRP 201. A fourth RS of the fourth set of RSs is transmitted from the second TRP 202. At step 222, when the BWP is active, performing, by the UE, BFD based on the first RS and the second RS. At step 223, when the radio link quality for some or all RS in the first set are below a threshold, providing an indication (e.g., signal or message), by the physical layer, that indicates to other layers about this periodically, wherein the other layers is a higher layer than the physical layer. When the radio link quality for some or all RSs in the second set are below a threshold, the physical layer indicates to other layers about this with a certain periodicity. At step 224, based on a request from a layer (e.g., higher layer than the physical layer), performing, by the UE, new beam identification based on the third set of RSs or the fourth set of RSs.

With continued reference to FIG. 10, the procedure (beam failure detection and recovery) may be distributed among two layers (PHY and MAC (higher layers)). The procedure in step 220—step 224 may be predominately the PHY part. Some of the MAC part may include the following. At step 225, MAC may receive the PHY indications of radio link quality of the first or second link (e.g., first and second link correspond to 1st and 2nd sets of RS). At step 226, upon reception of a certain number of PHY indications the MAC may declare beam failure for the first or second link. At step 227, upon beam failure of the first link, MAC requests PHY to perform new beam identification for the first link, which corresponds to the third set of RS in PHY. At step 228, upon beam failure of the second link, MAC may request PHY to perform new beam indicator (NBI) for the second link, which corresponds to the fourth set of RS in PHY. Note that throughout the layers as indicating sending or receiving indications or the like are exemplary and it is contemplated that other layers may send such indications.

A corresponding exemplary higher layer procedure is described below and see also Table 2. Firstly, per-link beam failure instance indications from lower layers may be counted (reset, increment, etc.), e.g. using BFI_COUNTER, separately for each link, e.g. separately for i=0 and 1=1. Secondly, beam failure detection timer(s) (e.g. beamFailureDetectionTimer) may be separately maintained, started or restarted for each link, e.g. separately for 1=0 and 1=1. Thirdly, beam failure is detected separately for each link, based on the corresponding per-link indications from lower layers. Fourthly, lower layers can be requested to perform new beam identification (e.g. providing the periodic CSI-RS configuration indexes or SS/PBCH block indexes from a set $\bar{q}_{1,i,k}$ and the corresponding L1-RSRP measurements that are larger than or equal to a threshold) for a link i, e.g. a link i for which the higher layer has detected beam failure. An exemplary MAC-layer procedure is described below in Table 2.

TABLE 2

The following UE variables are used for the beam failure detection procedure:
- BFI_COUNTER (per Serving Cell and link): counter for beam failure instance indication which is initially set to 0.

The MAC entity shall for each Serving Cell configured for beam failure detection:
1>if beam failure instance indication for link i has been received from lower layers:
    2>start or restart the beamFailureDetectionTimer for link i;
    2>increment BFI_COUNTER for link i by 1;
    2>if BFI_COUNTER for link i >= beamFailureInstanceMaxCount:
        3>if the Serving Cell is SCell:
            4>trigger a BFR for this Serving Cell and link i;
        3>else:
            4>initiate a Random Access procedure for link i (see clause 5.1 in 3GPP spec 38.321) on the SpCell.
1>if the beamFailureDetectionTimer for link i expires; or
1>if beamFailureDetectionTimer, beamFailureInstanceMaxCount, or any of the reference signals used for beam failure detection for link i is reconfigured by upper layers associated with this Serving Cell:
    2>set BFI_COUNTER for link i to 0.
1>if the Serving Cell is SpCell and the Random Access procedure for link i initiated for SpCell beam failure recovery is successfully completed (see clause 5.1 in 3GPP spec 38.321):
    2>set BFI_COUNTER for link i to 0;
    2>stop the beamFailureRecoveryTimer for link i, if configured;
    2>consider the Beam Failure Recovery procedure for link i successfully completed.
1>else if the Serving Cell is SCell, and a PDCCH addressed to C-RNTI indicating uplink grant for a new transmission is received for the HARQ process used for the transmission of the BFR MAC CE or Truncated BFR MAC CE which includes beam failure recovery information of this Serving Cell and link i; or
1>if the SCell is deactivated as specified in clause 5.9 in 3GPP spec 38.321:
    2>set BFI_COUNTER for each link on the cell to 0;
    2>consider the Beam Failure Recovery procedure (for each link for which BFR has been triggered and not cancelled) successfully completed and cancel the triggered BFRs for this Serving Cell.

The MAC entity shall:
1>if the Beam Failure Recovery procedure determines that at least one BFR has been triggered and not cancelled:
    2>if UL-SCH resources are available for a new transmission and if the UL-SCH resources can accommodate the BFR MAC CE plus its subheader as a result of LCP:

TABLE 2-continued

```
3>instruct the Multiplexing and Assembly procedure to generate the BFR MAC CE.
2>else if UL-SCH resources are available for anew transmission and if the UL-SCH
    resources can accommodate the Truncated BFR MAC CE plus its subheader as a
    result of LCP:
    3>instruct the Multiplexing and Assembly procedure to generate the Truncated BFR
        MAC CE.
2>else:
    3>trigger the SR for SCell beam failure recovery for each SCell and link for which
        BFR has been triggered and not cancelled.
All BFRs triggered prior to MAC PDU assembly for beam failure recovery for a SCell shall be
cancelled when a MAC PDU is transmitted and this PDU includes a BFR MAC CE or
Truncated BFR MAC CE which includes beam failure information of that SCell and link.
```

Beam Failure Request with Multi-TRP Transmission

To support multi-TRP transmission, the disclosed subject matter may support using PUCCH or CFRA for beam failure recovery request (BFRQ) transmission. During a BFR procedure, UE 200 may report only one (e.g., the best) beam with corresponding to the measured CSI-RS resource index (CRI) or synchronization signal block (SSB) resource index (SSBRI) only per TRP at a CC.

To support BFR with multi-TRP transmission at a CC or multiple CC, may disclose the following options: 1) BFR use contention-free PRACH; 2) BFR use PUCCH; 3) BFR use contention-free 2-step RACH; or 4) BFR use PUSCH.

Methods herein are disclosed with regard to how to perform BFR via UL signal (PRACH)/channel (PUCCH, PUSCH) with multi-panel transmission and multi-TRP at a CC or multiple CC.

The disclosed scenarios may be considered for BFR operation with multi-TRP or multi-panel. In a first scenario, there may be single CC use multi-TRP transmission with (a) Ideal backhaul UE with multi-panels or (b) Non-ideal backhaul and UE with multi-panels. In a second scenario, there may be multi-CC (with both DL and UL) use multi-TRP transmission with (a) Ideal backhaul UE with multi-panels or (b) Non-ideal backhaul and UE with multi-panels. In a third scenario, there may be multi-CC (some with both DL and UL but some CC with DL only) use multi-TRP transmission with (a) Ideal backhaul and UE with multi-panels or (b) Non-ideal backhaul and UE with multi-panels.

As shown in FIG. 6A and FIG. 6B, a CC (with both DL and UL) with multi-TRP with ideal-backhaul and non-ideal backhaul, and UE 200 may equip with multi-panel for BFR are shown respectively. In this case, UE 200 may use single DCI to schedule multi-links (e.g. from different TRP) and use single UCI for joint UCI for multi-links (e.g. from different panel).

As shown in FIG. 7A and FIG. 7B, multiple CC (with both DL and UL) with multi-TRP with ideal-backhaul and non-ideal backhaul, and UE 200 may equip with multi-panel for BFR are shown respectively. In this case, UE 200 may use multiple DCI to schedule multi-links (e.g. from different TRP) and use multiple UCI for multi-links (e.g. from different panel).

Figure 14:
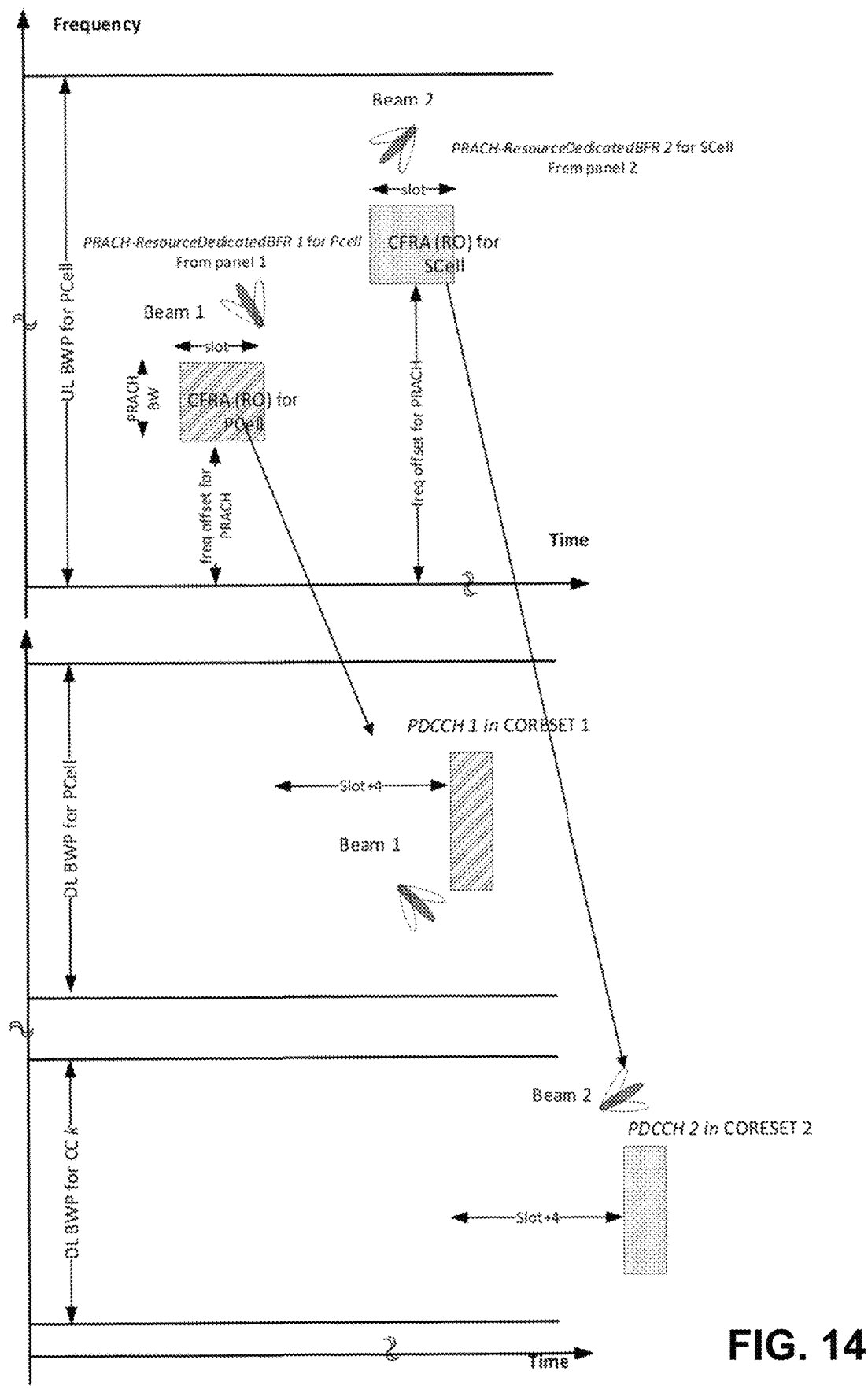
FIG. 14 illustrates an exemplary BFR use CFRA transmission when multiple CC is with both DL and UL.

If CC 204 (SCell) with DL only, e.g., there is no UL transmission for CC 204 as shown in FIG. 14, then UE 200 may transmit UCI at the CC with both DL and UL (e.g. PCell). If UE 200 equips with multi-panel for UL transmission, then UE's multi-panel may be used to transmit multi-UCI to a same TRP as shown in FIG. 11.

BFR use contention-free PRACH—Beam failure recovery request (BFRQ) may use contention-free PRACH (CFRA). If a CC is configured with both DL and UL, then in this case, PRACH transmission for BFR may be performed at the same CC. Dependent on the number of links from multi-TRP may be supported at the CC, one or multiple PRACH resource(s) for BFR may be configured by the same CC.

For CC (e.g., SCell) with DL only, the CC may not have UL transmission. Therefore, BFR use CFRA should be performed at the CC with both DL and UL.

BFRQ may be categorized in multiple ways, such as partial beam failure or full beam failure. With reference to partial beam failure, in multi-TRP transmission, UE 200 may be configured with multi-links for simultaneous transmission. Therefore, it may occur in a partial beam failure case, which means at least one of beam failure occurring among multiple links (from multi-TRP) but not all of them. In this case, BFRQ may be performed at those links where there is no beam failure.

A CC with both DL and UL—For a CC with both DL and UL (e.g. PCell or a SCell is configured with both DL and UL), then UE 200 may be configured with multiple $M_k$ (where $M_k$ denotes the supported number of multi-TRP transmission for UE 200 at CC k) PRACH-ResourceDedicatedBFR per CC k configuration(s). See Table 3.

TABLE 3

```
1>  If UE 200 is provided with multiple recoverySearchSpaceId for each link i, i ∈ {1 ... M_k}
    configured by CORESET (e.g. j) at a CC k, then
    2>   UE 200 does not expect to be provided another search space set to monitor PDCCH
         configured by CORESET (e.g. j) associated with the search space set provided by
         recoverySearchSpaceId. The number of links M_k per CC may not be greater than the
         max number of CORESET per CC.
```

UE 200 may initiate one or more CFRA transmission via using PRACH (where the PRACH resource e.g. PRACH-ResourceDedicatedBFR is indicated (e.g., mapped) by the beam candidate from periodic CSI-RS or SSB) for link i, where i∈{1 ... $M_k$} for a CC k at the slot n. Therefore, the PRACH resource selection can be based on the quasi co-location parameters associated with periodic CSI-RS or SS/PBCH block associated with index $q_{new,i}$ for a CC k, where at CC k has one-to-one mapping with CFRA resource. Further disclosed herein, the link ID (or CORESET ID) may be signaled with CFRA transmission occasion. UE 200 may be configured with one or multiple CFRA transmission occasion. See Table 4.

TABLE 4

1> If UE 200 monitor PDCCH in a search space set provided by recoverySearchSpaceId for link i, i ∈ {1 ... $M_k$}) configured by CORESET j, for detection of a DCI format with CRC
scrambled by C-RNTI or MCS-C-RNTI which may start from slot n + w (e.g. w = 4) within a window configured by BeamFailureRecoveryConfig then
UE 200 can use RS $q_{new, i}$ as the spatial information using CFRA transmission for BFR (e.g., QCL-Type D between CFRA and RS $q_{new, i}$ may be assumed). UE 200 can choose from a link i, i ∈ {1 ... $M_k$} with (the best) downlink quality as the spatial information for CFRA transmission when the partial beam failure occurs. Here, the best DL quality i, i ∈ {1 ... $M_k$} may be referred as the best RSRP from DL link i ∈ {1 ... $M_k$} with QCL-type D. This is because link i with the best quality for BFR of the bad link.

If UE 200 equips with $M_p$>1 panels (e.g. UE is equipped with multiple transmission panels) then it may be up to UE 200 implementation, UE 200 can randomly choose one panel or multiple panels for multiple contention-free PRACH transmission. Dependent on UE 200 ability, if UE 200 supports simultaneous multiple UL transmission which may be based on spatial division multiplexing (SDM) or FDM, then UE 200 may perform simultaneous multiple CFRA for BFR. UE 200 may report its ability of support simultaneous multiple UL transmission due to multi-panel to network (e.g., gNB).

If UE 200 equips with a single transmission panel (e.g. $M_p$=1) and there are more than one PRACH need to be transmitted for BFR (e.g. more than one BFR report), and the corresponding CFRA resources for different links (e.g. from CORESET/TRP i and CORESET/TRP j) are time-frequency overlapped; then UE 200 may defer one of them to the next available CF-RACH occasion (RO).

UE 200 may transmit the panel ID with CFRA. UE 200 panel ID may be signalled in a CFRA resource when UE 200 is equipped more than one panel ($M_p$>1). If beam failure occurs for all link. In this case, UE 200 may initiate multiple CFRA transmission simultaneously. Similar to the partial BFR case when there is more than one CFRA needs to be transmitted, dependent on UE 200 ability, if CFRA resource for link i and j are time-frequency overlapped, then UE 200 may transmit multiple PRACH for link i (e.g. from TRP i) and link j (e.g. from TRP j) at the same time, or defer one of them to the next available RO.

Figures 11A, 11B:
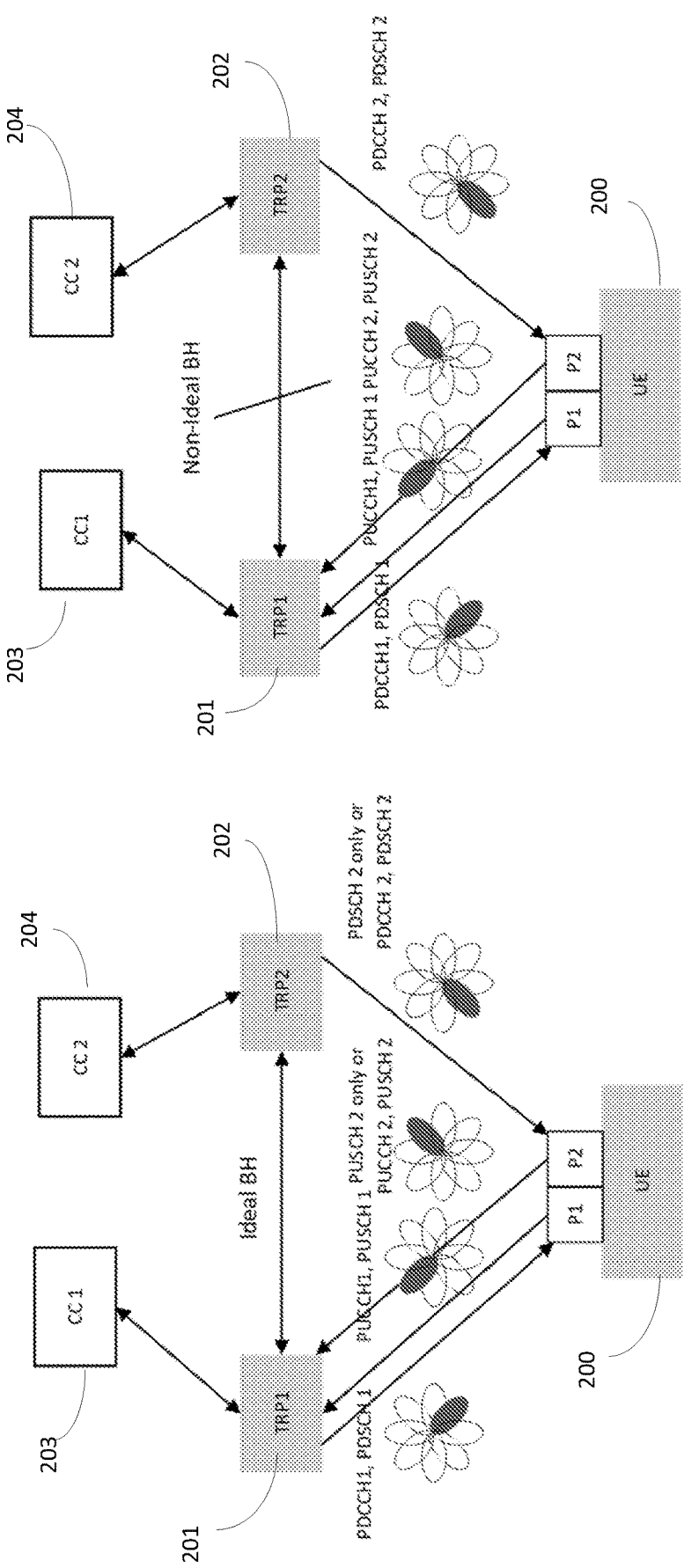
FIG. 11A illustrates an exemplary Two CC (CC 1 with DL and UL, but CC 2 with DL only) use two TRP (a) Ideal backhaul.
FIG. 11B illustrates an exemplary Two CC (CC 1 with DL and UL, but CC 2 with DL only) use two TRP (b) Non-ideal backhaul and two panels.
Figure 13:
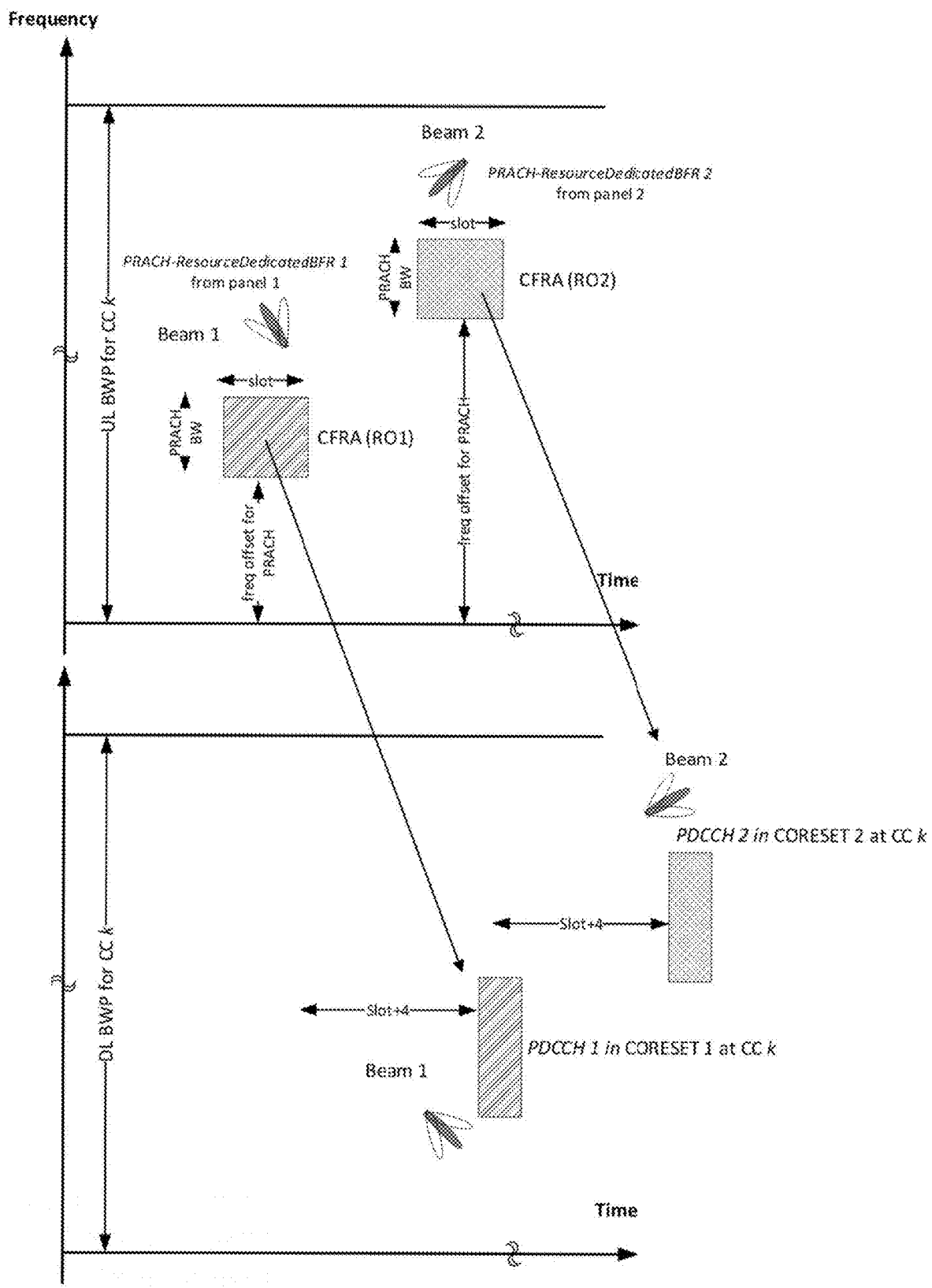
FIG. 13 illustrates an exemplary BFR use CFRA transmission when a CC with both DL and UL.

For example, there may be an assumption that two DL and UL links are setup for CC 203, and DL link 1 is from $TRP_1$ 201 and DL link 2 is from $TRP_2$ 202 at CC k=1, respectively as shown in FIG. 11A or FIG. 11B. In addition, UE 200 may equip with 2 panels and each panel may equip a transmit and receive unit (TXRU), e.g. UL link 1 to $TRP_1$ 201 and UL link 2 to $TRP_2$ 202, at CC k=1 respectively. In this scenario, BFR using CFRA is depicted in FIG. 13.

For example, there may be an assumption that two DL and UL links are setup. DL link 1 may be from $TRP_1$ 201 at CC 203, and DL link 2 may be from $TRP_2$ 202 at CC 204, respectively as shown in FIG. 7A or FIG. 7B. In addition, UE 200 may equip with 2 panels, e.g. UL link 1 to $TRP_1$ 201 at CC 203 and UL link 2 to $TRP_2$ 202 at CC 204, respectively. In this scenario, BFR use CFRA is depicted in FIG. 14.

However, if the CC is configured with DL only as shown in FIG. 14, then it may not be possible to configure any UL transmission at the CC, therefore, CFRA transmission for BFR may perform at PCell or those CC with DL and UL.

For a CC with both DL only (e.g., a SCell is configured with DL only) as shown in FIG. 14, there may be no available UL for PRACH transmission for the CC. If UE 200 is provided recoverySearchSpaceId for link i∈{1 ... $M_k$} configured by the CORESET then UE 200 may initiate one or more than one CFRA transmission (beam associated type may be indicated by PRACH-ResourceDedicatedBFR) for link i∈$M_k$) at the PCell in a specific slot n and according to the antenna port quasi co-location (QCL) parameters associated with the periodic CSI-RS resource configuration or with SS/PBCH block associated with index $q_{new,i}$ (at a SCell) provided by higher layers UE 200 may monitor PDCCH in a search space set provided by recoverySearchSpaceId TRP i∈{1 ... $M_k$}) in the CORESET (e.g. j) at each CC (SCell) or PCell. The CRC for the monitored DCI format for BFR may be scrambled by C-RNTI or MCS-C-RNTI starting from slot n+w (e.g. w=4) within a window configured by BeamFailureRecoveryConfig.

Dependent on UE 200 ability, e.g. a UE may equip with number of panel(s), denotes as $M_p$, if there are more than one CFRA has to be simultaneously transmitted for SCell or PCell, and those CFRA resources are time-frequency overlapped in PCell, then UE 200 can determine transmitting multiple for BFR simultaneously, or defer one of BFR using CFRA to the next available contention-free PRACH transmission occasion (RO).

recoverySearchSpaceId may be independent separately for each SCell when without UL, therefore, there may be no need to distinguish the failed SCell ID.

Figure 15:
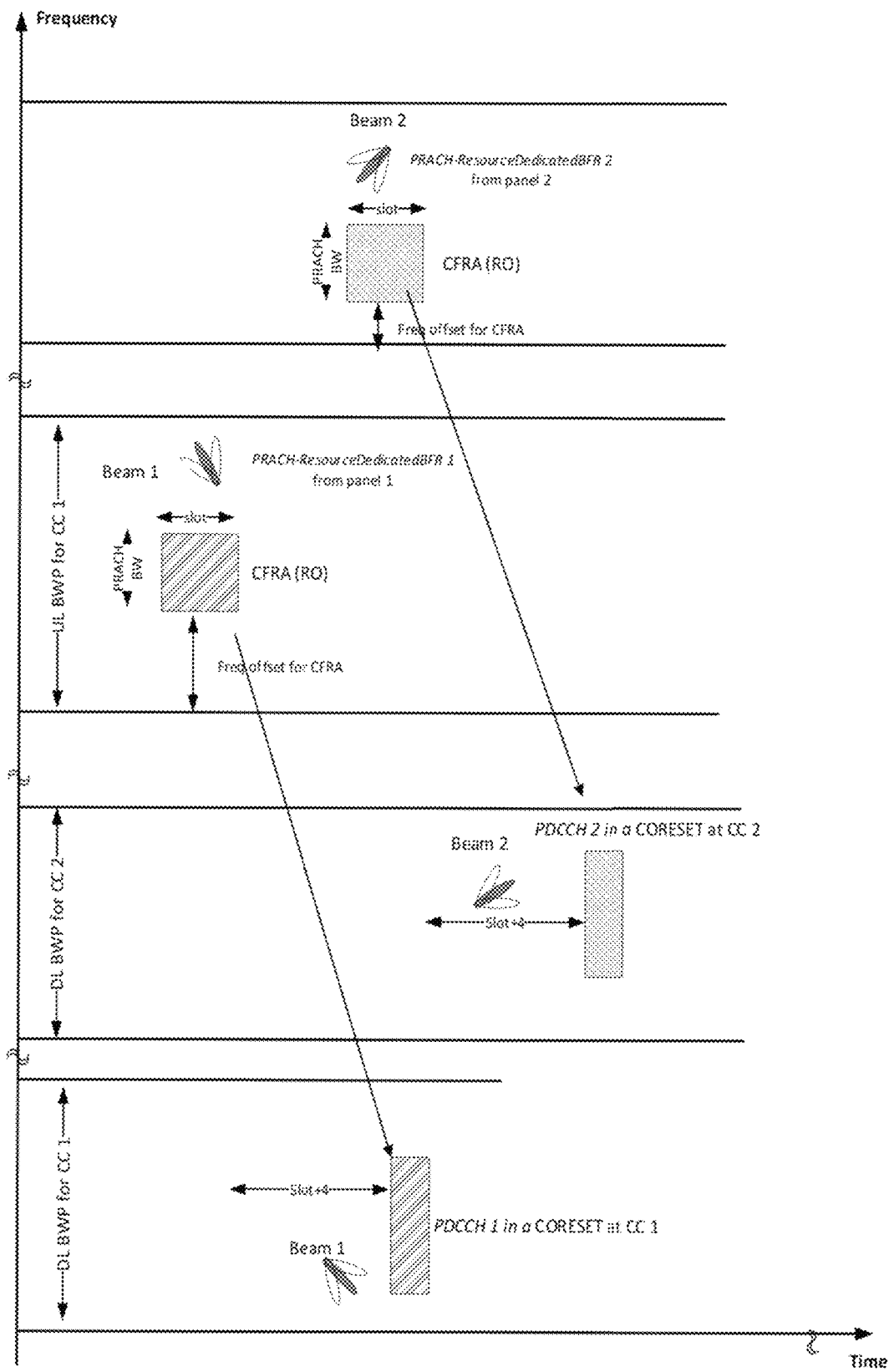
FIG. 15 illustrates an exemplary BFR use CFRA transmission when one CC is with both DL and UL but second one is DL only.

For example, there may be an assumption that multiple (e.g., 2) DL and UL links are setup. DL link 1 is from $TRP_1$ 201 at CC 203, and DL link 2 is from $TRP_2$ 202 at CC 204, respectively as shown in FIG. 14. However, CC 204 may be DL only. In addition, UE 200 equips with 2 panels. Therefore, both UL link 1 and 2 are to $TRP_1$ 201 at CC 203. In this scenario, BFR use CFRA is depicted in FIG. 15.

For PDCCH monitoring in a search space set provided by recoverySearchSpaceId i for link i∈{1 ... $M_k$} configured by CORESET (e.g. j) for corresponding PDSCH reception, UE 200 may assume the same antenna port quasi-collocation parameters as the ones associated with index $q_{new,i}$ for link i∈{1 ... $M_k$} until UE 200 receives by higher layers an activation for a TCI state or any of the parameters TCI-StatesPDCCH-ToAddlist or TCI-StatesPDCCH-ToReleaseList. After UE 200 detects a DCI format with CRC scrambled by C-RNTI or MCS-C-RNTI in the search space set provided by recoverySearchSpaceId configured by the CORESET (e.g. j) UE 200 may continue to monitor PDCCH candidates in the search space set provided by recoverySearchSpaceId until UE 200 receives a MAC CE activation command for a TCI state or TCI-StatesPDCCH-ToAddlist or TCI-StatesPDCCH-ToReleaseList for link i (e.g. from TRP i).

After $N_{rec}$ (e.g $N_{rec}$=28) symbols from a last symbol of a first PDCCH reception in a search space set provided by recoverySearchSpaceId for TRP i∈{1 ... $M_k$} where a UE detects a DCI format with CRC scrambled by C-RNTI or MCS-C-RNTI, UE 200 assumes same antenna port quasi-collocation parameters as the ones associated with index $q_{new,i}$ or PDCCH monitoring configured by a CORESET (e.g. j) with index 0.

BFR can be transmitted via PUCCH/UCI—For beam failure reporting with multi-TRP transmission at a CC with both DL and UL, UE 200 may be configured with the following: 1) PUCCH or PRACH BFR resource; or 2) both PUCCH and PRACH. When both PUCCH and PRACH, they may be both used whenever PUCCH resource for BFR or PRACH resource for BFR are available, when both PUCCH and PRACH are configured, it may be up to UE implementation on using which one resource for BFR.

A dedicated PUCCH transmission occasion (UO) at slot n may be configured for UE 200 conveying beam failure event.

The dedicated PUCCH resource for PUCCH occasion may be provided by higher layers (RRC). The configuration parameters may include PUCCH format, starting PRB/PRB offset, frequency hopping (inter-slot, intra-slot), periodicity, first symbol (Starting Symbol)/startingSymbolIndex, number of symbols/nrofSymbols, initial CS indexes (initialCyclicShift), number of PRBs/nrofPRBs, time-domain OCC (occ-Length, occ-Index), additional DM-RS, maximum code rate, number of slots, pi2BPK and ssb-perPUCCH-Occasion. As shown in FIG. 11A or FIG. 11B, a dedicated PUCCH transmission occasion may be configured for BFR using PUCCH. When BFR using PUCCH, gNB can configure a periodic PUCCH resource for BFRQ transmission. However, if there is no BFR at the PUCCH occasion, then there may be no UCI/PUCCH transmission.

In case of prioritization, priority rule for the UCI may be defined as: BFR>HARQ-ACK/SR>periodical CSI (P-CSI).

If there is a BFR transmitted on a dedicated PUCCH, then UE 200 may monitor PDCCH at slot n+4 in a search space configured by the link i configured by CORESET (e.g. j), associated with link (e.g. from TRP i) for corresponding beam recovery PDSCH reception. If recoverySearchSpaceId has been configured by the CORESET, then UE 200 may use recoverySearchSpaceId to perform blind detection for the recovered PDCCH. If there is no recoverySearchSpaceId has been provided, then UE 200 may assume the search space ID used by the COREST for PDCCH reception. Here, in contract to BFR using CFRA, there may be no need to allocate a special CORESET for UE 200 to monitor the beam recovery. Instead, UE 200 may monitor the link for PFCCH where BFR occurs.

UE 200 may assume the same antenna port quasi-collocation parameters as the ones associated with index $q_{new,i}$ for link/TRP i∈{1 . . . . $M_k$} until UE 200 receives by higher layers an activation for a TCI state or any of the parameters TCI-StatesPDCCH-ToAddlist or TCI-StatesPDCCH-ToReleaseList. After UE 200 detects a DCI format with CRC scrambled by C-RNTI or MCS-C-RNTI in the search space set in the CORESET (e.g. j) UE 200 may continue to monitor PDCCH candidates in the search space set provided in the CORESET (e.g. j) until UE 200 receives a MAC CE activation command for a TCI state or TCI-StatesPDCCH-ToAddlist or TCI-StatesPDCCH-ToReleaseList for link/TRP i.

TRP i identification, e.g., maps to CORESET ID i may be conveyed at UL DM-RS for PUCCH BFR. For example, without applying UL precoding, e.g. precoding by DFT, UE 200 may assume the PUCCH demodulation reference-signal (DM-RS) sequence $r_l(m)$ for OFDM symbol number l within the slot. $n_{s,f}^\mu$ may be the slot number within a frame $$r_l(m) = \frac{1}{\sqrt{2}}(1 - 2c(2m)) + j\frac{1}{\sqrt{2}}(1 - 2c(2m+1))m = 0, 1, \ldots$$

The pseudo-random sequence generator may be function of TRP i (e.g., maps to CORESET ID i) may be initialized with $$c_{init} = \left(2^{17}(N_{symb}^{slot}n_{s,f}^\mu + l + 1)(\bar{l} + 1)\left(\left\lfloor\frac{2N_{ID}^0}{M}\right\rfloor + 1\right) + 2N_{ID}^0\right)\mod 2^{31}$$

Where $N_{ID}^0 \in \{0,1, \ldots, 65535\}$ is given by the higher-layer parameter scramblingID0 in the DMRS-UplinkConfig IE if provided and by $N_{ID}^{cell}$ otherwise, $\bar{\kappa}$=mod(CORESET$_i$, M)∈0 . . . M−1, and M (e.g. M=2) is the maximum number of TRP at a CC. If UE 200 is configured with both dmrs-UplinkForPUSCH-MappingTypeA and dmrs-UplinkForPUSCH-MappingTypeB, scramblingID0 may be obtained from dmrs-UplinkForPUSCH-MappingTypeB.

Like the use cases for BFR using CFRA, BFR using PUCCH resource may be dependent on one or more of the following deployment cases. In a first deployment case, for multi-TRP transmission with ideal backhaul at a CC or multi-CC(s) as shown in FIG. 6A and FIG. 7A, respectively, a single-DCI may be used to schedule multiple PDSCH reception. In this case, a dedicated PUCCH transmission occasion for multi-link (from multi-TRP) may be used, and the link/TRP ID may be indicated by the DM-RS for BFR PUCCH.

In a second deployment case, if UE 200 equips multiple panel $M_p \geq 1$ for UL transmission, depends on its ability, UE 200 may decide which panel is used for BFR PUCCH transmission or simultaneously perform multiple BFR UCI/PUCCH. UE 200 may assume using the spatial information with identified $q_{new,i}$ for BFR PUCCH transmission. Panel ID may be transparent for a network because a network may not require to know panel ID for BFR PUCCH reception since link failure ID may be conveyed by DM-RS for BFR PUCCH.

In a third scenario, if UE 200 equips multiple panel $M_p \geq 1$ for UL transmission, UE 200 may transmit panel ID with BFR PUCCH.

In a fourth scenario, for multi-TRP transmission with non-Ideal backhaul at a CC or multi-CC(s) as shown in FIG. 6B and FIG. 7B, respectively, multi/separated-DCIs may be used to schedule multiple PDSCH reception. In this case, UE 200 may be configured with separated dedicated PUCCH transmission occasions for BFR in a CC. Those separated dedicated PUCCH transmission occasions may be based on TDM, FDM, or time-frequency overlapped via SDM.

In a fifth scenario, if SCell is with DL only, BFR PUCCH may be configured at PCell. BFR PUCCH resources may be configured based on ideal or non-ideal backhaul among TRPs.

Figure 16:
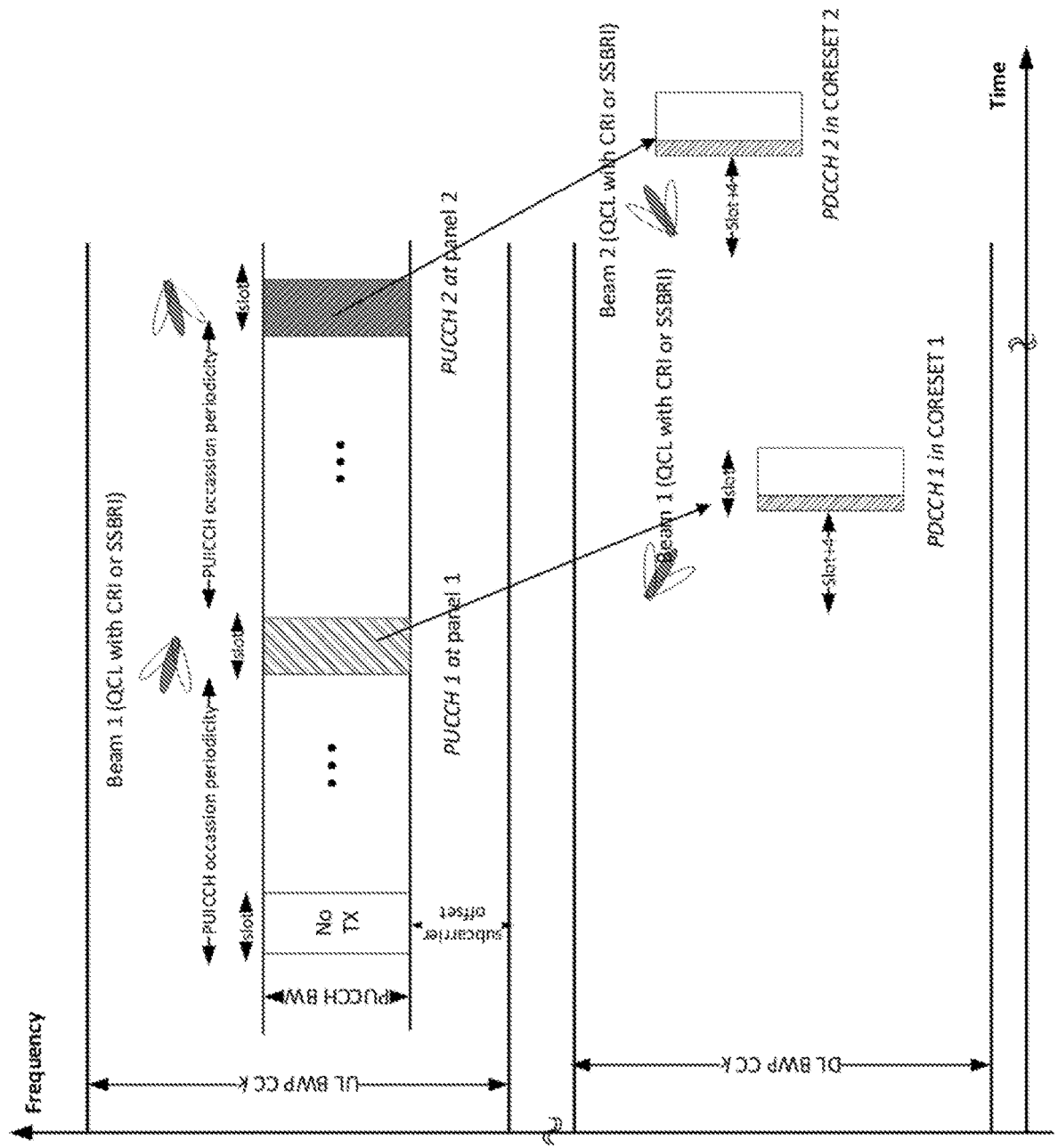
FIG. 16 illustrates an exemplary PUCCH transmission occasion for BFR at a CC with DL and UL ideal backhaul.

A difference between BFR using PUCCH and CFRA is multiple BFR requests may be reported at a dedicated PUCCH occasion instead of using multiple CFRA resource. For example, there may be an assumption that multiple DL and UL links are setup for CC 203, and DL link 1 is from TRP$_1$ 201 and DL link 2 is from TRP$_2$ 202 at CC k=1, ideal backhaul between TRP$_1$ 201 and TRP$_2$ r202 respectively as shown in FIG. 6A. In addition, UE may equip with 2 panels, e.g. UL link 1 to TRP$_1$ 201 and UL link 2 to TRP$_2$ 202 at CC k=1 respectively. In this scenario, BFR use PUCCH is depicted in FIG. 16.

Figure 17:
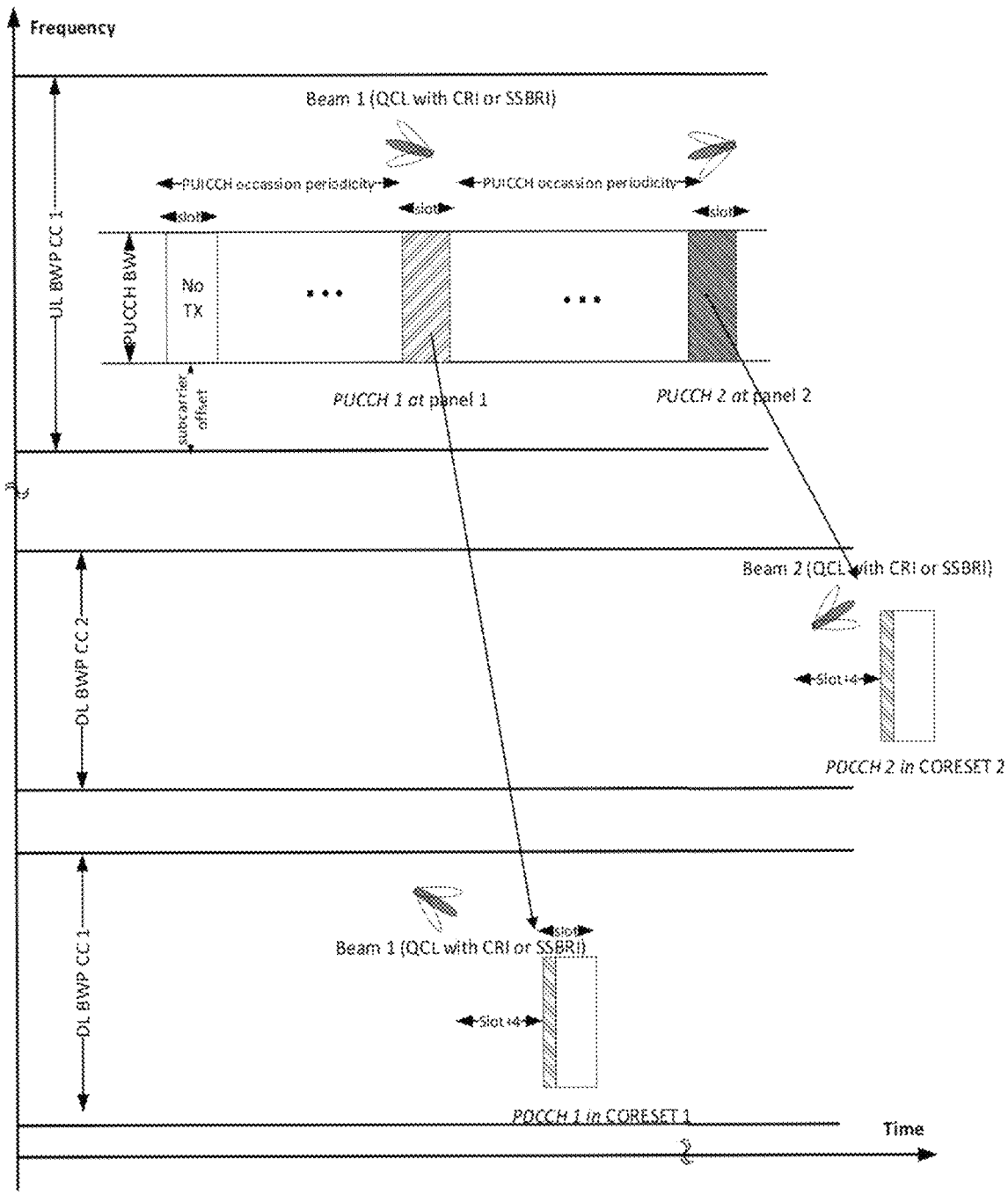
FIG. 17 illustrates an exemplary PUCCH transmission occasion for BFR at multiple (two) CC with DL and UL ideal backhaul.

For example, there may be an assumption that multiple DL and UL links are setup. DL link 1 is from TRP$_1$ 201 at CC 203, and DL link 2 is from TRP$_2$ 202 at CC 204, ideal backhaul between TRP$_1$ 201 and TRP$_2$ 202 respectively as shown in FIG. 7A. In addition, UE 200 equips with 2 panels, e.g. UL link 1 to TRP$_1$ 201 at CC 203 and UL link 2 to TRP$_2$ 202 at CC 204, respectively. For this scenario, BFR use PUCCH is depicted in FIG. 17. In this case, BFR transmission using PUCCH may be transmitted at UL CC 203 and link/TRP ID may be distinguished by DM-RS for BFR PUCCH. Therefore, only CC 203 may be configured using PUCCH for BFR.

Figure 18:
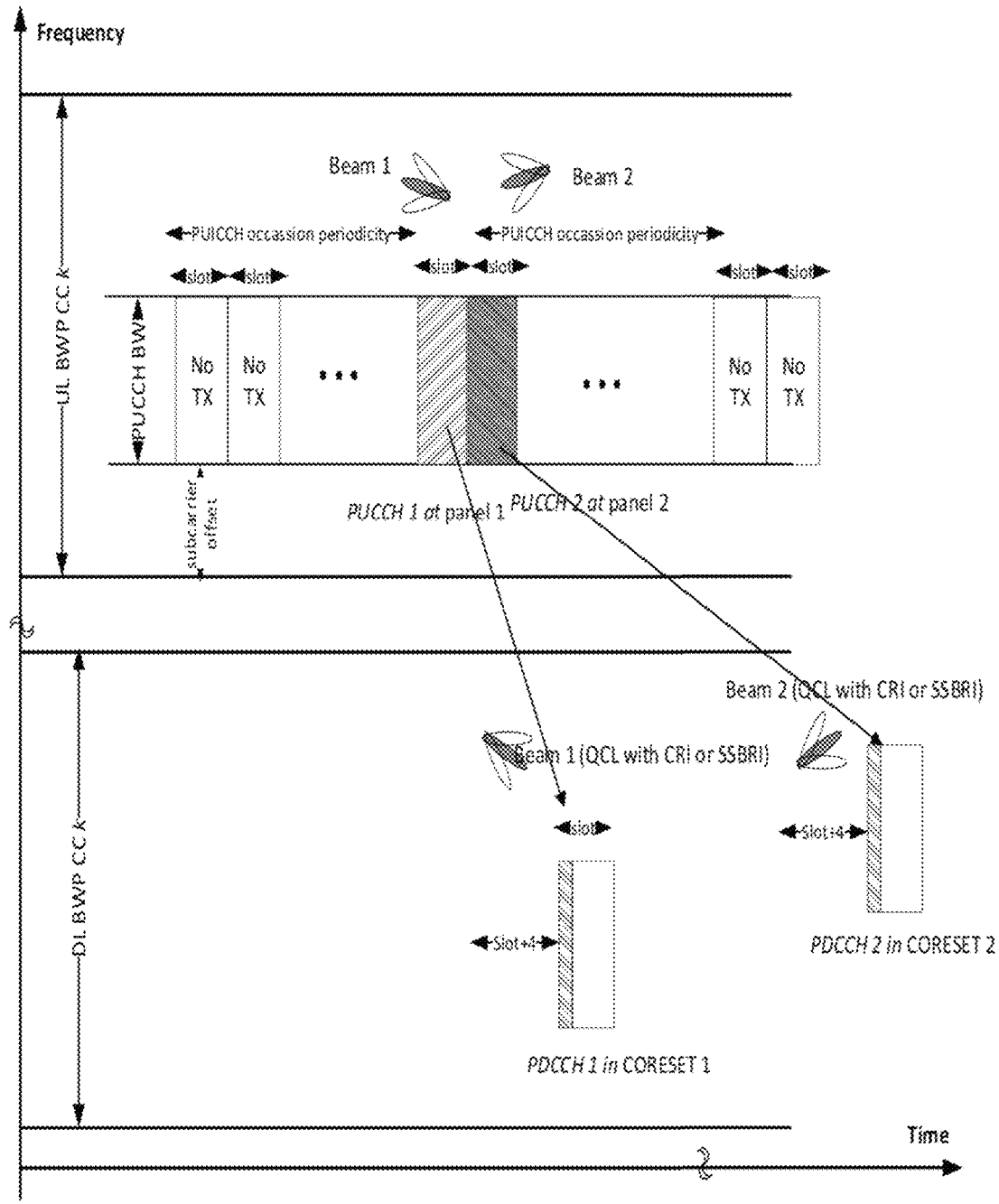
FIG. 18 illustrates an exemplary PUCCH transmission occasion for BFR at a CC with DL and UL non-ideal backhaul.

For example, there may be an assumption that multiple DL and UL links are setup for CC 203, and DL link 1 is from TRP1 201 and DL link 2 is from TRP$_2$ 202 at CC k=1, non-ideal backhaul between TRP1 201 and TRP$_2$ 202 respectively as shown in FIG. 6B. In addition, UE 200 may equip with 2 panels, e.g. UL link 1 to TRP1 201 and UL link 2 to TRP$_2$ 202 at CC k=1 respectively. In this example, BFR using PUCCH is shown in FIG. 18, BFR PUCCH 1 and BFR PUCCH 2 may be separated. In this case, there may be an assumption that multiple BFR PUCCH 1 and BFR PUCCH 2 are based on TDM.

Figure 19:
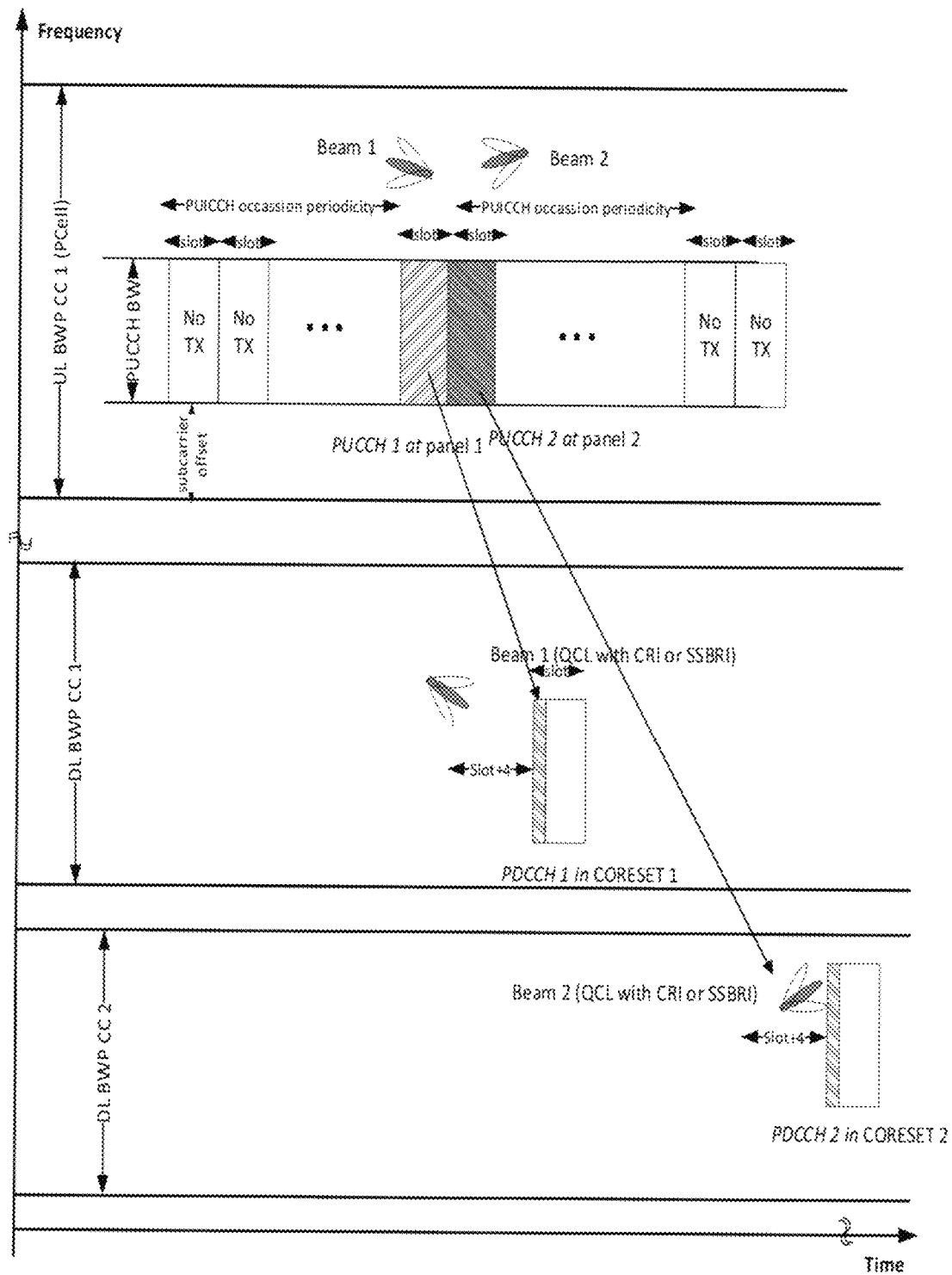
FIG. 19 illustrates an exemplary PUCCH transmission occasion for BFR at two CC, CC 1 with DL and UL, CC 2 with DL only, non-ideal backhauls between $TRP_1$ and $TRP_2$. UE equips with 2 panels.

For example, there may be an assumption that multiple are setup for CC 203, and DL link 1 is from TRP$_1$ 201 and DL link 2 is from TRP$_2$ 202 at CC 204, non-ideal backhaul between TRP$_1$ 201 and TRP$_2$ 202 respectively as shown in FIG. B. However, CC 204 is with DL only. In addition, UE 200 may equip with 2 panels, e.g. UL link 1 to TRP$_1$ 201 at CC 203 and UL link 2 to TRP$_2$ 202 at CC 204 respectively. In this example, BFR using PUCCH is shown in FIG. 19. BFR PUCCH 1 and BFR PUCCH 2 are separated. In this case, there may be an assumption that BFR PUCCH 1 and BFR PUCCH 2 are based on TDM.

During BFR procedure, UE 200 may report the best measured quality (e.g. RSRP) of CRI or SSBRI from a set of the configured CSI-RS or SSB indices per CC (Note: the CSI-RS or SSB indices can be based on explicit or implicit configuration). Uplink control information (UCI) carry CRI for BFR is depicted in Table 5 (exemplary mapping order of CSI fields of one report for CRI or SSBRI for BFR).

UCI convey CRI/SSBRI for BSR may be used in the following use cases: 1) Single CC with multi-TRP/panel transmission as shown in FIG. 6A or FIG. 6B; or 2) Multiple CC with multi-TRP/panel transmission as shown in FIG. 7A or FIG. 7B.

TABLE 5

| CSI fields |
| --- |
| CRI or SSBRI #1, if reported |
| CRI or SSBRI #2, if reported |
| . |
| . |
| . |
| CRI or SSBRI #3, if reported |
| CRI or SSBRI #Q, if reported |

The actual transmitted bits for CRI or SSBRI in the dedicated PUCCH transmission occasion may be depend on $\log_2\lceil K_s^{CSI-RS}\rceil$ or $\log_2\lceil K_s^{SSB}\rceil$ bits, where $K_s^{CSI-RS}$ may be the number of CSI-RS resources in the corresponding resource set, and $K_s^{SSB}$ may be the configured number of SS/PBCH blocks in the corresponding resource set for reporting 'ssb-Index'.

BFR use 2-step RACH—UE 200 may use contention-free 2-step RACH for BFR at PCell when SCell is configured with DL only. For SCell with downlink only, UE may report those failed links index(es) with its CC ID and the new/identified $q_{new,i}$ (if present for link i) at PCell. The new/identified $q_{new}$ can be selected from the explicit or the implicit configuration of reference signals (e.g. CSI-RS or SSB) for link i.

The following method may be used for contention-free 2-step RACH for BFR at PCell.

Figure 12:
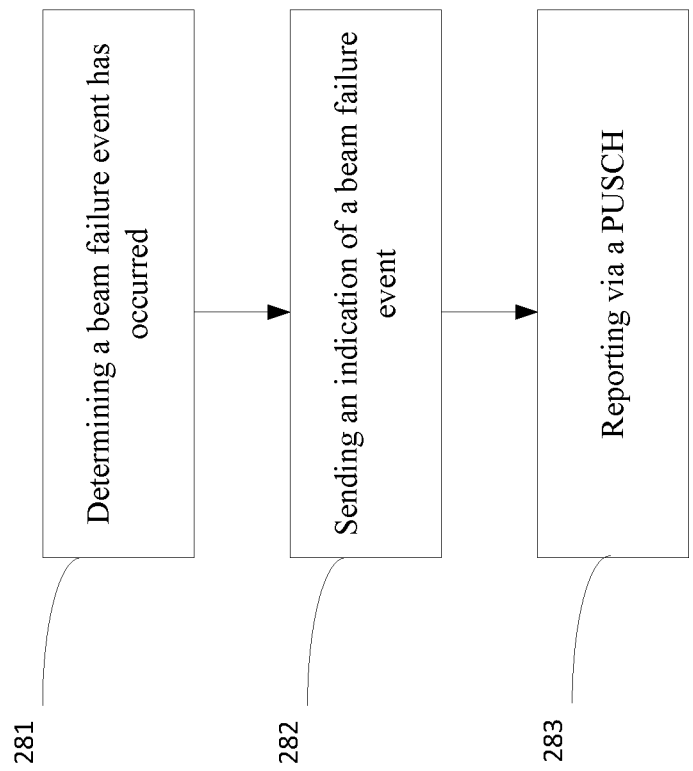
FIG. 12 illustrates an exemplary BFR method.

FIG. 12 illustrates an exemplary BFR method. In the first step (e.g., step 282), UE 200 may convey the beam failure event (e.g. one beam failure or multiple beam failures occurring at one or multiple CCs) via PRACH preamble transmitting at the contention-free PRACH occasion (RO). In the second step (e.g., step 283), the failed CC index(es), CORESET ID, or the new/identified candidate beam/RS $q_{new,i}$ (if present) are reported by MAC-CE conveyed by PUSCH. The new/identified $q_{new,i}$ can be selected from the explicit or the implicit configuration of reference signals (e.g. CSI-RS or SSB). In this case, the PRACH RO doesn't need to associate with SSB block resource index (SSBRI) because the new beam information $q_{new,i}$ can be carried via Msg A (PUSCH).

When BFR use contention-free 2-step RACH for SCell with DL only, there may be one-to-one mapping between contention-free PRACH preambles and PUSCH resource (PRU) units. When performing MsgA transmission, the DMRS port or DMRS sequence may be implicitly indicated to the physical layer. Alternatively, the DMRS port or DMRS sequence may be determined by the physical layer implicitly based on the selected RA preamble.

For example, there may be an assumption that multiple DL and UL links may be setup for CC 203, and DL link 1 is from TRP$_1$ 201 and DL link 2 is from TRP$_2$ 202 at CC 204, non-ideal backhaul between TRP$_1$ 201 and TRP$_2$ 202 respectively as shown in FIG. 11B. However, CC 204 may be with DL only. In addition, UE 200 may be equipped with 2 panels, e.g. UL link 1 to TRP$_1$ 201 at CC 203 and UL link 2 to TRP$_2$ 202 at CC 204 respectively.

Figure 20:
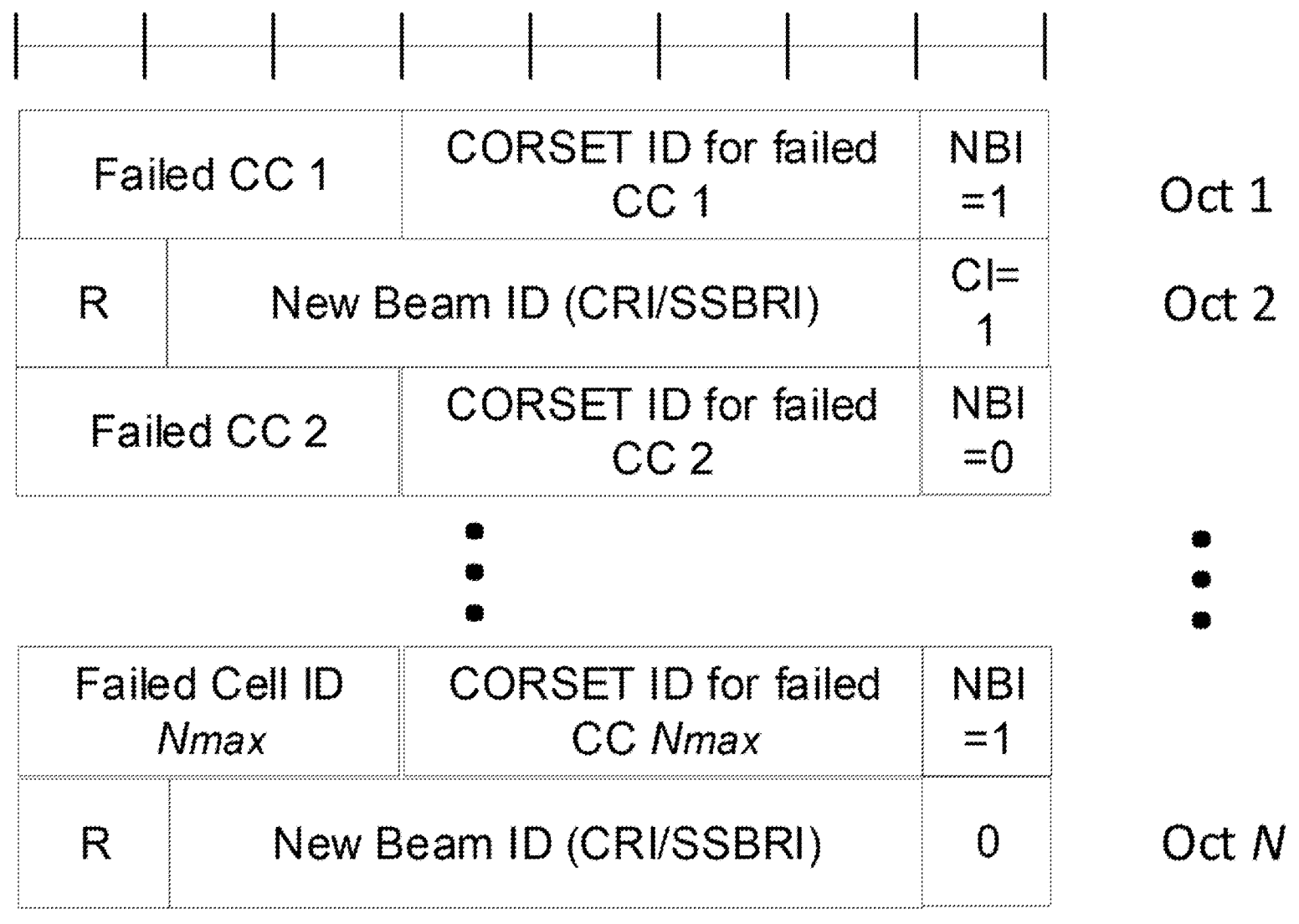

An example FIG. 11B setup, the contention-free 2-step RACH for BFR is depicted in FIG. 20. In this example, UE 200 may configure a timing offset between PRACH preamble and Msg A. Note, this timing offset may be set as zero, e.g., PRACH preamble and PUSCH may be transmit at a same slot with TDM or FDM. To transmit the contention-free 2-step RACH for BFR at PCell, UE 200 automatically determine based on the factor of the UL spatial relationship for PRACH and PUSCH transmission, e.g., TCI states is same with the lowest CORESET ID which UE 200 may monitor at the PCell.

UE 200 may monitor the PDCCH for link i∈{1 . . . . M$_k$} (e.g. from TRP i) configured by CORESET j at each serving cell (PCell or SCell). This may be because each CC at least may be configured with DL. Although UE 200 may initiate one or more than one contention-free PRACH transmission for those SCells without UL at the PCell in slot n for preamble and MsgA PUSCH at slot n+k. According to antenna port quasi co-location parameters associated with periodic CSI-RS resource configuration or with SS/PBCH block associated with index $q_{new,i}$ (at a SCell) provided by higher layers, UE 200 may monitor PDCCH in a search space set provided by recoverySearchSpaceId TRP i, i∈{1 . . . M$_k$}) in the CORESET (e.g. j) at the each CC (SCell) or PCell which may be dependent on the configuration. The CRC for the monitored DCI format for BFR may be scrambled by C-RNTI or MCS-C-RNTI starting from slot n+k+4 within a window configured by BeamFailureRecoveryConfig. Dependent on UE 200 ability, if more than one PRACH has to transmit, and their PRACH resources are time-frequency overlapped at PCell, then UE 200 may decide to transmit multiple PRACH simultaneously, or defer one of them to the next available PRACH transmission occasion (RO). In addition, PRACH preamble can carry UL panel ID or using DM-RS for Msg A PUSCH.

The failed CC index(es) may be selected from up to $N_{max}$ CCs for SCell with DL only BFR. Therefore, the maximum number of BFR may be expressed as $N_{max} \times M$, where M may be the maximum number of supported TRPs per CC.

Figure 21:
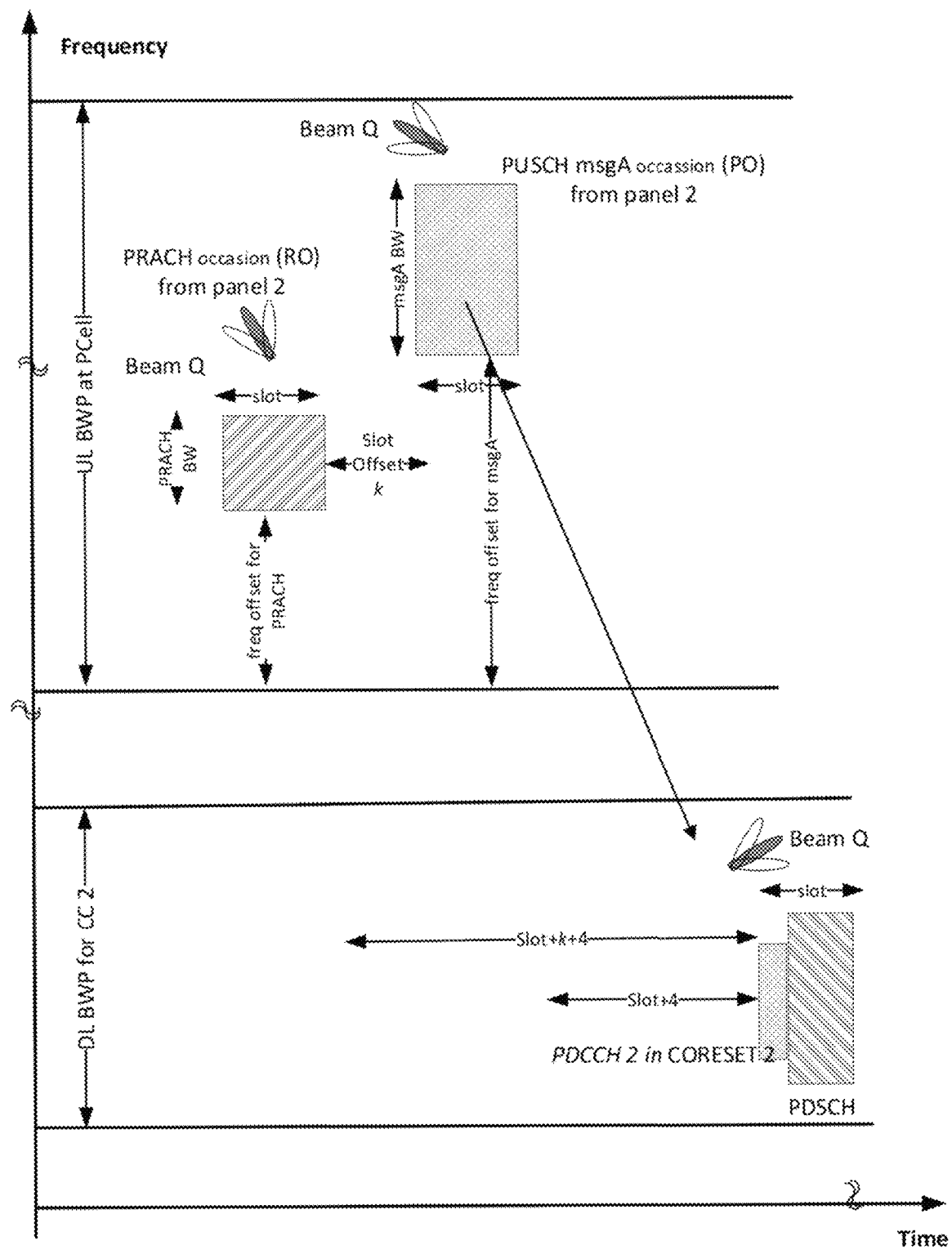
FIG. 21 illustrates an exemplary MAC CE content for Msg A of BFR when SCell with DL only.

A MAC CE may be used to report failed CC index(es), CORESET ID, new beam ID $q_{new,i}$ for MsgA. An example of the MAC CE is shown in FIG. 21 where the fields are described below. A first field "Failed CC ID": This field indicates the identity of which beam failure CC. A second field, "NBI": new beam indicator, if NBI=1 then new beam ID (CRI/SSBRI) reports. A third field "CI": Continued indicator, if CI=1 then there is another failure CC for reporting. A fourth field "R": Reserved bit.

For 2-step contention-free RACH for BFR approach, a useful case for a SCell being with DL only. MAC-CE payload may include CC ID, CORESET ID, or new beam ID, e.g., $q_{new,i}$ Therefore, the mapping of CC, TRP, or panel ID may be explicitly signaled via MAC-CE payload as shown in FIG. 21.

Figure 22:
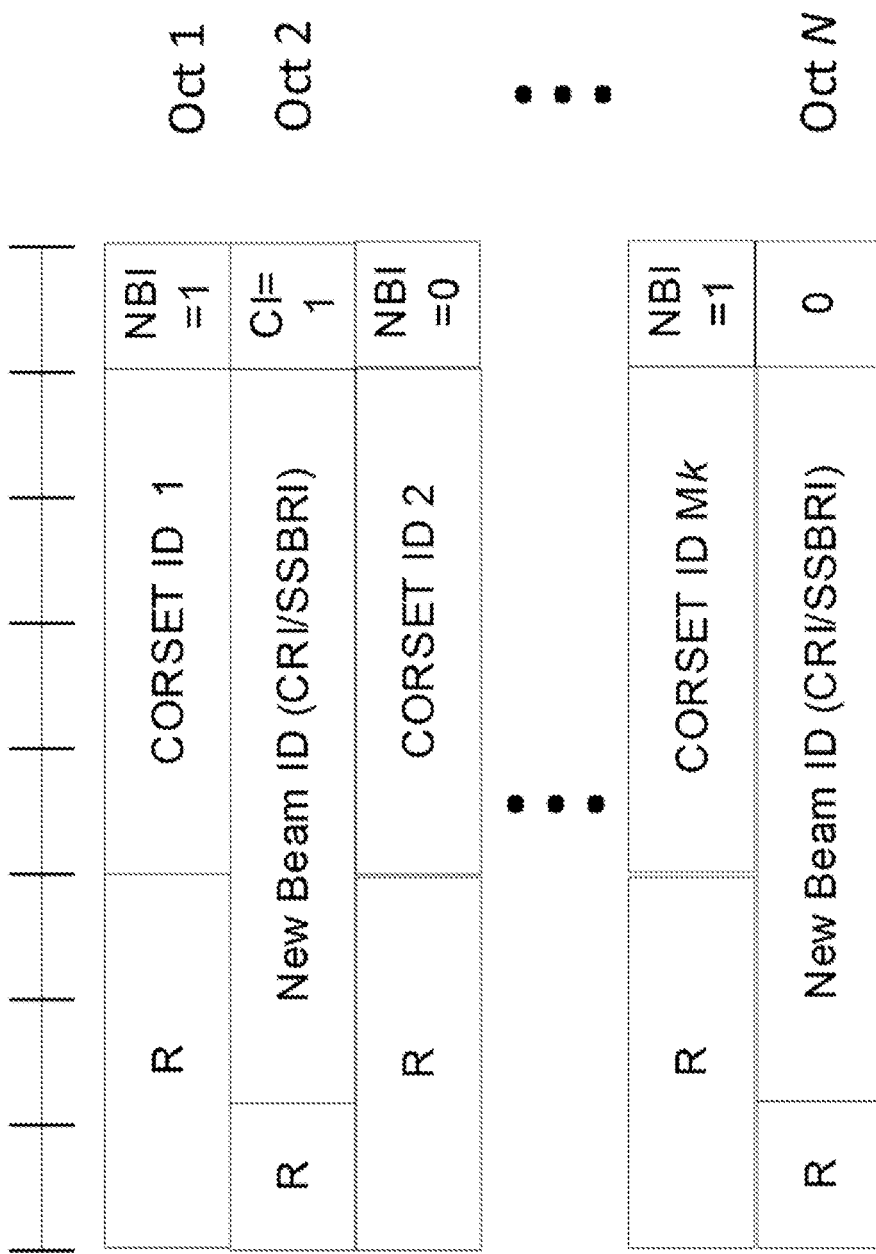
FIG. 22 illustrates an exemplary MAC CE content for Msg A of BFR when SCell with both UL and DL.

However, 2-step RACH may be beneficially to the use case when SCell is configured with the DL only. When SCell is configured with both DL and UL, this SCell is capable to transmit those failed links without other cell's help. Therefore, those failed link index(es) can be omitted in MAC CE payload. Hence, MAC CE content can be reduced as shown in FIG. 22.

BFR use PUSCH—Failed CC index(es), new beam information (if present) or beam failure event to be reported by a single report by MAC CE. In this case, resource for MAC CE may not be triggered by dedicated PUCCH or PRACH for BFR. Since failed CC index(es), new beam information, or CORESET ID may be reported by a single report by MAC-CE without a dedicated PUCCH or PRACH for BFR, the latency of SCell-BFR may be large and un-controlled by gNB. This may be because when a normal SR is received, gNB may not schedule PUSCH transmission immediately as a typical case. In this case, there may be, for example, use cases as shown below:

In a first use case, BFR for some SCell with DL only. If there is a BFR and an available resource for PUSCH transmission at PCell then the disclosed Msg A content may be carried by regular PUSCH without using contention-free RACH or 2-step RACH approaches for BFR.

In a second use case, BFR for a CC with both and DL and UL. If there is a BFR, there may be a contention-free RACH or a dedicated PUCCH occasion and an available resource for PUSCH transmission at the CC, then it may piggy back failed CC index(es), CORESET ID, new beam ID $q_{new,i}$ indicated by the contention-free RACH to the regular PUSCH.

A MAC CE may be used to report as Msg A when SCell is with DL only, e.g., failed CC index(es), CORESET ID, new beam ID $q_{new,i}$ for MsgA. An example of the MAC CE data payload for PUSCH is shown in FIG. 21.

A MAC CE may be used to report as Msg A when SCell is with both DL and UL only, e.g., CORESET ID, new beam ID $q_{new,i}$ for MsgA. An example of the MAC CE data payload for PUSCH is shown in FIG. 22.

For UL panel ID indication, the UL panel ID may be conveyed via using DM-RS for PUSCH or it may explicit signalling in PUSCH payload.

In some cases, a MAC CE may be used to indicate beam failure on one or more serving cells or one or more links on those one or more serving cells (also applicable to RACH-based BFR as discussed above, e.g. 2-step RACH).

For example, consider the MAC CE in FIG. 23, with an exemplary four octet bitmap to indicate beam failure or no beam failure on cells or links.

The $C_m$ field indicates beam failure detection and the presence of an octet including the AC field for, for instance, the serving cell with ServCellIndex m. The $C_m$ field set to 1 indicates that beam failure is detected and the octet including the AC field is present for the serving cell with ServCellIndex m. The $C_m$ field set to 0 indicates that the beam failure is not detected and octet including the AC field is not present for the serving cell with ServCellIndex m. The octets including the AC field are present in ascending order based on the ServCellIndex;

In this example, 32 serving cells or links can be indicated. For instance, consider a case with 16 serving cells, each with two links.

In one example, $C_0$ and $C_1$ indicate the first (e.g. i=0) and second (e.g. i=1) links of a first cell, respectively, for example a serving cell with lowest index e.g. ServCellIndex 0. The next fields $C_2$ and $C_3$ indicate the first and second links of a second cell, respectively, etc.

In various examples, different serving cells have different numbers of configured links. The $C_m$ may indicate link i of cell k if the sum of the number of links with lower serving cell index and the number of links with lower link index on serving cell k is m−1. $C_0$ may indicate the first link of the serving cell with lowest index.

In another example, $C_0, C_1, \ldots, C_{15}$ indicate the first links of serving cells 0, . . . , 15, respectively. $C_{16}, C_{17}, \ldots C_{31}$ indicate the second links of serving cells 0, . . . , 15, respectively.

In various examples, different serving cells have different numbers of configured links. The $C_m$ may indicate a first link cell m if m≤M, where M is the highest serving cell index of this MAC entity. If m is greater than M, then $C_m$ may indicate a second link among cells with more than one link configured, etc.

The AC field for example indicates the presence of the Candidate RS ID field in this octet. If at least one of the SSBs with SS-RSRP above rsrp-ThresholdBFR amongst the SSBs in candidateBeamRSSCellList or the CSI-RSs with CSI-RSRP above rsrp-ThresholdBFR amongst the CSI-RSs in candidateBeamRSSCellList (e.g. for the corresponding link i, e.g. amongst the SSBs/CSI-RSs in $\bar{q}_{1,i,m}$) is available, the AC field is set to 1; otherwise, it is set to 0. If the AC field set to 1, the Candidate RS ID field is present. If the AC field set to 0, R bits are present instead.

Figure 24:
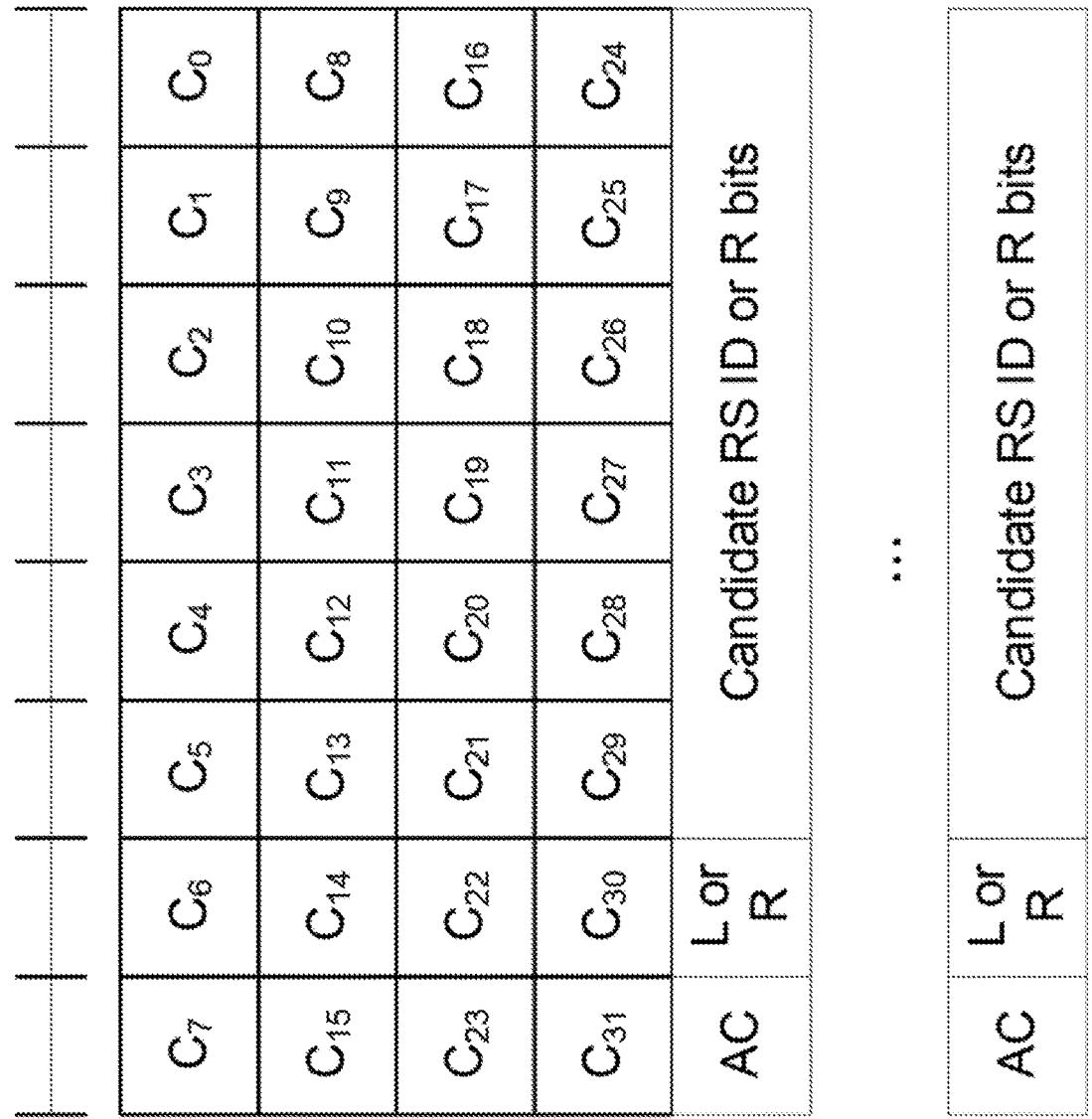
FIG. 24 illustrates BFR MAC CE with four octets bitmap with an L field.

For an example in which the $C_m$ field indicates beam failure detection and the presence of an octet including the AC field for the serving cell with ServCellIndex m, the octet including the AC field may also include a link field (L), as illustrated in FIG. 24. For example, if a corresponding serving cell is configured with a single link, the AC octet includes a 1-bit R (reserved, set to 0) field, as also in FIG. 23. On the other hand, if the corresponding serving cell is configured with multiple links, e.g. two links, the L field may indicate if also the next AC octet corresponds to the same cell, but a different link. For example, if L=0, the next AC octet corresponds to the next serving cell with beam failure indicated by its C field. If L=1, the next AC octet corresponds to another link with beam failure detected on the same serving cell. Note that the index of the link that has failed may be deduced by the network from the Candidate RS ID if different links are associated with different sets of candidate RSs. In some cases, AC octets corresponding to different links of a serving cell are placed in order of link index. If so, the network may deduce which link that failed even if the AC field is set to 0, if one or more links of the same serving cell have failed and are also included in the MAC CE. In one example, one or more of the reserved bits (otherwise used for candidate RS ID) is used to indicate the corresponding link index, if the AC field is set to 0, e.g., a corresponding candidate RS ID is not present. This can resolve the ambiguity of which link that has failed if a corresponding candidate RS ID is not present.

For yet an example in which the $C_m$ field indicates beam failure detection and the presence of an octet including the AC field for the serving cell with ServCellIndex m, the octet including the AC field may also include a link index field (L), as illustrated in FIG. 25. For example, if a corresponding serving cell is configured with a single link, the AC octet includes an R (reserved, set to 0) field, as also in FIG. 23. On the other hand, if the corresponding serving cell is configured with multiple links, e.g. four links, the L field may indicate a link index of the link that has failed. In this case, candidate RS ID may be indexed within the set for a link. For example, candidate RS ID 0 may refer to one RS in $\bar{q}_{1,0,k}$, but another RS in $\bar{q}_{1,1,k}$, etc. In some cases, beam failure of a single link per serving cell can be conveyed per MAC CE. In some cases, an AC octet per link of a failed serving cell is always included, e.g., if the corresponding $C_m$ field indicates beam failure detection. In such cases, a certain L value (e.g., the highest) or a certain candidate RS ID (e.g., the highest) may indicate that the beam failure has not been detected for the link.

Table 6 include exemplary abbreviations or definitions for subject matter disclosed herein.

TABLE 6

Abbreviations and Definitions

| Abbreviations | Definitions |
|---|---|
| BH | Backhaul |
| BWP | Bandwidth Part |
| CA | Carrier Aggregation |
| CBG | Code Block Group |
| CC | Component Carrier |
| CG | Configured Grant |
| C-RNTI | Cell Radio-Network Temporary Identifier |
| CRI | CSI-RS Resource Index |
| CS-RNTI | Configured Schedule Radio-Network Temporary Identifier |
| CSI-RS | Channel State Information Reference Signal |
| DC | Dual Connectivity |
| DL | Downlink |
| DL-SCH | Downlink Shared Channel |
| DMRS | Demodulation Reference Signal |
| eMBB | enhanced Mobile Broadband |
| eNB | Evolved Node B |
| FDD | Frequency Division Duplex |
| FDM | Frequency-domain Multiplexing |
| FR1 | Frequency region 1 (sub 6 GHz) |
| FR2 | Frequency region 2 (mmWave) |
| gNB | NR NodeB |
| HARQ | Hybrid ARQ |
| IE | Information Element |
| IIoT | Industrial Internet of Things |
| KPI | Key Performance Indicators |

TABLE 6-continued

Abbreviations and Definitions

| Abbreviations | Definitions |
|---|---|
| L1 | Layer 1 |
| L2 | Layer 2 |
| L3 | Layer 3 |
| LAA | License Assisted Access |
| LTE | Long Term Evolution |
| MAC | Medium Access Control |
| MCS | Modulation Coding Scheme |
| MTC | Machine-Type Communications |
| mMTC | Massive Machine Type Communication |
| NR | New Radio |
| OS | OFDM Symbol |
| OFDM | Orthogonal Frequency Division Multiplexing |
| PCell | Primary Cell |
| PHY | Physical Layer |
| PRACH | Physical Random Access Channel |
| PUSCH | Physical Uplink Shared Channel |
| PRI | PUCCH Resource Indicator |
| QCL | Quasi CoLocation |
| RA | Random Access |
| RACH | Random Access Channel |
| RAN | Radio Access Network |
| RAP | Random Access Preamble |
| RAR | Random Access Response |
| RAT | Radio Access Technology |
| RRC | Radio Resource Control |
| RS | Reference signal |
| RSRP | Reference Signal Receive Power |
| SCell | Secondary Cell |
| SI | System Information |
| SR | Scheduling Request |
| TB | Transport Block |
| TCI | Transmission Configuration Indicator |
| TDD | Time Division Duplex |
| TDM | Time-domain Multiplexing |
| TRP | Transmission and Reception Point |
| TTI | Transmission Time Interval |
| UE | User Equipment |
| UL | Uplink |
| UL-SCH | Uplink Shared Channel |
| URLLC | Ultra-Reliable and Low Latency Communications |

It is understood that the entities performing the steps illustrated herein, such as FIG. 1-FIG. 20, may be logical entities. The steps may be stored in a memory of, and executing on a processor of, a device, server, or computer system such as those illustrated in FIG. 27C—FIG. 27G. Skipping steps, combining steps, or adding steps between exemplary methods disclosed herein is contemplated.

Figure 26:
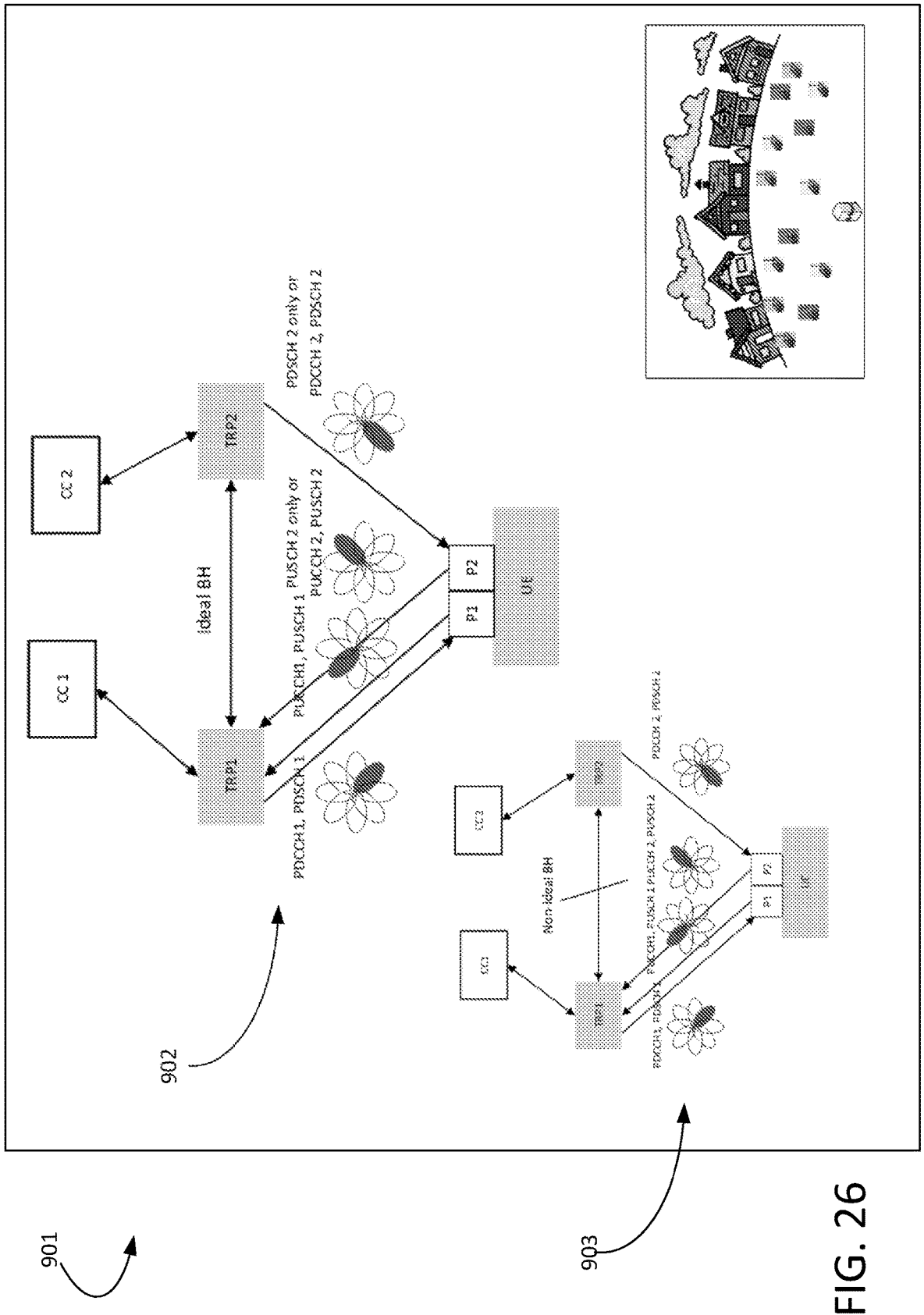
FIG. 26 illustrates an exemplary display (e.g., graphical user interface) that may be generated based on the methods, systems, and devices of beam failure detection and recovery with multi-TRP and multi-panel transmission.

FIG. 26 illustrates an exemplary display (e.g., graphical user interface) that may be generated based on the methods, systems, and devices of beam failure detection and recovery with multi-TRP and multi-panel transmission, as discussed herein. Display interface 901 (e.g., touch screen display) may provide text in block 902 associated with beam failure detection and recovery with multi-TRP and multi-panel transmission, such as BFD or BFR related parameters, method flow, and associated current conditions. Progress of any of the steps (e.g., sent messages or success of steps) discussed herein may be displayed in block 902. In addition, graphical output 902 may be displayed on display interface 901. Graphical output 903 may be the topology of the devices implementing the methods, systems, and devices of beam failure detection and recovery with multi-TRP and multi-panel transmission, a graphical output of the progress of any method or systems discussed herein, or the like.

The 3rd Generation Partnership Project (3GPP) develops technical standards for cellular telecommunications network technologies, including radio access, the core transport network, and service capabilities—including work on codecs, security, and quality of service. Recent radio access technology (RAT) standards include WCDMA (commonly referred as 3G), LTE (commonly referred as 4G), LTE-Advanced standards, and New Radio (NR), which is also referred to as "5G". 3GPP NR standards development is expected to continue and include the definition of next generation radio access technology (new RAT), which is expected to include the provision of new flexible radio access below 7 GHz, and the provision of new ultra-mobile broadband radio access above 7 GHz. The flexible radio access is expected to consist of a new, non-backwards compatible radio access in new spectrum below 6 GHz, and it is expected to include different operating modes that may be multiplexed together in the same spectrum to address a broad set of 3GPP NR use cases with diverging requirements. The ultra-mobile broadband is expected to include cmWave and mmWave spectrum that will provide the opportunity for ultra-mobile broadband access for, e.g., indoor applications and hotspots. In particular, the ultra-mobile broadband is expected to share a common design framework with the flexible radio access below 7 GHz, with cmWave and mmWave specific design optimizations.

3GPP has identified a variety of use cases that NR is expected to support, resulting in a wide variety of user experience requirements for data rate, latency, and mobility. The use cases include the following general categories: enhanced mobile broadband (eMBB) ultra-reliable low-latency Communication (URLLC), massive machine type communications (mMTC), network operation (e.g., network slicing, routing, migration and interworking, energy savings), and enhanced vehicle-to-everything (eV2X) communications, which may include any of Vehicle-to-Vehicle Communication (V2V), Vehicle-to-Infrastructure Communication (V2I), Vehicle-to-Network Communication (V2N), Vehicle-to-Pedestrian Communication (V2P), and vehicle communications with other entities. Specific service and applications in these categories include, e.g., monitoring and sensor networks, device remote controlling, bi-directional remote controlling, personal cloud computing, video streaming, wireless cloud-based office, first responder connectivity, automotive ecall, disaster alerts, real-time gaming, multi-person video calls, autonomous driving, augmented reality, tactile internet, virtual reality, home automation, robotics, and aerial drones to name a few. All of these use cases and others are contemplated herein.

Figure 27A:
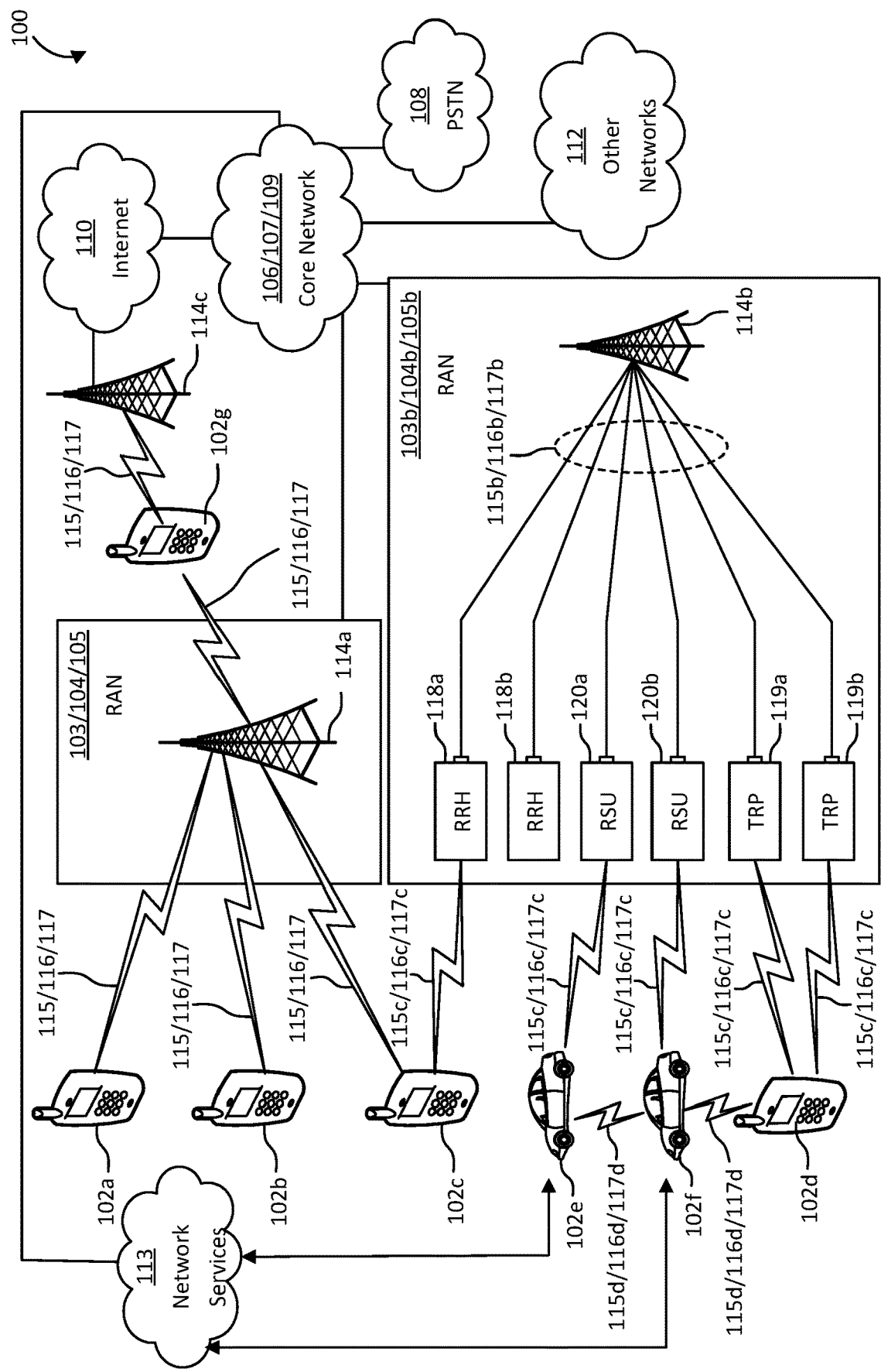
FIG. 27A illustrates an example communications system.

FIG. 27A illustrates an example communications system 100 in which the methods and apparatuses of beam failure detection and recovery with multi-TRP and multi-panel transmission, such as the systems and methods illustrated in FIG. 1 through FIG. 20 described and claimed herein may be used. The communications system 100 may include wireless transmit/receive units (WTRUs) 102a, 102b, 102c, 102d, 102e, 102f, or 102g (which generally or collectively may be referred to as WTRU 102 or WTRUs 102). The communications system 100 may include, a radio access network (RAN) 103/104/105/103b/104b/105b, a core network 106/107/109, a public switched telephone network (PSTN) 108, the Internet 110, other networks 112, and Network Services 113. Network Services 113 may include, for example, a V2X server, V2X functions, a ProSe server, ProSe functions, IoT services, video streaming, or edge computing, etc.

It will be appreciated that the concepts disclosed herein may be used with any number of WTRUs, base stations, networks, or network elements. Each of the WTRUs 102a, 102b, 102c, 102d, 102e, 102f, or 102g may be any type of apparatus or device configured to operate or communicate in a wireless environment. Although each WTRU 102a, 102b, 102c, 102d, 102e, 102f, or 102g may be depicted in FIG. 27A, FIG. 27B, FIG. 27C, FIG. 27D, FIG. 27E, or FIG. 27F as a hand-held wireless communications apparatus, it is understood that with the wide variety of use cases contemplated for 5G wireless communications, each WTRU may comprise or be embodied in any type of apparatus or device configured to transmit or receive wireless signals, including, by way of example only, user equipment (UE), a mobile station; a fixed or mobile subscriber unit, a pager, a cellular telephone, a personal digital assistant (PDA), a smartphone, a laptop, a tablet, a netbook, a notebook computer, a personal computer, a wireless sensor, consumer electronics, a wearable device such as a smart watch or smart clothing, a medical or eHealth device, a robot, industrial equipment, a drone, a vehicle such as a car, bus, truck, train, or airplane, and the like.

The communications system 100 may also include a base station 114a and a base station 114b. In the example of FIG. 27A, each base stations 114a and 114b is depicted as a single element. In practice, the base stations 114a and 114b may include any number of interconnected base stations or network elements. Base stations 114a may be any type of device configured to wirelessly interface with at least one of the WTRUs 102a, 102b, and 102c to facilitate access to one or more communication networks, such as the core network 106/107/109, the Internet 110, Network Services 113, or the other networks 112. Similarly, base station 114b may be any type of device configured to wiredly or wirelessly interface with at least one of the Remote Radio Heads (RRHs) 118a, 118b, Transmission and Reception Points (TRPs) 119a, 119b, or Roadside Units (RSUs) 120a and 120b to facilitate access to one or more communication networks, such as the core network 106/107/109, the Internet 110, other networks 112, or Network Services 113. RRHs 118a, 118b may be any type of device configured to wirelessly interface with at least one of the WTRUs 102, e.g., WTRU 102c, to facilitate access to one or more communication networks, such as the core network 106/107/109, the Internet 110, Network Services 113, or other networks 112

TRPs 119a, 119b may be any type of device configured to wirelessly interface with at least one of the WTRU 102d, to facilitate access to one or more communication networks, such as the core network 106/107/109, the Internet 110, Network Services 113, or other networks 112. RSUs 120a and 120b may be any type of device configured to wirelessly interface with at least one of the WTRU 102e or 102f, to facilitate access to one or more communication networks, such as the core network 106/107/109, the Internet 110, other networks 112, or Network Services 113. By way of example, the base stations 114a, 114b may be a Base Transceiver Station (BTS), a Node-B, an eNode B, a Home Node B, a Home eNode B, a Next Generation Node-B (gNode B), a satellite, a site controller, an access point (AP), a wireless router, and the like.

The base station 114a may be part of the RAN 103/104/105, which may also include other base stations or network elements (not shown), such as a Base Station Controller (BSC), a Radio Network Controller (RNC), relay nodes, etc. Similarly, the base station 114b may be part of the RAN 103b/104b/105b which may also include other base stations or network elements (not shown), such as a BSC, a RNC, relay nodes, etc. The base station 114a may be configured to transmit or receive wireless signals within a particular geographic region, which may be referred to as a cell (not shown). Similarly, the base station 114b may be configured to transmit or receive wired or wireless signals within a particular geographic region, which may be referred to as a cell (not shown) for methods, systems, and devices of beam failure detection and recovery with multi-TRP and multi-panel transmission, as disclosed herein. Similarly, the base station 114b may be configured to transmit or receive wired or wireless signals within a particular geographic region, which may be referred to as a cell (not shown). The cell may further be divided into cell sectors. For example, the cell associated with the base station 114a may be divided into three sectors. Thus, in an example, the base station 114a may include three transceivers, e.g., one for each sector of the cell. In an example, the base station 114a may employ multiple-input multiple output (MIMO) technology and, therefore, may utilize multiple transceivers for each sector of the cell.

The base stations 114a may communicate with one or more of the WTRUs 102a, 102b, 102c, or 102g over an air interface 115/116/117, which may be any suitable wireless communication link (e.g., radio frequency (RF), microwave, infrared (IR), ultraviolet (UV), visible light, cmWave, mmWave, etc.). The air interface 115/116/117 may be established using any suitable radio access technology (RAT).

The base stations 114b may communicate with one or more of the RRHs 118a, 118b, TRPs 119a, 119b, or RSUs 120a, 120b, over a wired or air interface 115b/116b/117b, which may be any suitable wired (e.g., cable, optical fiber, etc.) or wireless communication link (e.g., radio frequency (RF), microwave, infrared (IR), ultraviolet (UV), visible light. cmWave, mmWave, etc.). The air interface 115b/116b/117b may be established using any suitable radio access technology (RAT).

The RRHs 118a, 118b, TRPs 119a, 119b or RSUs 120a, 120b, may communicate with one or more of the WTRUs 102c, 102d, 102e, 102f over an air interface 115c/116c/117c, which may be any suitable wireless communication link (e.g., radio frequency (RF), microwave, infrared (IR), ultraviolet (UV), visible light, cmWave, mmWave, etc.). The air interface 115c/116c/117c may be established using any suitable radio access technology (RAT).

The WTRUs 102a, 102b, 102c, 102d, 102e, or 102f may communicate with one another over an air interface 115d/116d/117d, such as Sidelink communication, which may be any suitable wireless communication link (e.g., radio frequency (RF), microwave, infrared (IR), ultraviolet (UV), visible light, cmWave, mmWave, etc.). The air interface 115d/116d/117d may be established using any suitable radio access technology (RAT).

The communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, 102c, or RRHs 118a, 118b,TRPs 119a, 119b and RSUs 120a, 120b, in the RAN 103b/104b/105b and the WTRUs 102c, 102d, 102e, 102f, may implement a radio technology such as Universal Mobile Telecommunications System (UMTS) Terrestrial Radio Access (UTRA), which may establish the air interface 115/116/117 or 115c/116c/117c respectively using wideband CDMA (WCDMA). WCDMA may include communication protocols such as High-Speed Packet Access (HSPA) or Evolved HSPA (HSPA+). HSPA may include High-Speed Downlink Packet Access (HSDPA) or High-Speed Uplink Packet Access (HSUPA).

In an example, the base station 114a and the WTRUs 102a, 102b, 102c, or RRHs 118a, 118b, TRPs 119a, 119b, or RSUs 120a, 120b in the RAN 103b/104b/105b and the WTRUs 102c, 102d, may implement a radio technology such as Evolved UMTS Terrestrial Radio Access (E-UTRA), which may establish the air interface 115/116/117 or 115c/116c/117c respectively using Long Term Evolution (LTE) or LTE-Advanced (LTE-A). In the future, the air interface 115/116/117 or 115c/116c/117c may implement 3GPP NR technology. The LTE and LTE-A technology may include LTE D2D and V2X technologies and interfaces (such as Sidelink communications, etc.). Similarly, the 3GPP NR technology includes NR V2X technologies and interface (such as Sidelink communications, etc.).

The base station 114a in the RAN 103/104/105 and the WTRUs 102a, 102b, 102c, and 102g or RRHs 118a, 118b, TRPs 119a, 119b or RSUs 120a, 120b in the RAN 103b/104b/105b and the WTRUs 102c, 102d, 102e, 102f may implement radio technologies such as IEEE 802.16 (e.g., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114c in FIG. 27A may be a wireless router, Home Node B, Home eNode B, or access point, for example, and may utilize any suitable RAT for facilitating wireless connectivity in a localized area, such as a place of business, a home, a vehicle, a train, an aerial, a satellite, a manufactory, a campus, and the like, for implementing the methods, systems, and devices of beam failure detection and recovery with multi-TRP and multi-panel transmission, as disclosed herein. In an example, the base station 114c and the WTRUs 102, e.g., WTRU 102e, may implement a radio technology such as IEEE 802.11 to establish a wireless local area network (WLAN). similarly, the base station 114c and the WTRUs 102d, may implement a radio technology such as IEEE 802.15 to establish a wireless personal area network (WPAN). In yet another example, the base station 114c and the WTRUs 102, e.g., WTRU 102e, may utilize a cellular-based RAT (e.g., WCDMA, CDMA2000, GSM, LTE, LTE-A, NR, etc.) to establish a picocell or femtocell. As shown in FIG. 27A, the base station 114c may have a direct connection to the Internet 110. Thus, the base station 114c may not be required to access the Internet 110 via the core network 106/107/109.

The RAN 103/104/105 or RAN 103b/104b/105b may be in communication with the core network 106/107/109, which may be any type of network configured to provide voice, data, messaging, authorization and authentication, applications, or voice over internet protocol (VoIP) services to one or more of the WTRUs 102a, 102b, 102c, 102d. For example, the core network 106/107/109 may provide call control, billing services, mobile location-based services, pre-paid calling, Internet connectivity, packet data network connectivity, Ethernet connectivity, video distribution, etc., or perform high-level security functions, such as user authentication.

Although not shown in FIG. 27A, it will be appreciated that the RAN 103/104/105 or RAN 103b/104b/105b or the core network 106/107/109 may be in direct or indirect communication with other RANs that employ the same RAT as the RAN 103/104/105 or RAN 103b/104b/105b or a different RAT. For example, in addition to being connected to the RAN 103/104/105 or RAN 103b/104b/105b, which may be utilizing an E-UTRA radio technology, the core network 106/107/109 may also be in communication with another RAN (not shown) employing a GSM or NR radio technology.

The core network 106/107/109 may also serve as a gateway for the WTRUs 102a, 102b, 102c, 102d, 102e to access the PSTN 108, the Internet 110, or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP interact protocol suite. The networks 112 may include wired or wireless communications networks owned or operated by other service providers. For example, the networks 112 may include any type of packet data network (e.g., an IEEE 802.3 Ethernet network) or another core network connected to one or more RANs, which may employ the same RAT as the RAN 103/104/105 or RAN 103b/104b/105b or a different RAT.

Some or all of the WTRUs 102a, 102b, 102c, 102d, 102e, and 102f in the communications system 100 may include multi-mode capabilities, e.g., the WTRUs 102a, 102b, 102c, 102d, 102e, and 102f may include multiple transceivers for communicating with different wireless networks over different wireless links for implementing methods, systems, and devices of beam failure detection and recovery with multi-TRP and multi-panel transmission, as disclosed herein. For example, the WTRU 102g shown in FIG. 27A may be configured to communicate with the base station 114a, which may employ a cellular-based radio technology, and with the base station 114c, which may employ an IEEE 802 radio technology.

Although not shown in FIG. 27A, it will be appreciated that a User Equipment may make a wired connection to a gateway. The gateway may be a Residential Gateway (RG). The RG may provide connectivity to a Core Network 106/107/109. It will be appreciated that much of the subject matter included herein may equally apply to UEs that are WTRUs and UEs that use a wired connection to connect to a network. For example, the ideas that apply to the wireless interfaces 115, 116, 117 and 115c/116c/117c may equally apply to a wired connection.

Figure 27B:
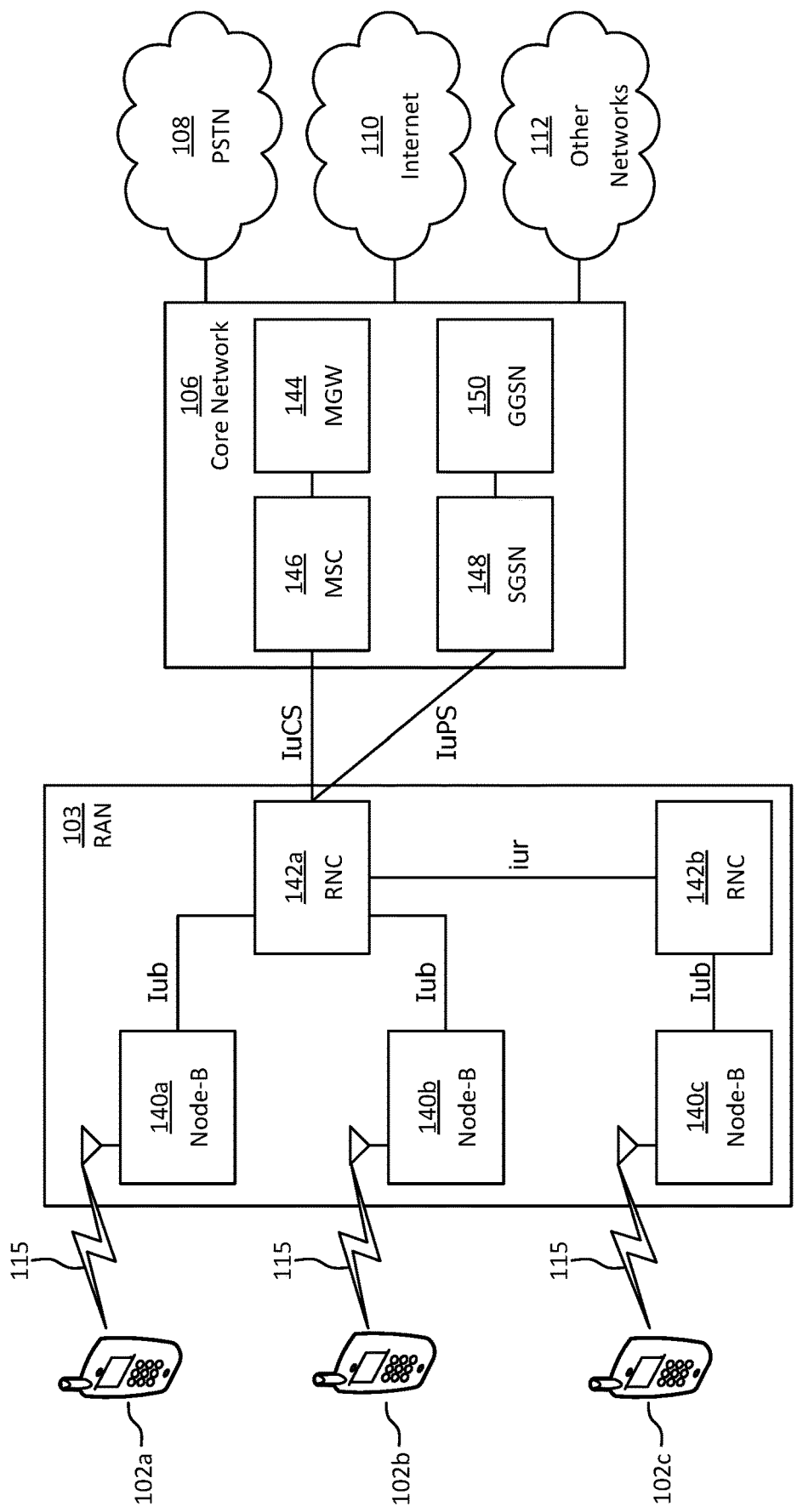
FIG. 27B illustrates an exemplary system that includes RANs and core networks.

FIG. 27B is a system diagram of an example RAN 103 and core network 106 that may implement methods, systems, and devices of beam failure detection and recovery with multi-TRP and multi-panel transmission, as disclosed herein. As noted above, the RAN 103 may employ a UTRA radio technology to communicate with the WTRUs 102a, 102b, and 102c over the air interface 115. The RAN 103 may also be in communication with the core network 106. As shown in FIG. 27B, the RAN 103 may include Node-Bs 140a, 140b, and 140c, which may each include one or more transceivers for communicating with the WTRUs 102a, 102b, and 102c over the air interface 115. The Node-Bs 140a, 140b, and 140c may each be associated with a particular cell (not shown) within the RAN 103. The RAN 103 may also include RNCs 142a, 142b. It will be appreciated that the RAN 103 may include any number of Node-Bs and Radio Network Controllers (RNCs.)

As shown in FIG. 27B, the Node-Bs 140a, 140b may be in communication with the RNC 142a. Additionally, the Node-B 140c may be in communication with the RNC 142b. The Node-Bs 140a, 140b, and 140c may communicate with the respective RNCs 142a and 142b via an Iub interface. The RNCs 142a and 142b may be in communication with one another via an Iur interface. Each of the RNCs 142a and 142b may be configured to control the respective Node-Bs 140a, 140b, and 140c to which it is connected. In addition, each of the RNCs 142a and 142b may be configured to carry out or support other functionality, such as outer loop power control, load control, admission control, packet scheduling, handover control, macro-diversity, security functions, data encryption, and the like.

The core network 106 shown in FIG. 27B may include a media gateway (MGW) 144, a Mobile Switching Center (MSC) 146, a Serving GPRS Support Node (SGSN) 148, or a Gateway GPRS Support Node (GGSN) 150. While each of the foregoing elements are depicted as part of the core network 106, it will be appreciated that any one of these elements may be owned or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, and 102c with access to circuit-switched networks, such as the PSTN 108, to facilitate communications between the WTRUs 102a, 102b, and 102c, and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, and 102c with access to packet-switched networks, such as the Internet 110, to facilitate communications between and the WTRUs 102a, 102b, and 102c, and IP-enabled devices.

The core network 106 may also be connected to the other networks 112, which may include other wired or wireless networks that are owned or operated by other service providers.

Figure 27C:
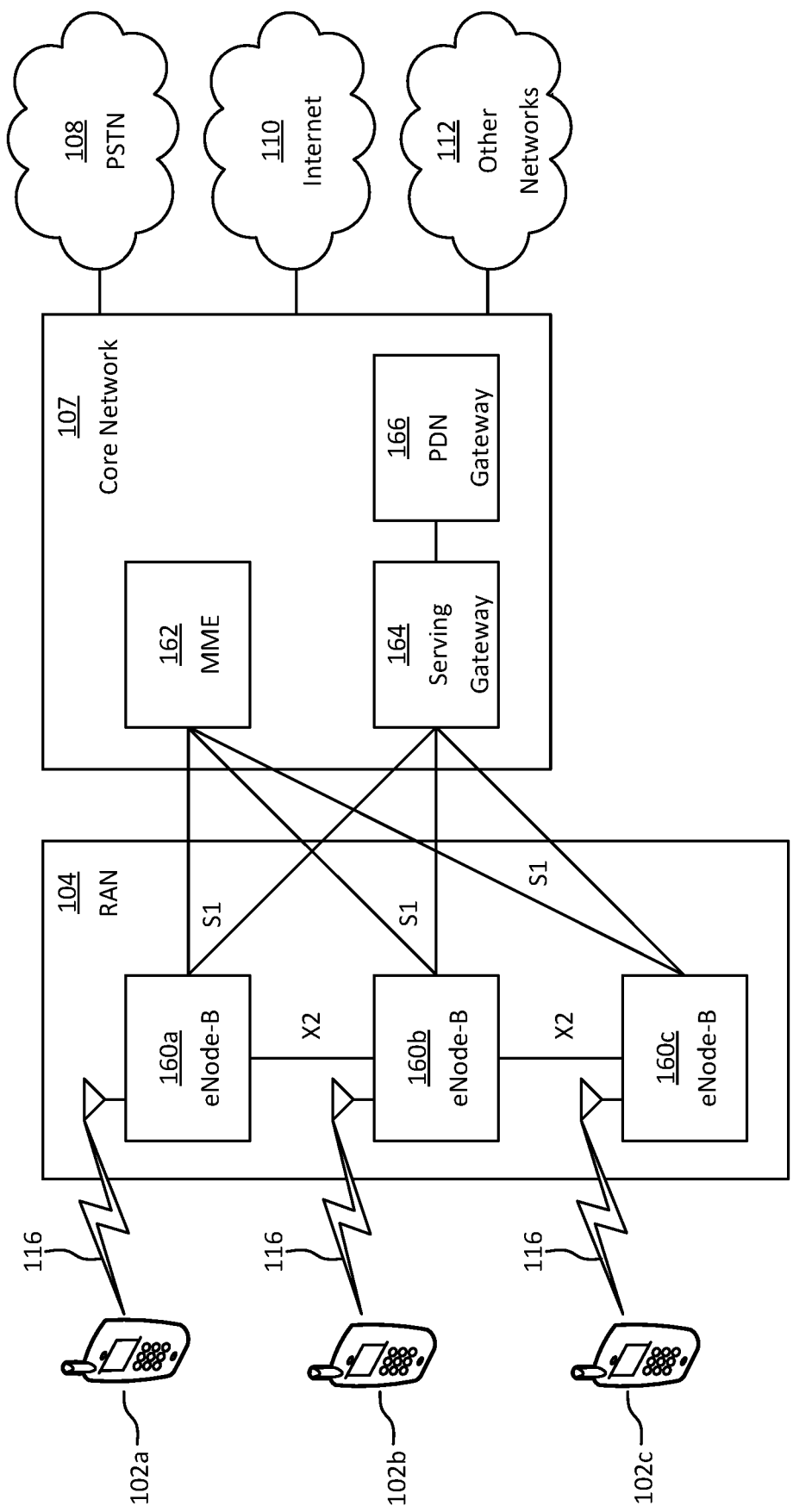
FIG. 27C illustrates an exemplary system that includes RANs and core networks.

FIG. 27C is a system diagram of an example RAN 104 and core network 107 that may implement methods, systems, and devices of beam failure detection and recovery with multi-TRP and multi-panel transmission, as disclosed herein. As noted above, the RAN 104 may employ an E-UTRA radio technology to communicate with the WTRUs 102a, 102b, and 102c over the air interface 116. The RAN 104 may also be in communication with the core network 107.

The RAN 104 may include eNode-Bs 160a, 160b, and 160c, though it will be appreciated that the RAN 104 may include any number of eNode-Bs. The eNode-Bs 160a, 160b, and 160c may each include one or more transceivers for communicating with the WTRUs 102a, 102b, and 102c over the air interface 116. For example, the eNode-Bs 160a, 160b, and 160c may implement MIMO technology. Thus, the eNode-B 160a, for example, may use multiple antennas to transmit wireless signals to, and receive wireless signals from, the WTRU 102a.

Each of the eNode-Bs 160a, 160b, and 160c may be associated with a particular cell (not shown) and may be configured to handle radio resource management decisions, handover decisions, scheduling of users in the uplink or downlink, and the like. As shown in FIG. 27C, the eNode-Bs 160a, 160b, and 160c may communicate with one another over an X2 interface.

The core network 107 shown in FIG. 27C may include a Mobility Management Gateway (MME) 162, a serving gateway 164, and a Packet Data Network (PDN) gateway 166. While each of the foregoing elements are depicted as part of the core network 107, it will be appreciated that any one of these elements may be owned or operated by an entity other than the core network operator.

The MME 162 may be connected to each of the eNode-Bs 160a, 160b, and 160c in the RAN 104 via an S1 interface and may serve as a control node. For example, the MME 162 may be responsible for authenticating users of the WTRUs 102a, 102b, and 102c, bearer activation/deactivation, selecting a particular serving gateway during an initial attach of the WTRUs 102a, 102b, and 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, and 160c in the RAN 104 via the S1 interface. The serving gateway 164 may generally route and forward user data packets to/from the WTRUs 102a, 102b, and 102c. The serving gateway 164 may also perform other functions, such as anchoring user planes during inter-eNode B handovers, triggering paging when downlink data is available for the WTRUs 102a, 102b, and 102c, managing and storing contexts of the WTRUs 102a, 102b, and 102c, and the like.

The serving gateway 164 may also be connected to the PDN gateway 166, which may provide the WTRUs 102a, 102b, and 102c with access to packet-switched networks, such as the Internet 110, to facilitate communications between the WTRUs 102a, 102b, 102c, and IP-enabled devices.

The core network 107 may facilitate communications with other networks. For example, the core network 107 may provide the WTRUs 102a, 102b, and 102c with access to circuit-switched networks, such as the PSTN 108, to facilitate communications between the WTRUs 102a, 102b, and 102c and traditional land-line communications devices. For example, the core network 107 may include, or may communicate with, an IP gateway (e.g., an IP Multimedia Subsystem (IMS) server) that serves as an interface between the core network 107 and the PSTN 108. In addition, the core network 107 may provide the WTRUs 102a, 102b, and 102c with access to the networks 112, which may include other wired or wireless networks that are owned or operated by other service providers.

Figure 27D:
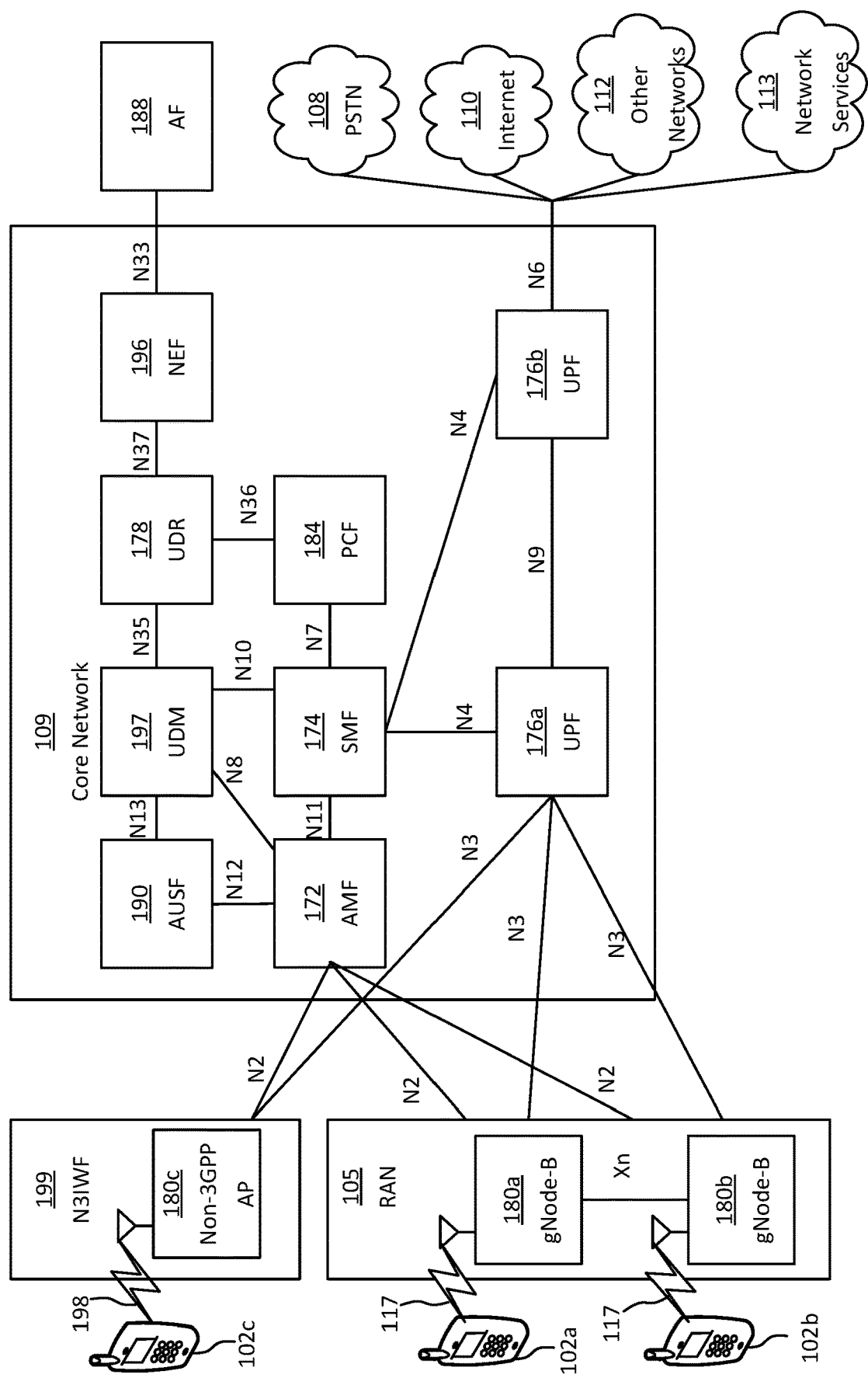
FIG. 27D illustrates an exemplary system that includes RANs and core networks.

FIG. 27D is a system diagram of an example RAN 105 and core network 109 that may implement methods, systems, and devices of beam failure detection and recovery with multi-TRP and multi-panel transmission, as disclosed herein. The RAN 105 may employ an NR radio technology to communicate with the WTRUs 102a and 102b over the air interface 117. The RAN 105 may also be in communication with the core network 109. A Non-3GPP Interworking Function (N3IWF) 199 may employ a non-3GPP radio technology to communicate with the WTRU 102c over the air interface 198. The N3IWF 199 may also be in communication with the core network 109.

The RAN 105 may include gNode-Bs 180a and 180b. It will be appreciated that the RAN 105 may include any number of gNode-Bs. The gNode-Bs 180a and 180b may each include one or more transceivers for communicating with the WTRUs 102a and 102b over the air interface 117. When integrated access and backhaul connection are used, the same air interface may be used between the WTRUs and gNode-Bs, which may be the core network 109 via one or multiple gNBs. The gNode-Bs 180a and 180b may implement MIMO, MU-MIMO, or digital beamforming technology. Thus, the gNode-B 180a, for example, may use multiple antennas to transmit wireless signals to, and receive wireless signals from, the WTRU 102a. It should be appreciated that the RAN 105 may employ of other types of base stations such as an eNode-B. It will also be appreciated the RAN 105 may employ more than one type of base station. For example, the RAN may employ eNode-Bs and gNode-Bs.

The N3IWF 199 may include a non-3GPP Access Point 180c. It will be appreciated that the N3IWF 199 may include any number of non-3GPP Access Points. The non-3GPP Access Point 180c may include one or more transceivers for communicating with the WTRUs 102c over the air interface 198. The non-3GPP Access Point 180c may use the 802.11 protocol to communicate with the WTRU 102c over the air interface 198.

Each of the gNode-Bs 180a and 180b may be associated with a particular cell (not shown) and may be configured to handle radio resource management decisions, handover decisions, scheduling of users in the uplink or downlink, and the like. As shown in FIG. 27D, the gNode-Bs 180a and 180b may communicate with one another over an Xn interface, for example.

The core network 109 shown in FIG. 27D may be a 5G core network (5GC). The core network 109 may offer numerous communication services to customers who are interconnected by the radio access network. The core network 109 comprises a number of entities that perform the functionality of the core network. As used herein, the term "core network entity" or "network function" refers to any entity that performs one or more functionalities of a core network. It is understood that such core network entities may be logical entities that are implemented in the form of computer-executable instructions (software) stored in a memory of, and executing on a processor of, an apparatus configured for wireless or network communications or a computer system, such as system 90 illustrated in FIG. 27G.

In the example of FIG. 27D, the 5G Core Network 109 may include an access and mobility management function (AMF) 172, a Session Management Function (SMF) 174, User Plane Functions (UPFs) 176a and 176b, a User Data Management Function (UDM) 197, an Authentication Server Function (AUSF) 190, a Network Exposure Function (NEF) 196, a Policy Control Function (PCF) 184, a Non-3GPP Interworking Function (N3IWF) 199, a User Data Repository (UDR) 178. While each of the foregoing elements are depicted as part of the 5G core network 109, it will be appreciated that any one of these elements may be owned or operated by an entity other than the core network operator. It will also be appreciated that a 5G core network may not consist of all of these elements, may consist of additional elements, and may consist of multiple instances of each of these elements. FIG. 27D shows that network functions directly connect to one another, however, it should be appreciated that they may communicate via routing agents such as a diameter routing agent or message buses.

In the example of FIG. 27D, connectivity between network functions is achieved via a set of interfaces, or reference points. It will be appreciated that network functions could be modeled, described, or implemented as a set of services that are invoked, or called, by other network functions or services. Invocation of a Network Function service may be achieved via a direct connection between network functions, an exchange of messaging on a message bus, calling a software function, etc.

The AMF 172 may be connected to the RAN 105 via an N2 interface and may serve as a control node. For example, the AMF 172 may be responsible for registration management, connection management, reachability management, access authentication, access authorization. The AMF may be responsible forwarding user plane tunnel configuration information to the RAN 105 via the N2 interface. The AMF 172 may receive the user plane tunnel configuration information from the SMF via an N11 interface. The AMF 172 may generally route and forward NAS packets to/from the WTRUs 102a, 102b, and 102c via an N1 interface. The N1 interface is not shown in FIG. 27D.

The SMF 174 may be connected to the AMF 172 via an N11 interface. Similarly the SMF may be connected to the PCF 184 via an N7 interface, and to the UPFs 176a and 176b via an N4 interface. The SMF 174 may serve as a control node. For example, the SMF 174 may be responsible for Session Management, IP address allocation for the WTRUs 102a, 102b, and 102c, management and configuration of traffic steering rules in the UPF 176a and UPF 176b, and generation of downlink data notifications to the AMF 172.

The UPF 176a and UPF 176b may provide the WTRUs 102a, 102b, and 102c with access to a Packet Data Network (PDN), such as the Internet 110, to facilitate communications between the WTRUs 102a, 102b, and 102c and other devices. The UPF 176a and UPF 176b may also provide the WTRUs 102a, 102b, and 102c with access to other types of packet data networks. For example, Other Networks 112 may be Ethernet Networks or any type of network that exchanges packets of data. The UPF 176a and UPF 176b may receive traffic steering rules from the SMF 174 via the N4 interface. The UPF 176a and UPF 176b may provide access to a packet data network by connecting a packet data network with an N6 interface or by connecting to each other and to other UPFs via an N9 interface. In addition to providing access to packet data networks, the UPF 176 may be responsible packet routing and forwarding, policy rule enforcement, quality of service handling for user plane traffic, downlink packet buffering.

The AMF 172 may also be connected to the N3IWF 199, for example, via an N2 interface. The N3IWF facilitates a connection between the WTRU 102c and the 5G core network 170, for example, via radio interface technologies that are not defined by 3GPP. The AMF may interact with the N3IWF 199 in the same, or similar, manner that it interacts with the RAN 105.

The PCF 184 may be connected to the SMF 174 via an N7 interface, connected to the AMF 172 via an N15 interface, and to an Application Function (AF) 188 via an N5 interface. The N15 and N5 interfaces are not shown in FIG. 27D. The PCF 184 may provide policy rules to control plane nodes such as the AMF 172 and SMF 174, allowing the control plane nodes to enforce these rules. The PCF 184, may send policies to the AMF 172 for the WTRUs 102a, 102b, and 102c so that the AMF may deliver the policies to the WTRUs 102a, 102b, and 102c via an N1 interface. Policies may then be enforced, or applied, at the WTRUs 102a, 102b, and 102c.

The UDR 178 may act as a repository for authentication credentials and subscription information. The UDR may connect to network functions, so that network function may add to, read from, and modify the data that is in the repository. For example, the UDR 178 may connect to the PCF 184 via an N36 interface. Similarly, the UDR 178 may connect to the NEF 196 via an N37 interface, and the UDR 178 may connect to the UDM 197 via an N35 interface.

The UDM 197 may serve as an interface between the UDR 178 and other network functions. The UDM 197 may authorize network functions to access of the UDR 178. For example, the UDM 197 may connect to the AMF 172 via an N8 interface, the UDM 197 may connect to the SMF 174 via an N10 interface. Similarly, the UDM 197 may connect to the AUSF 190 via an N13 interface. The UDR 178 and UDM 197 may be tightly integrated.

The AUSF 190 performs authentication related operations and connects to the UDM 178 via an N13 interface and to the AMF 172 via an N12 interface.

The NEF 196 exposes capabilities and services in the 5G core network 109 to Application Functions (AF) 188. Exposure may occur on the N33 API interface. The NEF may connect to an AF 188 via an N33 interface and it may connect to other network functions in order to expose the capabilities and services of the 5G core network 109.

Application Functions 188 may interact with network functions in the 5G Core Network 109. Interaction between the Application Functions 188 and network functions may be via a direct interface or may occur via the NEF 196. The Application Functions 188 may be considered part of the 5G Core Network 109 or may be external to the 5G Core Network 109 and deployed by enterprises that have a business relationship with the mobile network operator.

Network Slicing is a mechanism that could be used by mobile network operators to support one or more 'virtual' core networks behind the operator's air interface. This involves 'slicing' the core network into one or more virtual networks to support different RANs or different service types running across a single RAN. Network slicing enables the operator to create networks customized to provide optimized solutions for different market scenarios which demands diverse requirements, e.g. in the areas of functionality, performance and isolation.

3GPP has designed the 5G core network to support Network Slicing. Network Slicing is a good tool that network operators may use to support the diverse set of 5G use cases (e.g., massive IoT, critical communications, V2X, and enhanced mobile broadband) which demand very diverse and sometimes extreme requirements. Without the use of network slicing techniques, it is likely that the network architecture would not be flexible and scalable enough to efficiently support a wider range of use cases need when each use case has its own specific set of performance, scalability, and availability requirements. Furthermore, introduction of new network services should be made more efficient.

Referring again to FIG. 27D, in a network slicing scenario, a WTRU 102a, 102b, or 102c may connect to an AMF 172, via an N1 interface. The AMF may be logically part of one or more slices. The AMF may coordinate the connection or communication of WTRU 102a, 102b, or 102c with one or more UPF 176a and 176b, SMF 174, and other network functions. Each of the UPFs 176a and 176b, SMF 174, and other network functions may be part of the same slice or different slices. When they are part of different slices, they may be isolated from each other in the sense that they may utilize different computing resources, security credentials, etc.

The core network 109 may facilitate communications with other networks. For example, the core network 109 may include, or may communicate with, an IP gateway, such as an IP Multimedia Subsystem (IMS) server, that serves as an interface between the 5G core network 109 and a PSTN 108. For example, the core network 109 may include, or communicate with a short message service (SMS) service center that facilities communication via the short message service. For example, the 5G core network 109 may facilitate the exchange of non-IP data packets between the WTRUs 102a, 102b, and 102c and servers or applications functions 188. In addition, the core network 170 may provide the WTRUs 102a, 102b, and 102c with access to the networks 112, which may include other wired or wireless networks that are owned or operated by other service providers.

The core network entities described herein and illustrated in FIG. 27A, FIG. 27C, FIG. 27D, or FIG. 27E are identified by the names given to those entities in certain existing 3GPP specifications, but it is understood that in the future those entities and functionalities may be identified by other names and certain entities or functions may be combined in future specifications published by 3GPP, including future 3GPP NR specifications. Thus, the particular network entities and functionalities described and illustrated in FIG. 27A, FIG. 27B, FIG. 27C, FIG. 27D, or FIG. 27E are provided by way of example only, and it is understood that the subject matter disclosed and claimed herein may be embodied or implemented in any similar communication system, whether presently defined or defined in the future.

Figure 27E:
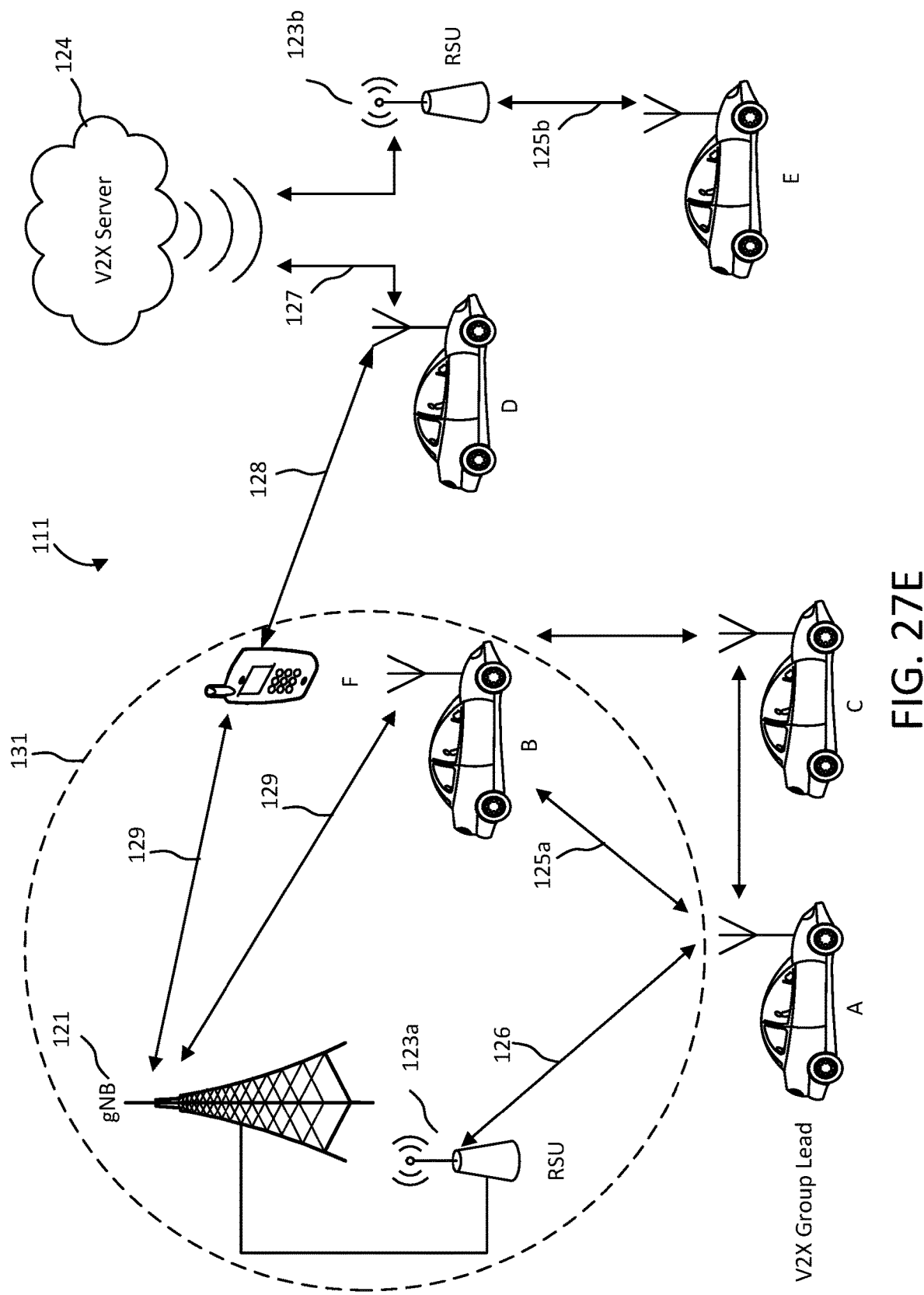
FIG. 27E illustrates another example communications system.

FIG. 27E illustrates an example communications system 111 in which the systems, methods, apparatuses that implement beam failure detection and recovery with multi-TRP and multi-panel transmission, described herein, may be used. Communications system 111 may include Wireless Transmit/Receive Units (WTRUs) A, B, C, D, E, F, a base station gNB 121, a V2X server 124, and Road Side Units (RSUs) 123a and 123b. In practice, the concepts presented herein may be applied to any number of WTRUs, base station gNBs, V2X networks, or other network elements. One or several or all WTRUs A, B, C, D, E, and F may be out of range of the access network coverage 131. WTRUs A, B, and C form a V2X group, among which WTRU A is the group lead and WTRUs B and C are group members.

WTRUs A, B, C, D, E, and F may communicate with each other over a Uu interface 129 via the gNB 121 if they are within the access network coverage 131. In the example of FIG. 27E, WTRUs B and F are shown within access network coverage 131. WTRUs A, B, C, D, E, and F may communicate with each other directly via a Sidelink interface (e.g., PC5 or NR PC5) such as interface 125a, 125b, or 128, whether they are under the access network coverage 131 or out of the access network coverage 131. For instance, in the example of FIG. 27E, WRTU D, which is outside of the access network coverage 131, communicates with WTRU F, which is inside the coverage 131.

WTRUs A, B, C, D, E, and F may communicate with RSU 123a or 123b via a Vehicle-to-Network (V2N) 133 or Sidelink interface 125b. WTRUs A, B, C, D, E, and F may communicate to a V2X Server 124 via a Vehicle-to-Infrastructure (V2I) interface 127. WTRUs A, B, C, D, E, and F may communicate to another UE via a Vehicle-to-Person (V2P) interface 128.

Figure 27F:
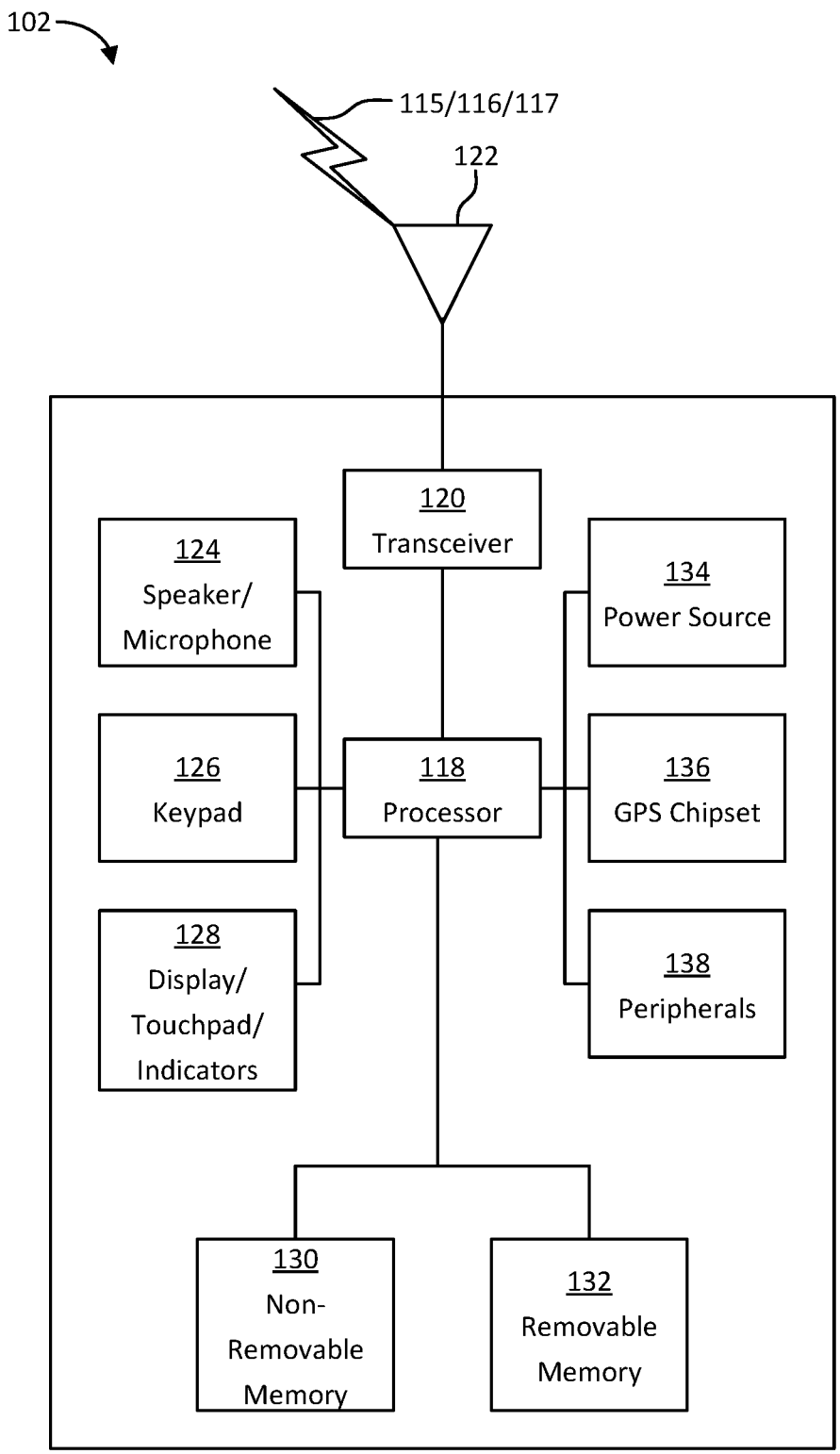
FIG. 27F is a block diagram of an example apparatus or device, such as a WTRU.

FIG. 27F is a block diagram of an example apparatus or device WTRU 102 that may be configured for wireless communications and operations in accordance with the systems, methods, and apparatuses that implement beam failure detection and recovery with multi-TRP and multi-panel transmission, described herein, such as a WTRU 102 of FIG. 27A, FIG. 27B, FIG. 27C, FIG. 27D, or FIG. 27E, or FIG. 1— FIG. 20 (e.g., UEs). As shown in FIG. 27F, the example WTRU 102 may include a processor 118, a transceiver 120, a transmit/receive element 122, a speaker/microphone 124, a keypad 126, a display/touchpad/indicators 128, non-removable memory 130, removable memory 132, a power source 134, a global positioning system (GPS) chipset 136, and other peripherals 138. It will be appreciated that the WTRU 102 may include any sub-combination of the foregoing elements. Also, the base stations 114a and 114b, or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, a next generation node-B (gNode-B), and proxy nodes, among others, may include some or all of the elements depicted in FIG. 27F and may be an exemplary implementation that performs the disclosed systems and methods for beam failure detection and recovery with multi-TRP and multi-panel transmission described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, or any other functionality that enables the WTRU 102 to operate in a wireless environment. The processor 118 may be coupled to the transceiver 120, which may be coupled to the transmit/receive element 122. While FIG. 27F depicts the processor 118 and the transceiver 120 as separate components, it will be appreciated that the processor 118 and the transceiver 120 may be integrated together in an electronic package or chip.

The transmit/receive element 122 of a UE may be configured to transmit signals to, or receive signals from, a base station (e.g., the base station 114a of FIG. 27A) over the air interface 115/116/117 or another UE over the air interface 115d/116d/117d. For example, the transmit/receive element 122 may be an antenna configured to transmit or receive RF signals. The transmit/receive element 122 may be an emitter/detector configured to transmit or receive IR, UV, or visible light signals, for example. The transmit/receive element 122 may be configured to transmit and receive both RF and light signals. It will be appreciated that the transmit/receive element 122 may be configured to transmit or receive any combination of wireless or wired signals.

In addition, although the transmit/receive element 122 is depicted in FIG. 27F as a single element, the WTRU 102 may include any number of transmit/receive elements 122. More specifically, the WTRU 102 may employ MIMO technology. Thus, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, for example NR and IEEE 802.11 or NR and E-UTRA, or to communicate with the same RAT via multiple beams to different RRHs, TRPs, RSUs, or nodes.

The processor 118 of the WTRU 102 may be coupled to, and may receive user input data from, the speaker/microphone 124, the keypad 126, or the display/touchpad/indicators 128 (e.g., a liquid crystal display (LCD) display unit or organic light-emitting diode (OLED) display unit. The processor 118 may also output user data to the speaker/microphone 124, the keypad 126, or the display/touchpad/indicators 128. In addition, the processor 118 may access information from, and store data in, any type of suitable memory, such as the non-removable memory 130 or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. The processor 118 may access information from, and store data in, memory that is not physically located on the WTRU 102, such as on a server that is hosted in the cloud or in an edge computing platform or in a home computer (not shown). The processor 118 may be configured to control lighting patterns, images, or colors on the display or indicators 128 in response to whether the setup of the beam failure detection and recovery with multi-TRP and multi-panel transmission in some of the examples described herein are successful or unsuccessful, or otherwise indicate a status of beam failure detection and recovery with multi-TRP and multi-panel transmission and associated components. The control lighting patterns, images, or colors on the display or indicators 128 may be reflective of the status of any of the method flows or components in the FIGS. illustrated or discussed herein (e.g., FIG. 1-FIG. 25, etc.). Disclosed herein are messages and procedures of beam failure detection and recovery with multi-TRP and multi-panel transmission. The messages and procedures may be extended to provide interface/API for users to request resources via an input source (e.g., speaker/microphone 124, keypad 126, or display/touchpad/indicators 128) and request, configure, or query beam failure detection and recovery with multi-TRP and multi-panel transmission related information, among other things that may be displayed on display 128.

The processor 118 may receive power from the power source 134, and may be configured to distribute or control the power to the other components in the WTRU 102. The power source 134 may be any suitable device for powering the WTRU 102. For example, the power source 134 may include one or more dry cell batteries, solar cells; fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) or determine its location based on the timing of the signals being received from two or more nearby base stations. It will be appreciated that the WTRU 102 may acquire location information by way of any suitable location-determination method.

The processor 118 may further be coupled to other peripherals 138, which may include one or more software or hardware modules that provide additional features, functionality, or wired or wireless connectivity. For example, the peripherals 138 may include various sensors such as an accelerometer, biometrics (e.g., finger print) sensors, an e-compass, a satellite transceiver, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The WTRU 102 may be included in other apparatuses or devices, such as a sensor, consumer electronics, a wearable device such as a smart watch or smart clothing, a medical or eHealth device, a robot, industrial equipment, a drone, a vehicle such as a car, truck, train, or an airplane. The WTRU 102 may connect to other components, modules, or systems of such apparatuses or devices via one or more interconnect interfaces, such as an interconnect interface that may comprise one of the peripherals 138.

Figure 27G:
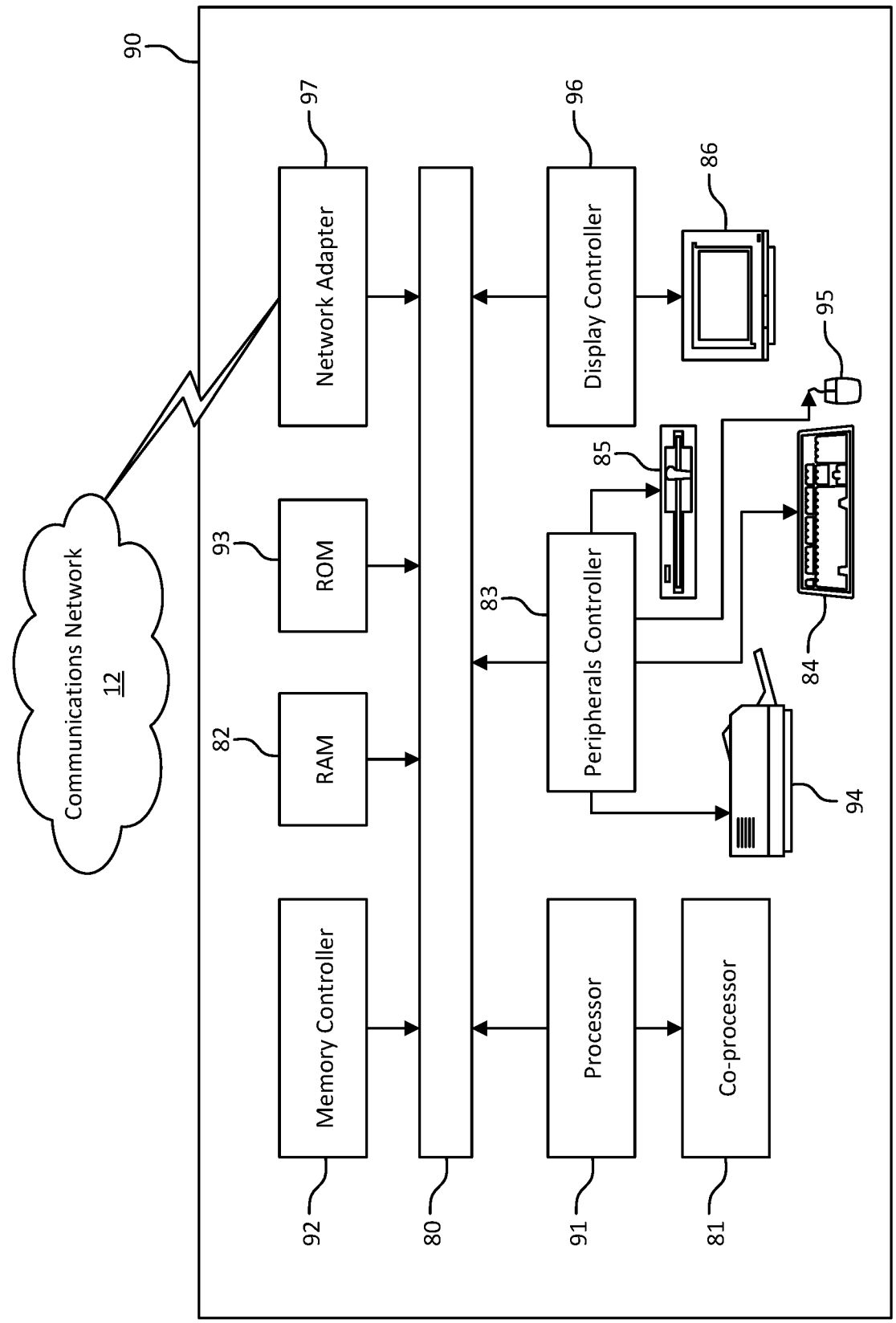
FIG. 27G is a block diagram of an exemplary computing system.

FIG. 27G is a block diagram of an exemplary computing system 90 in which one or more apparatuses of the communications networks illustrated in FIG. 27A, FIG. 27C, FIG. 27D and FIG. 27E as well as beam failure detection and recovery with multi-TRP and multi-panel transmission, such as the systems and methods illustrated in FIG. 1 through FIG. 20 described and claimed herein may be embodied, such as certain nodes or functional entities in the RAN 103/104/105, Core Network 106/107/109, PSTN 108, Internet 110, Other Networks 112, or Network Services 113. Computing system 90 may comprise a computer or server and may be controlled primarily by computer readable instructions, which may be in the form of software, wherever, or by whatever means such software is stored or accessed. Such computer readable instructions may be executed within a processor 91, to cause computing system 90 to do work. The processor 91 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 91 may perform signal coding, data processing, power control, input/output processing, or any other functionality that enables the computing system 90 to operate in a communications network. Coprocessor 81 is an optional processor, distinct from main processor 91, that may perform additional functions or assist processor 91. Processor 91 or coprocessor 81 may receive, generate, and process data related to the methods and apparatuses disclosed herein for beam failure detection and recovery with multi-TRP and multi-panel transmission, such as RRC IE.

In operation, processor 91 fetches, decodes, and executes instructions, and transfers information to and from other resources via the computing system's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 may be read or changed by processor 91 or other hardware devices. Access to RAM 82 or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode may access only memory mapped by its own process virtual address space; it cannot access memory within another process's virtual address space unless memory sharing between the processes has been set up.

In addition, computing system 90 may contain peripherals controller 83 responsible for communicating instructions from processor 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. The visual output may be provided in the form of a graphical user interface (GUI). Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain communication circuitry, such as for example a wireless or wired network adapter 97, that may be used to connect computing system 90 to an external communications network or devices, such as the RAN 103/104/105, Core Network 106/107/109, PSTN 108, Internet 110, WTRUs 102, or Other Networks 112 of FIG. 27A, FIG. 27B, FIG. 27C, FIG. 27D, or FIG. 27E, to enable the computing system 90 to communicate with other nodes or functional entities of those networks. The communication circuitry, alone or in combination with the processor 91, may be used to perform the transmitting and receiving steps of certain apparatuses, nodes, or functional entities described herein.

It is understood that any or all of the apparatuses, systems, methods and processes described herein may be embodied in the form of computer executable instructions (e.g., program code) stored on a computer-readable storage medium which instructions, when executed by a processor, such as processors 118 or 91, cause the processor to perform or implement the systems, methods and processes described herein. Specifically, any of the steps, operations, or functions described herein may be implemented in the form of such computer executable instructions, executing on the processor of an apparatus or computing system configured for wireless or wired network communications. Computer readable storage media includes volatile and nonvolatile, removable and non-removable media implemented in any non-transitory (e.g., tangible or physical) method or technology for storage of information, but such computer readable storage media do not include signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which may be used to store the desired information and which may be accessed by a computing system.

In describing preferred methods, systems, or apparatuses of the subject matter of the present disclosure—beam failure detection and recovery with multi-TRP and multi-panel transmission—as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose.

The various techniques described herein may be implemented in connection with hardware, firmware, software or, where appropriate, combinations thereof. Such hardware, firmware, and software may reside in apparatuses located at various nodes of a communication network. The apparatuses may operate singly or in combination with each other to effectuate the methods described herein. As used herein, the terms "apparatus," "network apparatus," "node," "device," "network node," or the like may be used interchangeably. In addition, the use of the word "or" is generally used inclusively unless otherwise provided herein. "Best" as referred herein This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art (e.g., skipping steps, combining steps, or adding steps between exemplary methods disclosed herein). Such other examples are intended to be within the scope of the claims if they have structural elements that do not differ from the literal language of the claims, or if they include equivalent structural elements with insubstantial differences from the literal languages of the claims.

Methods, systems, and apparatuses, among other things, as described herein may provide for means to support BFD with multi-TRP transmission or to support BFR with multi-TRP transmission as provided in FIG. 1-FIG. 25, etc. The apparatus may be a base station or user equipment. The system may include one or more processors connected with memory to effectuate operations. Methods, systems, and apparatuses, among other things, as described herein may provide for explicitly configuring options for beam failure resource sets and candidate Beam RS List sets. The explicitly configuring options may include: explicitly configuring UE with one or multiple failureDetectionResources sets $\bar{q}_{0,i,k}$ i=1 ... $M_k$, $M_k$ 1 in a (active) BWP and candidate-BeamRSList $\bar{q}_{1,i,k}$ i=1 ... $M_k$ for radio link quality measurements to support beam failure detection (BFD) with multiple TRPs transmission on a component cell (CC) k, k=1 ..., $N_{max}$, respectively; where $M_k$ denotes the maximum number of links (from different TRP or a same TRP) simultaneously supported at a component carrier (CC) k and where $N_{max}$ denotes the maximum number supported CCs. Each set of $\bar{q}_{0,i,k}$ and $\bar{q}_{1,i,k}$, i=1 ... $M_k$, at a CC k may be independently associated with multiple sets of periodic CSI-RS resource configuration indexes or SS/PBCH block indexes. There may be a determining that UE 200 is not provided with explicit beam failure resource sets or candidate beam RS list sets; and based on the determining that UE 200 is not provided, implicitly configuring options. The implicitly configuring options may include: UE configuring the failureDetectionResources set $\bar{q}_{0,i,k}$, i=1 ... $M_k$ at a CC k to include periodic CSI-RS resource configuration indexes with same values as the RS indexes in the RS sets indicated by TCI-state for respective CORESETs that UE 200 uses for monitoring PDCCH. There may be use of single DCI to schedule multi-links and use of single UCI for joint UCI for multi-links. Methods, systems, and apparatuses, among other things, as described herein may provide for support BFR with multi-TRP transmission that may include using BFR use contention-free PRACH, BFR use PUCCH, BFR use contention-free 2-step RACH, or BFR use PUSCH. All combinations in this paragraph and next paragraph (including the removal or addition of steps) are contemplated in a manner that is consistent with the other portions of the detailed description.

Methods, systems, and apparatuses, among other things, as described herein may provide for determining a beam failure event has occurred; based on the determining that the beam failure event has occurred, sending an indication of a beam failure event, wherein the indication is transmitted during a contention free physical random access channel (PRACH) occasion; and reporting, via a physical uplink shared channel (PUSCH), an index of a failed component carrier. The reporting may include the failed CC index(es), CORESET ID, or new beam information $q_{new}$. The new beam information may be carried by Msg A. Method, systems, or apparatus may provide for when performing Msg A transmission, implicitly indicating to a physical layer a demodulation reference signal (DMRS) port or DMRS sequence. Method, systems, or apparatus may provide for based on detecting a selected RA preamble, implicitly determining by a physical layer a demodulation reference signal (DMRS) port or DMRS sequence. All combinations in this paragraph and the below paragraph (including the removal or addition of steps) are contemplated in a manner that is consistent with the other portions of the detailed description.

Methods, systems, and apparatuses, among other things, as described herein may provide for configuring (or detecting) a first set of reference signals (RSs) and a second set of RSs for beam failure detection (BFD); configuring (or detecting) a third set of RSs and a fourth set of RSs for new beam identification; and when the bandwidth part (BWP) is active, performing BFD based on radio link quality of the first set of RSs or radio link quality of the second set of RSs. Methods, systems, and apparatuses, among other things, as described herein may provide for receiving a first RS of the first set of RSs from a first TRP; and receiving a second RS of the second set of RSs from a second TRP. The radio link quality of the first set of RSs or the radio link quality of the second set of RSs may be based on reference signals received power (RSRP) or Reference Signal Received Quality (RSRQ). The radio link quality of the first set of RSs may be from a first TRP; and the radio link quality of the second set of RSs is from a second TRP. Methods, systems, and apparatuses, among other things, as described herein may provide for receiving the radio link quality of one or more RSs of the first set of RSs; and based on the radio link quality for a first threshold number of the one or more RSs in the first set being below a radio link quality threshold, providing an indication that indicates to other layers at least the radio link quality for RSs in the first set of RSs. The indication may be provided by the physical layer. Methods, systems, and apparatuses, among other things, as described herein may provide for receiving a radio link quality of one or more RSs of the first set of RSs; and based on the radio link quality for a second threshold number of the one or more RSs in the second set being below a radio link quality threshold, providing an indication that indicates to other layers at least the radio link quality for RSs in the second set of RSs. Methods, systems, and apparatuses, among other things, as described herein may provide for receiving a third RS of the third set of RSs from the first TRP; and receiving a fourth RS of the fourth set of RSs from the second TRP. Methods, systems, and apparatuses, among other things, as described herein may provide for receiving a radio link quality of a third set of RSs from the first TRP; and receiving a radio link quality of a fourth set of RSs from the second TRP. Methods, systems, and apparatuses, among other things, as described herein may provide for based on a request (e.g., in response to a request), performing a new beam identification based on the radio link quality of the third set of RSs or the radio link quality of the fourth set of RSs reaching one or more thresholds. Methods, systems, and apparatuses, among other things, as described herein may provide for based on an indication of beam failure of a first link (e.g., NBI based on the third set), MAC layer may request PHY layer to perform new beam identification for the first link, which corresponds to the third set of RS in PHY. A request for beam failure recovery may be received over physical random access channel, or physical uplink control channel, or physical uplink shared channel. If the higher layers determine beam failure based on the indications related to the first set, then the higher layers may request new beam identification based on the third set. Similarly, the second set may be associated with the fourth set. All combinations in this paragraph and the below paragraph (including the removal or addition of steps) are contemplated in a manner that is consistent with the other portions of the detailed description.

Methods, systems, and apparatuses, among other things, as described herein may provide for measuring a radio link quality of the one or more RSs in the third set of RSs from the first TRP. Methods, systems, and apparatuses, among other things, as described herein may provide for measuring a radio link quality of the fourth set of RSs from the second TRP. Methods, systems, and apparatuses, among other things, as described herein may provide for performing a new beam identification based on the radio link quality of the third set of RSs and the radio link quality of the fourth set of RSs, wherein the radio link quality (e.g., third or fourth set) may be based on RSRP. Methods, systems, and apparatuses, among other things, as described herein may provide for assessing the measured radio link quality of one or more RSs of the first set of RSs; determining that the measured radio link quality of the one or more RSs in the first set of RSs being below a threshold; and providing an indication to another layer that the radio link quality of of the one or more RSs in the first set being below the threshold. The radio link quality of the first set of RSs may be from a first TRP. The second set of RSs may be from a second TRP. The radio link quality of the first set of RSs or the radio link quality of the second set of RSs may be based on a hypothetical block error rate. All combinations in this paragraph and the above paragraphs (including the removal or addition of steps) are contemplated in a manner that is consistent with the other portions of the detailed description.

What is claimed is:

1. A user equipment comprising:
   a processor configured to:
   receive a beam failure detection (BFD) configuration, wherein the BFD configuration indicates a first set of reference signals (RSs) that are associated with a first transmission reception point (TRP) and a second set of RSs that are associated with a second TRP, wherein the first TRP is associated with a first cell, and the second TRP is associated with a second cell;
   determine whether measurements associated with the first set of RSs that are associated with the first TRP are below a threshold associated with BFD;
   determine whether measurements associated with the second set of RSs that are associated with the second TRP are below the threshold associated with BFD; and
   perform BFD for the first TRP based on the measurements associated with the first set of RSs being below the threshold associated with BFD, and perform BFD for the second TRP based on the measurements associated with the second set of RSs being below the threshold associated with BFD.

2. The user equipment of claim 1, wherein the processor is configured to measure a radio link quality of the one or more RSs.

3. The user equipment of claim 1, wherein the processor is configured to request, by a medium access control layer, a physical layer to perform new beam identification based on the first set of RSs and the second set of RSs, wherein the physical layer reports to the medium access control layer with a periodicity.

4. The user equipment of claim 3, wherein the processor is configured to count beam failure instance indications from the physical layer separately for each radio link.

5. The user equipment of claim 1, wherein the first cell and the second cell are the same.

6. The user equipment of claim 1, wherein the first cell is different from the second cell.

7. The user equipment of claim 1, wherein the processor is configured to:
receive a beam failure recovery (BFR) configuration, wherein the BFR configuration comprises one or more physical random-access channel (PRACH) resources and the one or more PRACH resources are associated with a third TRP.

8. The user equipment of claim 7, wherein the processor is configured to:
receive one or more recovery search space identifications, wherein the one or more recovery search space identifications are configured by a control resource set (CORESET).

9. The user equipment of claim 7, wherein the processor is configured to:
initiate one or more contention-free random access (CFRA) transmissions based on BFD being detected on for the first TRP or the second TRP.

10. A method performed by a user equipment, the method comprising:
receiving a beam failure detection (BFD) configuration, wherein the BFD configuration indicates a first set of reference signals (RSs) that are associated with a first transmission reception point (TRP) and a second set of RSs that are associated with a second TRP, wherein the first TRP is associated with a first cell, and the second TRP is associated with a second cell;
determining whether measurements associated with the first set of RSs that are associated with the first TRP are below a threshold associated with BFD;
determining whether measurements associated with the second set of RSs that are associated with the second TRP are below the threshold associated with BFD; and
performing BFD for the first TRP based on the measurements associated with the first set of RSs being below the threshold associated with BFD, and perform BFD for the second TRP based on the measurements associated with the second set of RSs being below the threshold associated with BFD.

11. The method of claim 10, further comprising measuring a radio link quality of the one or more RSs.

12. The method of claim 10, further comprising requesting, by a medium access control layer, a physical layer to perform new beam identification based on the first set of RSs and the second set of RSs, wherein the physical layer reports to the medium access control layer with a periodicity.

13. The method of claim 12, further comprising counting beam failure instance indications from the physical layer separately for each radio link.

14. The method of claim 10, wherein the first cell and the second cell are the same.

15. The method of claim 10, wherein the first cell is different from the second cell.

16. The method of claim 10, further comprising:
receiving a beam failure recovery (BFR) configuration, wherein the BFR configuration comprises one or more physical random-access channel (PRACH) resources and the one or more PRACH resources are associated with a third TRP.

17. The method of claim 16, further comprising:
receiving one or more recovery search space identifications, wherein the one or more recovery search space identifications are configured by a control resource set (CORESET).

18. The method of claim 17, further comprising:
initiating one or more contention-free random access (CFRA) transmissions based on BFD being detected on for the first TRP or the second TRP.

* * * * *